(12) United States Patent
Briscoe et al.

(10) Patent No.: US 8,201,180 B2
(45) Date of Patent: Jun. 12, 2012

(54) SYSTEM AND METHOD FOR DEFINING ASSOCIATIONS BETWEEN APPLICATIONS

(75) Inventors: Peter John Briscoe, Bath (GB); Elizabeth Graves Tector, Sammamish, WA (US); Richard Mishra, London (GB); Luca De Matteis, Bath (GB)

(73) Assignee: Amdocs Systems Limited, Bath (GB)

( * ) Notice: Subject to any disclaimer, the term of this patent is extended or adjusted under 35 U.S.C. 154(b) by 1320 days.

(21) Appl. No.: 11/842,803

(22) Filed: Aug. 21, 2007

(65) Prior Publication Data
US 2008/0052719 A1    Feb. 28, 2008

Related U.S. Application Data

(63) Continuation-in-part of application No. 11/753,521, filed on May 24, 2007, now Pat. No. 7,898,947.

(30) Foreign Application Priority Data

Aug. 23, 2006    (GB) .................................. 0616719.1

(51) Int. Cl.
  *G06F 9/46* (2006.01)
  *G06F 15/173* (2006.01)
(52) U.S. Cl. ........................................ 718/104; 709/226
(58) Field of Classification Search .................. 718/104; 709/226
See application file for complete search history.

(56) References Cited

U.S. PATENT DOCUMENTS

| | | | |
|---|---|---|---|
| 5,680,325 A | 10/1997 | Rohner | ..................... 364/514 |
| 6,363,411 B1 * | 3/2002 | Dugan et al. | ................. 709/202 |
| 6,418,139 B1 | 7/2002 | Akhtar | |
| 6,591,299 B2 * | 7/2003 | Riddle et al. | .................. 709/224 |
| 6,618,709 B1 * | 9/2003 | Sneeringer | ..................... 705/412 |
| 6,704,489 B1 * | 3/2004 | Kurauchi et al. | ............. 386/248 |
| 6,711,324 B1 | 3/2004 | Zang et al. | |
| 6,937,580 B2 | 8/2005 | Heatwole et al. | |
| 7,197,431 B2 * | 3/2007 | Barritz | .......................... 702/186 |
| 7,245,635 B2 | 7/2007 | Mo et al. | |
| 7,340,578 B1 * | 3/2008 | Khanzode | ..................... 711/170 |
| 7,376,084 B2 * | 5/2008 | Raghunath et al. | ........... 370/233 |
| 7,516,294 B2 * | 4/2009 | Tomita | .......................... 711/173 |
| 7,689,695 B2 * | 3/2010 | Astley et al. | ................... 709/226 |
| 7,898,947 B2 | 3/2011 | Briscoe et al. | |

(Continued)

FOREIGN PATENT DOCUMENTS

WO    03/005735    1/2003

OTHER PUBLICATIONS

Search Report and Examination Report from Application No. GB0616719.1 mailed on Nov. 17, 2008.

(Continued)

*Primary Examiner* — Van Nguyen
(74) *Attorney, Agent, or Firm* — Zilka-Kotab, PC

(57) ABSTRACT

A resource management system for managing resources in a computing and/or communications resource infrastructure is disclosed. The system comprises a database for storing a model of the resource infrastructure. The database defines a set of resources provided by the infrastructure; a set of software applications operating within the infrastructure and utilizing resources; and associations between given applications in the model and given resources to indicate utilization of the given resources by the given applications. The model can be used to perform resource utilization analysis and failure impact analysis.

28 Claims, 33 Drawing Sheets

U.S. PATENT DOCUMENTS

| | | |
|---|---|---|
| 8,023,429 B2 | 9/2011 | Briscoe et al. |
| 2002/0129048 A1* | 9/2002 | Qiu et al. ................. 707/204 |
| 2002/0152305 A1* | 10/2002 | Jackson et al. ............ 709/224 |
| 2002/0161891 A1 | 10/2002 | Higuchi et al. |
| 2003/0061362 A1* | 3/2003 | Qiu et al. ................. 709/229 |
| 2003/0156583 A1 | 8/2003 | Prager et al. |
| 2004/0223500 A1 | 11/2004 | Sanderson et al. |
| 2005/0169313 A1 | 8/2005 | Okamura et al. |
| 2007/0094381 A1 | 4/2007 | Weiss et al. |
| 2007/0121499 A1 | 5/2007 | Pal et al. |
| 2007/0147346 A1 | 6/2007 | Gilmartin |
| 2008/0016217 A1* | 1/2008 | Astley et al. ............ 709/226 |
| 2010/0235357 A1 | 9/2010 | Briscoe et al. |
| 2010/0306353 A1 | 12/2010 | Briscoe et al. |

OTHER PUBLICATIONS

Non-Final Office Action From U.S. Appl. No. 12/788,228, dated Jan. 31, 2011.

Notice of Allowance from U.S. Appl. No. 12/788,228, dated May 19, 2011.

Non-Final Office Action from U.S. Appl. No. 12/788,225, dated Dec. 15, 2011.

Notice of Allowance from U.S. Appl. No. 12/788,225, dated Mar. 13, 2012.

* cited by examiner

SYSTEM AND METHOD FOR DEFINING ASSOCIATIONS BETWEEN APPLICATIONS

The present application is a continuation-in-part of application Ser. No. 11/753,521, now U.S. Pat. No. 7,898,947, filed May 24, 2007, which claims priority under 35 U.S.C. §119 of U.K. application number GB0616719.1 filed Aug. 23, 2006, both of which are incorporated herein by reference.

The present invention relates to the management of resources in computing and communications resource infrastructures, and in particular to the management of resource capacity.

Computing and communications resource infrastructures are growing ever more complex. For example, corporate IT infrastructures may provide large numbers of interconnected servers, storage devices, user terminals and the like. Similarly, modern telecommunications networks typically comprise large numbers of networking components (routers, switches, connections and the like). All these components provide some functionality to users of the infrastructure/network and can hence be considered to be resources. However, given the complexity of such infrastructures, keeping track of available resources, and appropriately allocating resources to applications and services operating within the infrastructures, can be extremely difficult.

Furthermore, in the so-called "next generation" telecommunications networks (for example, 3G networks and beyond), the traditional boundary between the network and the IT infrastructure is increasingly blurred. Support for flexible telecommunications services based on next generation technologies such as Voice-over-IP and IP-TV requires effective management of IT and networking infrastructures and the resources they provide.

The present invention seeks to alleviate some of these problems.

Accordingly, in a first aspect of the invention, there is provided a resource management system for managing resources in a computing and/or communications resource infrastructure, the system comprising a database for storing a model of the resource infrastructure, the database being arranged to store information defining: a set of resources provided by (or forming part of) the infrastructure; a set of software applications operating within the infrastructure and utilising resources; and associations between given applications in the model and given resources to indicate utilisation of the given resources by the given applications.

The term "resource" as used herein preferably refers to computing or communications resources which form part of a computing/communications infrastructure. These may be physical resources, in particular computing or network devices, for example computer terminals, servers, CPUs, storage devices, including fixed storage and removable media reader/writers, printers, scanners, cameras or other peripheral devices, routers, switches, firewalls or other network interfaces or bus interfaces, and network connections. In some contexts, resources may also be (typically low-level) logical resources (for example a virtual server provided as a partition of a physical server, a storage volume defined on a storage device, logical circuits or ports defined for networking equipment).

The terms "computing and/or communications infrastructure" and "resource infrastructure" as used herein preferably refer to a collection of such resources, which are usually interconnected in some way.

The terms "model" and "infrastructure model" (and similar terms) preferably refer to a data representation of a resource infrastructure, defining the resources, and if appropriate interconnections and other relationships between resources. The model may contain further information about the infrastructure, defining, for example, software applications and user services utilising the infrastructure, capacity information defining resource capacities provided by resources and/or allocated for use by applications and services, and any other appropriate information. The model data relating to individual resources may, for example, include device configuration information (where the resource is a configurable device), location information, equipment type, model and software version and other relevant information. The model typically comprises a set of model objects representing elements (e.g. resources, applications, services, relationships) of the infrastructure and defines relationships between model objects.

By explicitly representing utilisation of resources by applications in a model of a resource infrastructure, infrastructure resources can be managed more effectively. For example, the utilisation of resources can be analysed, and the impact of resource malfunctions or failures on applications can be determined.

The database preferably further comprises: capacity information associated with resources, the capacity information specifying, for one or more given resources, a resource capacity provided by those resources; and resource allocation information specifying, for a given association between an application and one or more resources, a resource quantity allocated to the application from the associated one or more resources.

By quantifying resource availability and utilisation in this way, resource utilisation may be captured in a more detailed manner, which can assist in a variety of service provisioning, service assurance and infrastructure planning processes. For example, the model can be used to determine whether sufficient resources are available for a given application or service that is to be added to the infrastructure.

The database preferably further defines: one or more logical resources, wherein a logical resource represents resource capacity made available by one or more resources. Preferably, the database defines one or more logical environments, wherein a logical environment represents an execution context for applications. The logical environment is preferably associated in the database with one or more resources, the resources providing the execution context.

In this way, a more abstract view of resource can be provided, which can simplify capacity management. For example related (physical) resources which are typically used together can be grouped as a logical resource or environment. Applications and other resource consumers can then consume resources from the logical resource or environment. This can allow a view of capacity to be provided which is based on useful resource functionality, rather than the complexities of actual equipment configurations. For example, a storage area network consisting of multiple storage devices may be represented as a single logical environment with associated capacity information, hiding the complexity of its actual configuration (which may not be relevant from a capacity management perspective).

Thus, preferably, the database defines an association between an application and a logical environment to indicate utilisation by the application of the execution context and associated resources represented by the logical environment; and the database preferably comprises capacity information associated with a logical environment, the capacity information defining a resource capacity provided by the resources associated with the logical environment. The database preferably comprises resource allocation information specifying, for a given association between an application and a logical environment, a resource quantity allocated to the application from the logical environment.

A logical environment in the database can preferably be associated with one or more other logical environments (as well as or instead of being associated directly with resources), thereby allowing a hierarchy of logical resources to be defined.

The database may define, for a logical environment, a plurality of partitions, each partition representing a portion of the resource capacity provided by the logical environment. This can enable more flexible management of resource capacity. The database preferably defines an association between an application in the model and a logical environment partition to indicate utilisation of resource capacity by the application from the portion of resource capacity allocated to the associated partition. Preferably, applications can either be associated with a partition or directly with a logical environment. Accordingly, the database preferably defines, for a logical environment or logical environment partition, a resource quantity made available by the logical environment or logical environment partition to applications, and a resource quantity allocated to the application from the associated logical environment or partition is preferably defined in the database.

The database may specify, for a logical environment or logical environment partition, a modifying factor, indicating that the resource quantity made available by the logical environment or partition is different from, preferably a fraction or multiple of, a resource quantity provided to the logical environment from resources represented by the logical environment. In this way, capacity can be managed more flexibly. For example, the modifying factor may be an overbooking factor.

The database preferably defines, for one or more of the partitions of a logical environment, associations with one or more selected resources or components of resources to indicate that the portion of resource capacity allocated to the partition is provided by the associated resources or resource components. The selected resources are typically resources forming part of the logical environment. In this way, the partitioning of resource capacity may be related to the underlying resources, which can give a more detailed view of dependencies between resource consumers (e.g. applications) and the physical resources. Thus, the selected resources or resource components for each partition are a subset of the resources associated with the logical environment; the partitions may represent mutually exclusive subsets of the resources.

Preferably, the database further comprises: capacity information associated with applications, the capacity information specifying, for an application, a resource capacity provided by the application to application services. The term "application service" here preferably refers to the services provided by an application. These may be related to individual users; for example, an email application may provide an email service to a number of users.

Application services may consume (be allocated) resource capacity from applications in the same way as applications consume resource capacity from logical environments (e.g. an individual email user's service may comprise a certain storage allocation, which is allocated from physical storage resources). Thus, the resource capacity is preferably related to, and preferably allocated from, a resource capacity made available by a logical environment and/or one or more resources. The database preferably further comprises: information defining a set of application services provisioned to users of applications; associations between application services and applications; and resource allocation information specifying, for a given association between an application service and an application, a resource quantity allocated to the application service from the associated one or more applications. In this way, allocation of resource capacity may be managed all the way from individual user's services down to hardware resources.

The database may define, for a given service type, a resource allocation profile indicating one or more resource quantities to be assigned to a service of the given type. This can allow appropriate resources for a service to be allocated efficiently. Preferably, the system comprises a resource allocation component arranged to allocate resources to a new service from an application in accordance with a resource allocation profile relating to the service, and to record the allocation in the resource allocation information (in the model). This can simplify service provisioning.

The database may define, for an application, one or more application interfaces. This can provide greater flexibility in modelling application and application services; individual service instances may, for example be associated with a specific interface of an application. To provide further flexibility, the database may define associations between applications, an association between a first and second application indicating one or more of: the second application being a component of the first application; and the first application depending on functionality provided by the second application. In this way, application interdependencies and hierarchies may be modelled.

The database preferably defines one or more software components, and associations between applications and software components utilised by the applications. This allows for a more detailed representation of applications; for example, where software components are shared between applications, this can be accurately represented. Preferably, the database defines an association between a software component and a logical environment to indicate utilisation by the software component of the execution context and associated resources represented by the logical environment. Similarly, resource consumption by the application from the software component may be modelled. Resource consumption can thus be mapped from the application right down to the underlying resources, through the application/software component layers of the model hierarchy. The term "software component" preferably refers to a unit of software that provides functionality for use by applications in the resource infrastructure but is not itself an application, for example a process, a thread, an executable, an API, a code library, or a dynamic library.

Resource capacity information or allocation/consumption information for a given model object (e.g. a physical or logical resource, software component, application etc.) may comprise a number of capacity parameters, each defining a resource quantity for a different aspect of resource capacity (e.g. storage and bandwidth aspects). These may be stored together in a capacity or consumption profile.

The database may comprise metadata relating to the model, preferably defining one or more of: types of model objects; types of relationships between model objects; permitted relationships between model objects; default attributes for model objects. This can allow the model to be configured for different environments.

The database may further define redundancy relationships between entities in the model, preferably between resources or logical environments.

The system preferably further comprises a user interface for modifying the infrastructure model defined in the database.

Preferably, the system comprises a processing component for analysing the model to determine resource utilisation information relating to the resource infrastructure, for example to determine a resource shortage or resource surplus. The model can thus be a useful tool for infrastructure planning.

The system may comprise a processing component for analysing the model to determine, for a resource malfunction relating to a resource of the resource infrastructure, one or more applications or application services affected by the malfunction. This is possible due to the resource consumption dependencies represented in the model. The system may further comprise a processing component for analysing dependencies between applications or software components.

The system may comprise a service provisioning component for provisioning services in dependence on capacity information in the model, and/or an infrastructure planning component for analysing capacity information in the model to generate planning data.

In a further aspect, the invention provides a method of processing capacity information relating to resource capacity provided in a computing infrastructure, the method comprising: storing a model of the computing infrastructure, the model defining components of the infrastructure, and software provided to operate in the infrastructure, the software using components when operating; associating capacity information with components, the capacity information defining resource capacity made available by components; and associating consumption information with software, the consumption information defining resource consumption by the software from the resource capacity made available by the components.

The consumption information preferably defines a capacity allocation to the software from resource capacity made available by the components. The model preferably defines one or more software components, and resource consumption by the software components from the infrastructure components. The model preferably defines an application, the application being associated in the model with one or more software components utilised by or forming part of the application. The consumption information preferably defines resource consumption by the application from one or more software components. The software components may comprise processes.

In a further aspect, the invention provides a method of processing capacity information relating to resource capacity provided in a computing infrastructure, the method comprising: storing a model of the computing infrastructure, the model defining: components of the infrastructure, one or more software applications provided to operate in the infrastructure; and one or more processes, the processes forming part of applications; associating capacity information with a process, the capacity information representing resource capacity made available by the process to applications; and associating consumption information with an application, the consumption information defining resource consumption by the application from the resource capacity made available by one or more processes. The method preferably further comprising associating consumption information with a process, the consumption information defining resource consumption by the process from resource capacity made available by one or more infrastructure components.

By modelling capacity information for processes forming part of applications, dynamic resource requirements for applications can be captured. The processes may be distributed across separate computing platforms or environments, e.g. across separate servers. Process resources may relate both to run-time resources (e.g. RAM) and off-line resources (e.g. permanent storage). Resource allocations to processes or from processes to applications may be based on long-term estimates, as such dynamic resource requirements may not be known accurately in advance.

In a further aspect of the invention, there is provided a method of managing redundant components in a computing and/or communications resource infrastructure, the method comprising: storing in a database a model of the resource infrastructure, the model defining: a set of components of the infrastructure; and one or more redundancy relationships between components. This can allow resilient infrastructures to be modelled. Preferably, this aspect may be combined with previous aspects of the invention, to allow modelling of redundancy relationships and resource capacity in a combined model.

The set of components may comprise one or both of physical components (for example one or more of computing devices, computer terminals, servers, storage devices, peripheral devices, network devices, network connections, and subcomponents of computing or network devices.) and logical components (for example, one or more of logical resources, logical environments or processing contexts, software components, applications, and application interfaces).

The method preferably comprise defining in the model one or more redundancy groups, a redundancy group being associated with a plurality of components and representing a redundancy relationship between the components. This may, for example, indicate that a redundant component can be used in place of another in the event of malfunction.

The method may comprise defining, for each component in a redundancy group, a redundancy behaviour. The redundancy behaviour may be one of: redundant, indicating that the component is a redundant component whose function can be fulfilled by another component in the group; critical, indicating that the component is a critical component whose function cannot be fulfilled by another component in the group; and critical/redundant, indicating that the component fulfils a critical role in relation to at least a first application or service using the component and a redundant role in relation to at least a second application or service using the component.

Preferably, the method comprises defining in the model applications operating in the modelled infrastructure, and associating applications in the model with components utilised by the application.

The method preferably further comprises analysing the model to determine one or more applications or services affected by a malfunction of one or more given components, preferably in dependence on one or more redundancy relationships or redundancy groups defined for the one or more given components, and preferably in dependence on redundancy behaviours defined for components in redundancy groups.

In a further aspect, the invention provides a method of processing capacity information relating to resources in a computing and/or communications resource infrastructure, the method comprising: storing in a database a model of the resource infrastructure, the model defining a set of resources provided by the infrastructure, and a set of resource consumers, the resource consumers utilising resources; defining associations between given resource consumers in the model and given resources to indicate utilisation of the given resources by the given resource consumers; associating capacity information with resources, the capacity information specifying, for one or more given resources, a resource capacity provided by those resources; and defining, for a given association between a resource consumer and one or more resources, a resource quantity consumed by the resource consumer from the associated one or more resources.

The method preferably further comprises defining in the model one or more logical resources, each logical resource being associated with one or more resources. The method preferably further comprises defining capacity information for the logical resource, the capacity information defining a resource capacity provided by the resources associated with the logical resource. Defining an association between a resource consumer and one or more resources preferably comprises associating the resource consumer with a logical resource, the logical resource being associated with the one or more resources.

Defining a resource quantity consumed preferably comprises defining a resource quantity consumed by the resource consumer from the logical resource. The method may comprise associating a logical resource in the model with one or more other logical resources, to allow a hierarchy of logical resources to be modelled.

In a further aspect, the invention provides a method of processing capacity information relating to resources in a computing and/or communications resource infrastructure, the method comprising: storing in a database a model of the resource infrastructure, the model defining: a set of resources provided by the infrastructure; a set of logical resources, the logical resources representing resource capacity provided by resources; and a set of resource consumers, the resource consumers utilising resources; defining associations between a logical resource in the model and one or more given resources represented by the logical resource; defining associations between a given resource consumer in the model and one or more logical resources to indicate utilisation of the logical resources by the given resource consumer; associating capacity information with a logical resource, the capacity information specifying a resource capacity provided by the resources associated with the logical resource; and defining, for an association between a resource consumer and a logical resource, a resource quantity consumed by the resource consumer from resource capacity provided by the associated logical resource.

The method preferably comprises defining in the model, for a logical resource, a plurality of partitions, each partition representing a portion of the resource capacity provided by the logical resource. This can provide more flexibility in modelling capacity consumption and can enable more effective capacity management. The method preferably comprises associating a resource consumer in the model with a logical resource partition to indicate utilisation of resource capacity by the resource consumer from the associated partition. Preferably, the method comprises defining, for an association between a resource consumer and a logical resource partition, a resource quantity consumed by the resource consumer from the associated partition.

Preferably, the method comprises defining, for a logical resource or logical resource partition, a resource quantity made available by the logical resource or logical resource partition to resource consumers. The resource quantity made available may be different from a resource quantity allocated to the logical resource from resources represented by the logical resource. The method may comprise specifying, for a logical resource or logical resource partition, a modifying factor, indicating that the resource quantity made available by the logical resource or partition is a fraction or multiple of a resource quantity allocated to the logical resource from resources represented by the logical resource. The modifying factor may be an overbooking factor.

In the various aspects set out above, the model and in particular the capacity information stored therein can enable a number of useful processes to be implemented.

Preferably, the method comprises analysing the model to determine resource utilisation information relating to the resource infrastructure, for example to determine a resource shortage or resource surplus. The method may comprise analysing the model to determine, for a resource malfunction relating to a resource in the resource infrastructure, one or more resource consumers affected by the resource malfunction.

Preferably, the method comprises receiving an allocation request to allocate capacity for a resource consumer having one or more resource capacity requirements; selecting from the model one or more resources capable of providing the required resource capacity, in accordance with capacity information in the model and the resource requirements; and modifying the model so as to allocate resource capacity to the resource consumer from the selected resources. This can enable automation of service provisioning processes.

The resource consumer may be an application service, the method then comprising selecting an application to provide the application service in dependence on capacity information defined for the application. The resource consumer may alternatively be an application, the method comprising selecting one or more software components or logical environments in dependence on capacity information. Preferably, the method comprises adding one or more resources to the model or infrastructure if, in the selecting step, resources capable of providing the required resource capacity are not found. The resources added may themselves be resource consumers from lower-level resources, and so the procedure may be repeated for those newly added resources.

The method may comprise: receiving one or more service definitions, each specifying capacity requirements for a service; receiving service projection data relating to the one or more services; and calculating projected capacity requirements by reference to the service definitions and service projection data. The method may further comprise comparing the projected capacity requirements to capacity available in the infrastructure using capacity information in the model. Preferably, the method comprises generating planning information relating to the addition of new resources in dependence on the projected capacity requirements or the outcome of the comparison.

The resource infrastructure may comprise a communications network, the resources may comprise network devices and/or network connections in the communications network, the capacity information may relate to data capacity or bandwidth, and the resource consumers may comprise data circuits or data flows in the network and/or end-user communications services provisioned to users of the communications network.

Alternatively or additionally, the resource infrastructure may comprise an IT infrastructure, the resources may comprise one or more of: computing devices, storage devices, network devices, peripheral devices and other IT or communications devices; and the resource consumers may comprise software applications provided using the IT infrastructure and/or application services provisioned to users of the IT infrastructure.

In a further aspect, the invention provides a computer program product comprising software code adapted, when executed on a data processing apparatus, to perform a method for managing resources in a computing and/or communications resource infrastructure, the method comprising storing in a database a model of the resource infrastructure, the model defining: a set of resources provided by the infrastructure; a set of software applications operating within the infrastructure and utilising resources; and associations between given applications in the model and given resources to indicate utilisation of the given resources by the given applications.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Figure 16A:
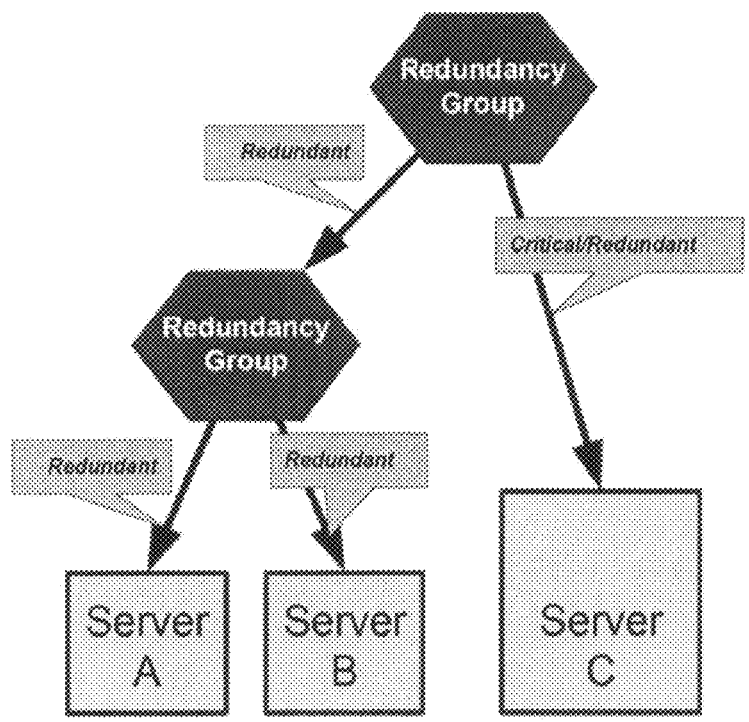
Figure 16B:
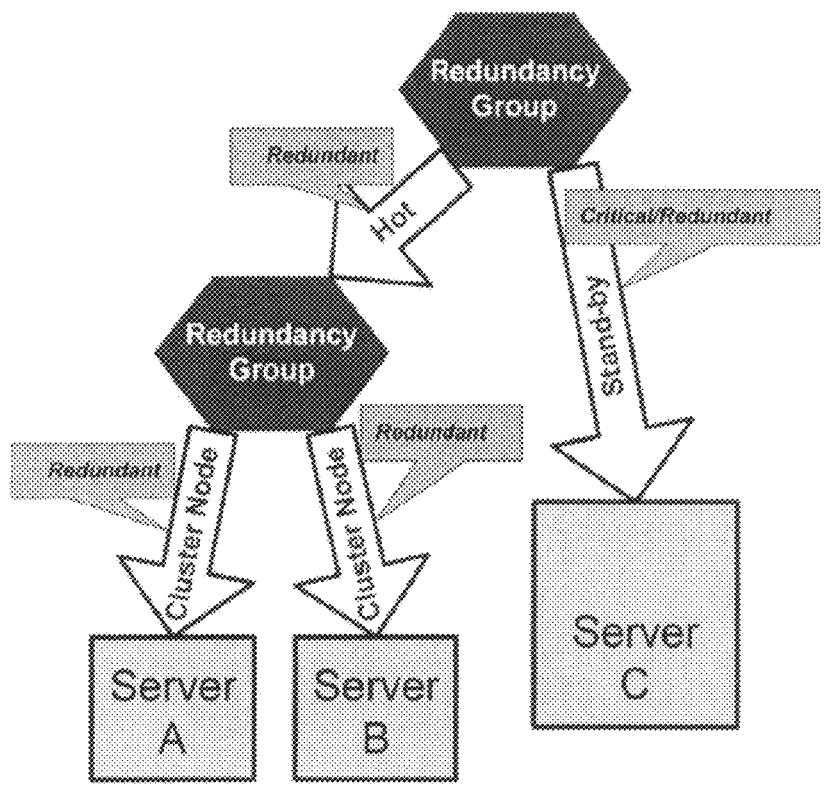
Figure 17:
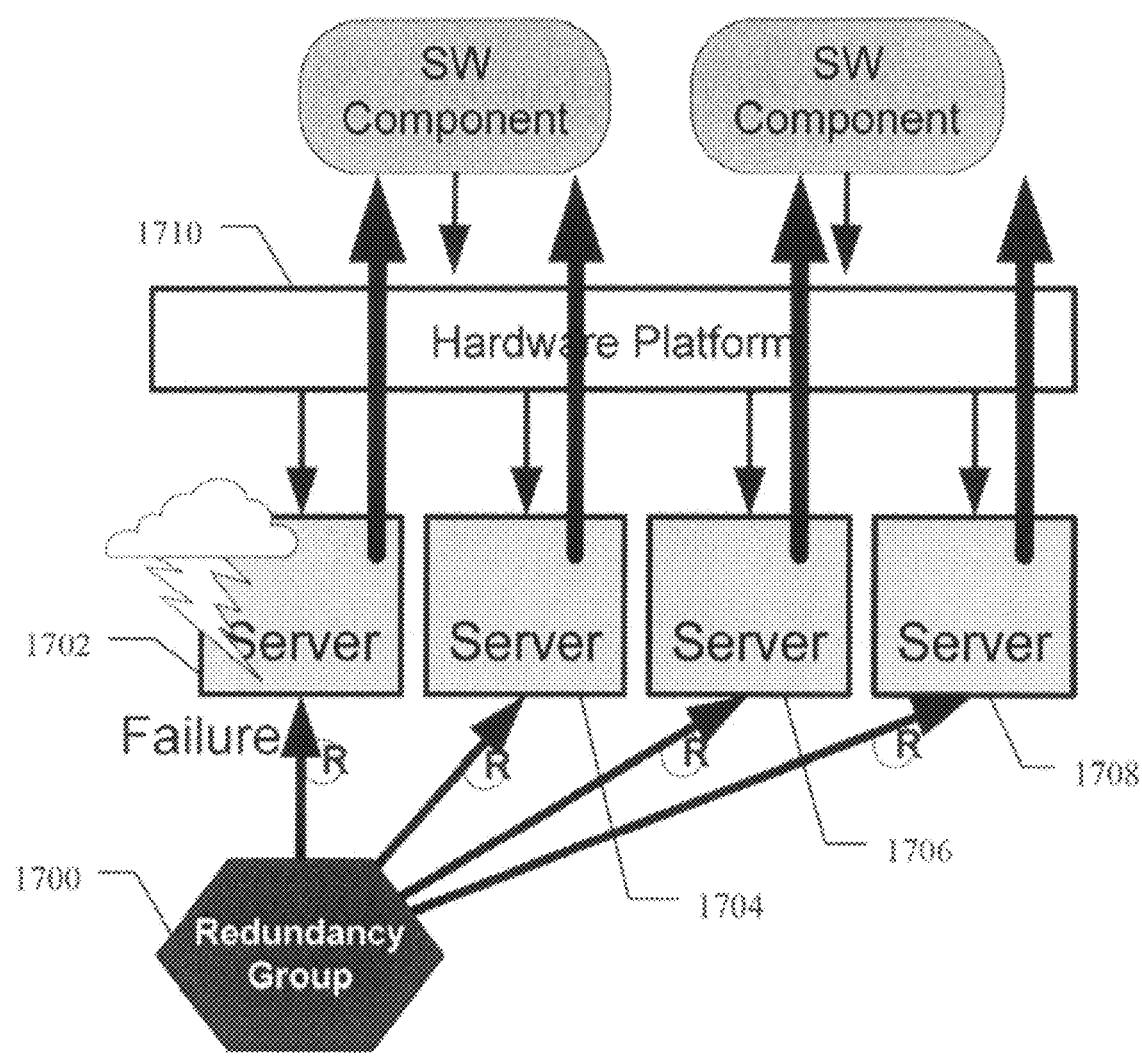
Figure 18:
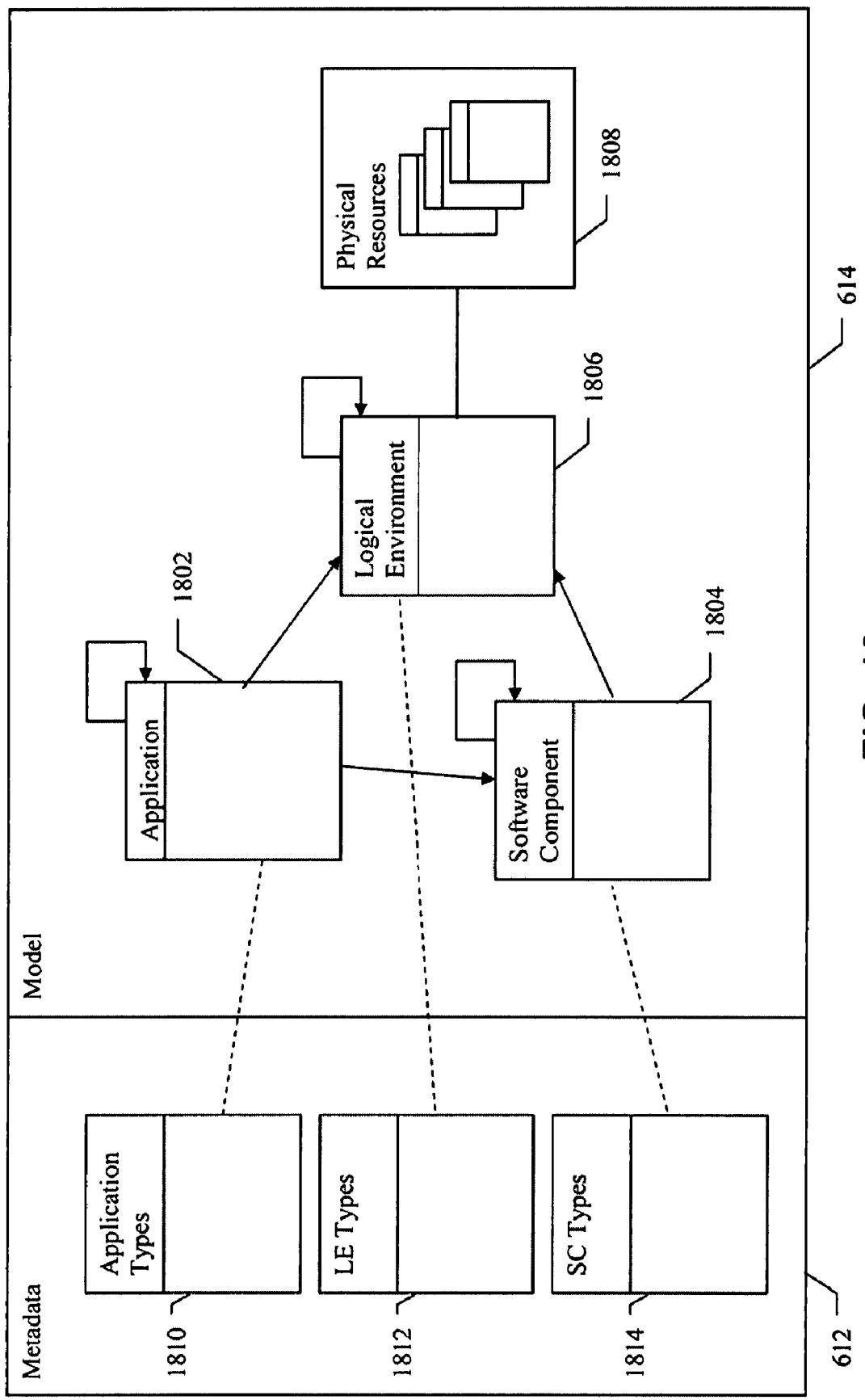
Figure 19:
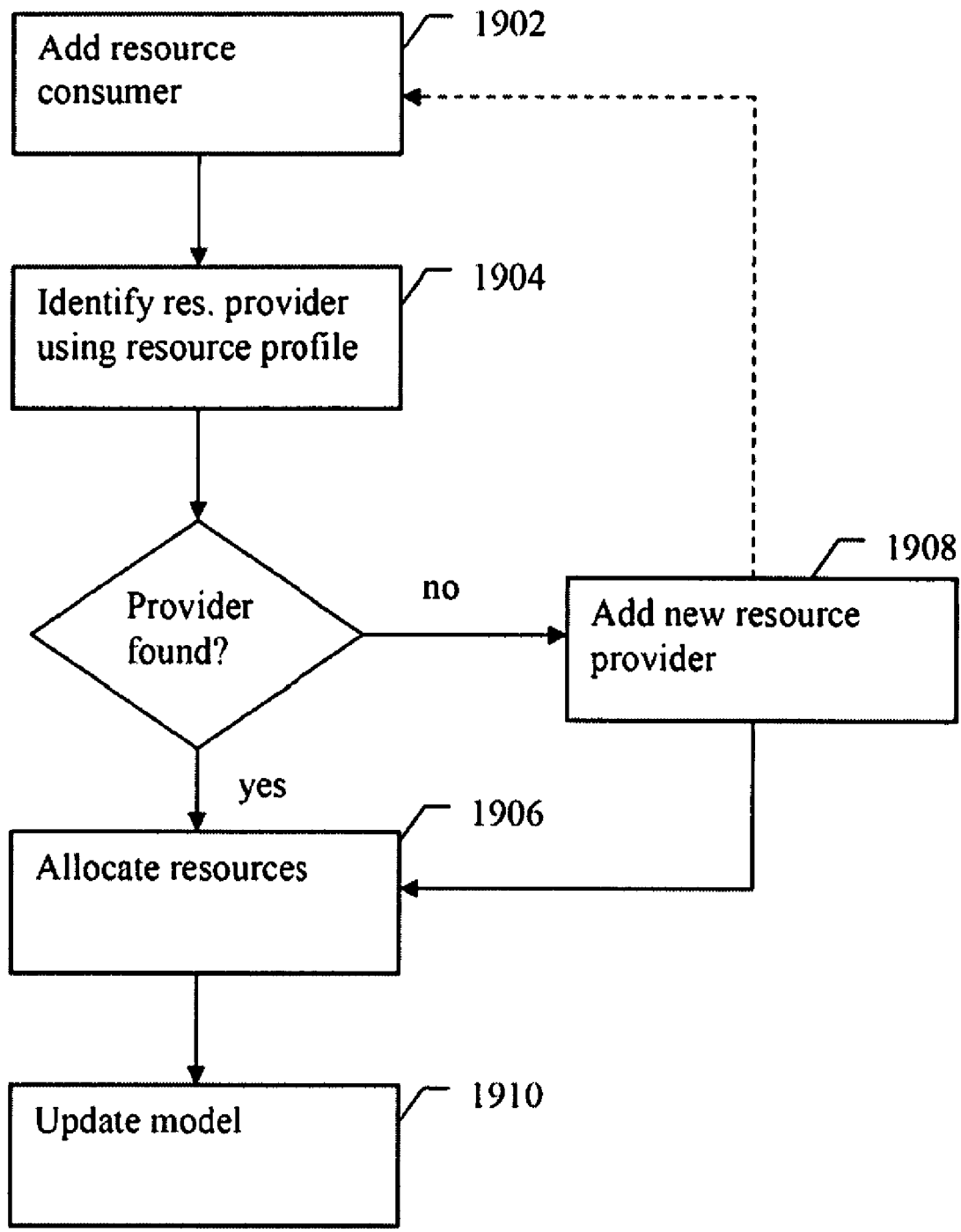
Figure 20:
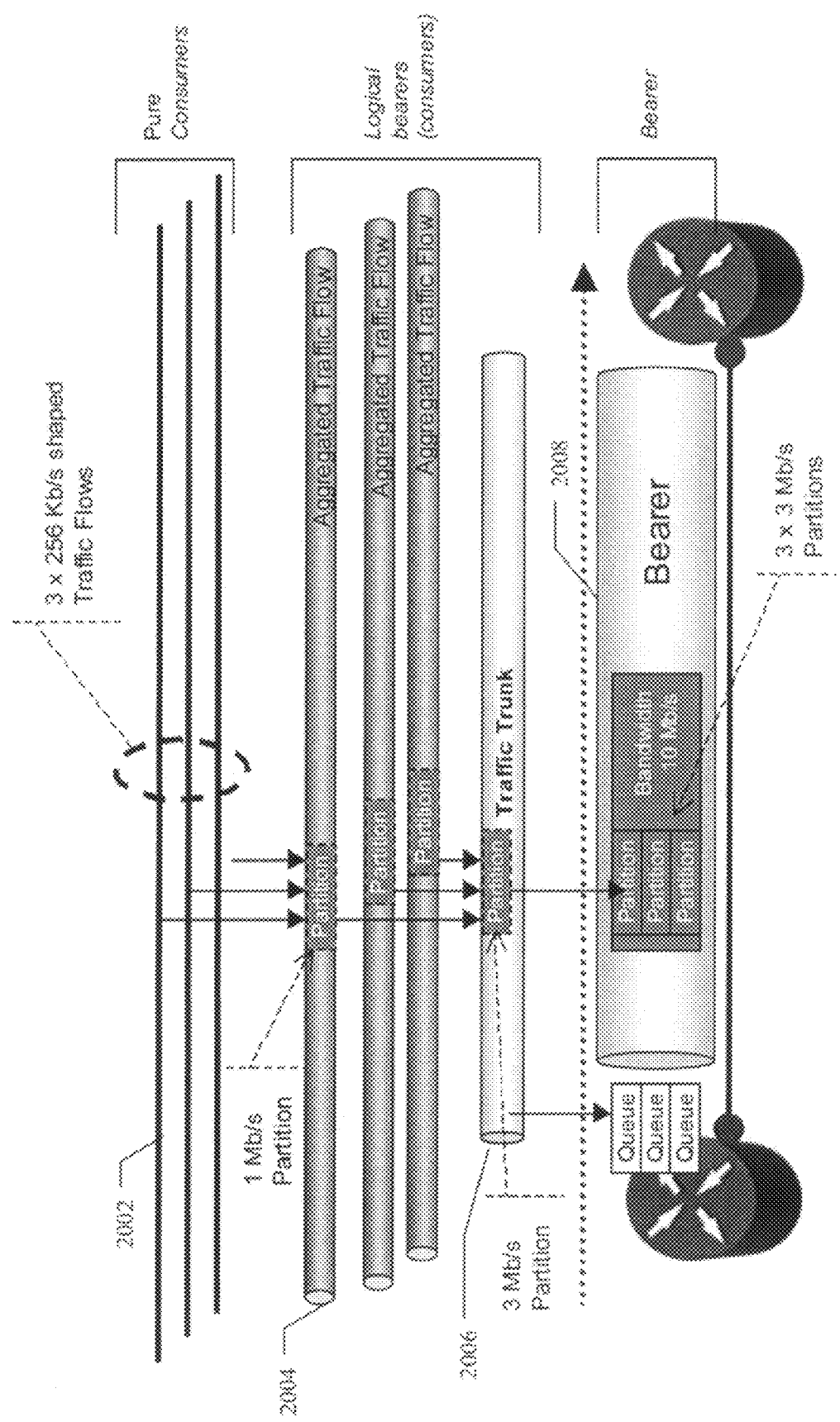

FIGS. 16A and 16B further illustrate modelling of redundancy groups;

FIG. 17 illustrates a failure impact analysis process;

FIG. 18 shows a simplified example of a data model for representing an infrastructure model;

FIG. 19 illustrates a method of allocating resource capacity to a resource consumer; and FIG. 20 illustrates modelling of data capacity in data networks in accordance with a second embodiment of the resource management system.

OVERVIEW

Embodiments of the present invention provide a resource management system for IT and communications infrastructures and networks. The resource management system maintains an inventory (or model) which stores information about the managed infrastructure, including information about the physical resources available, and the utilisation of those resources by applications and services.

Figure 1:
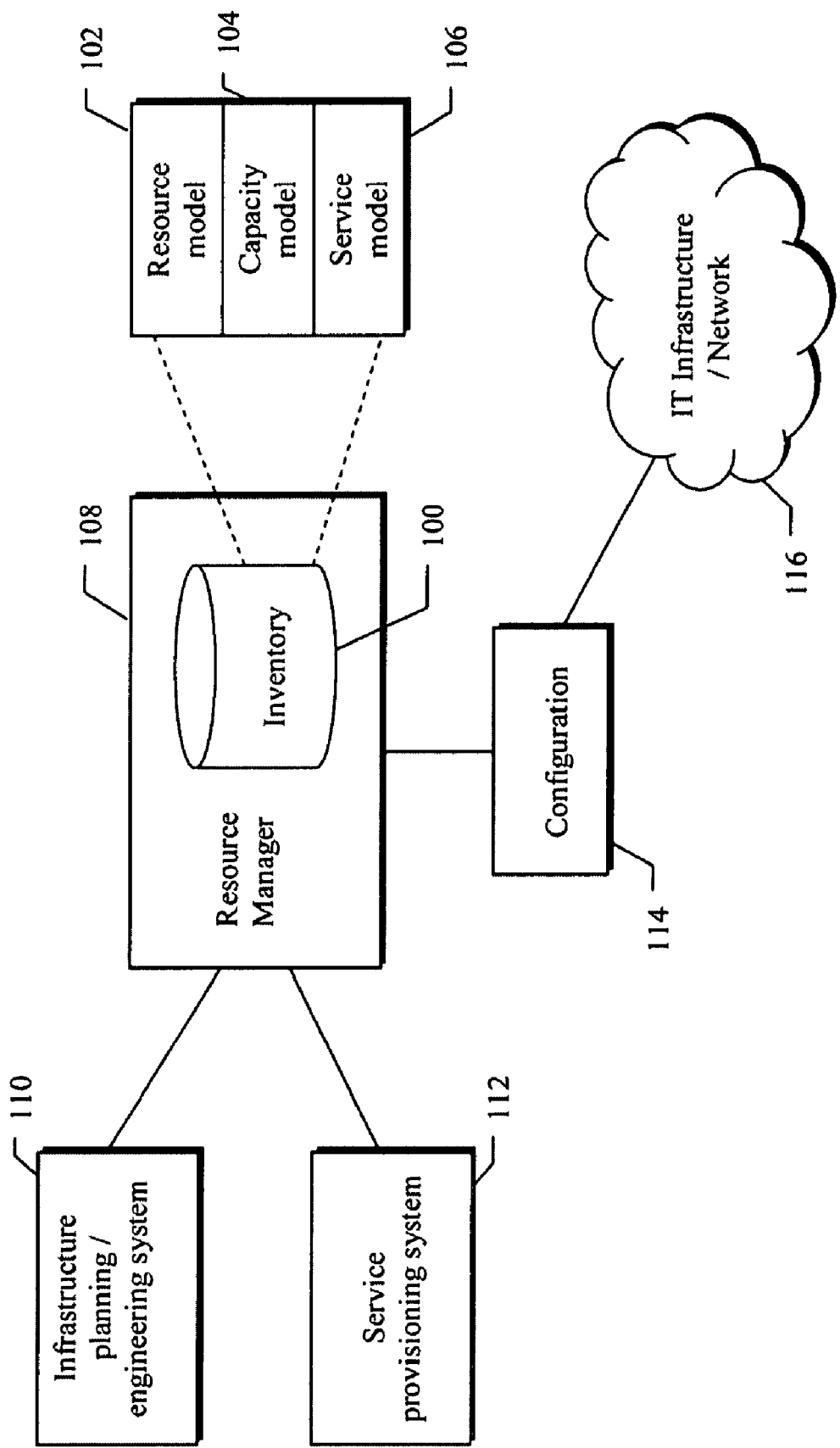
FIG. 1 illustrates a resource management system in overview.

A resource management system in accordance with an embodiment of the invention is shown in overview in FIG. 1.

The resource management system comprises a resource manager application 108 managing an inventory 100. The inventory 100 includes information describing the resources being managed. In particular, the resources being managed may be part of an IT infrastructure or communications network 116.

Specifically, the inventory 100 includes a model of the infrastructure being managed including its resources and the relationships and interconnections between the resources. For example, the inventory may model an IT infrastructure comprising servers, storage devices, user terminals and connections between them. In another example, the inventory model may model an IP network including, for example, routers and switches, or a mobile telecommunications network including home location registers, short message service centres, base stations, mobile switching centres and the like.

Unless otherwise required by context, the term "resource" as used herein refers to the physical components of the managed infrastructure, such as devices (e.g. servers, terminals, switches, routers), components of devices (e.g. cards, ports), and connections between devices and components. Additionally, the term may refer to logical entities (e.g. virtual servers, logical ports, computing capacity and communications connections across networks) that are useful in modelling the networked communication and information capability. When reference is made to "physical resources", such reference preferably includes logical resources of this kind.

A number of external systems may interact with the resource manager 108 to manage the resource infrastructure. For example, an infrastructure planning or engineering system 110 may be provided to allow additions and changes to the inventory to be specified. A service provisioning system 112 may be provided to allow for the provisioning of services to users of the infrastructure. Examples of other systems include service assurance systems to identify and remedy service problems and billing systems, which make use of inventory data.

Changes made to the inventory 100, for example through infrastructure engineering system 110 or service provisioning system 112, are implemented in the actual resource infrastructure 116 by way of configuration component 114. The configuration component 114 may include automatic processes, manual processes, or a combination thereof. For example, a service provisioning action performed by the service provisioning system 112 may result in a change to a resource configuration modelled in inventory 100. This configuration change may be translated into configuration instructions and transmitted to the relevant resource by the configuration component.

Thus, the inventory provides a model of the infrastructure in terms of the resources and connections or relationships between resources. Configuration information for resources may also be defined in the model (e.g. configuration parameters for a router). This part of the model is referred to as the resource model 102.

The inventory 100 preferably stores additional information about the resource infrastructure being managed, in particular defining the application and communications services that the infrastructure is used to provide. For example, the inventory can model capabilities and capacities associated with resources in the model, and services provisioned to users of the infrastructure, which utilise the resources. Accordingly, in a preferred embodiment, in addition to resource model 102 inventory 100 further comprises a capacity model 104 and a service model 106. The capacity model 104 is associated with the resource model and represents resource capacity provided by the resources in an abstract manner. The service model 106 represent services provisioned to users of the infrastructure or applications operating in the infrastructure and models how those services or applications utilise the resource capacity defined in the capacity model.

The system may additionally provide a product model (not shown) defining the service products or offerings made available to users by the service provider. The product model may be in the form of or comprise a service catalogue defining the types of services available, and may additionally define available implementation technologies that may be used to provide services and other relevant information. Service definitions in the product model or service catalogue preferably comprise capacity requirements for the services (preferably in the form of consumption profiles, described later), defining the resource capacity that should be allocated when a service instance of a given service type is provisioned for a user. Service definitions may additionally include other service parameters, e.g. service quality information. The product model/service catalogue may be part of the inventory 100 or may be separate.

Though the resource model, capacity model and service model could be provided as separate databases, in a preferred embodiment, they are merely separate aspects of a single integrated infrastructure model, and effectively form different layers of that model.

This approach to modelling resource infrastructures will now be described in more detail with reference to FIGS. 2A-2C.

Broadly speaking, the resource model comprises objects representing the resources. Resource objects may be associated with attributes and other related data defining characteristics of the modelled resources and relationships between resources.

The capacity model comprises a logical representation of the resource capacity provided by the underlying resources and provides a layer of abstraction, decoupling the services using resources from the specifics of the physical arrangement of the resources. In a preferred embodiment, this logical representation is provided by way of a set of capacity objects defining logical resources. These may, for example, define groupings of related resources and also define capacity information associated with resources (for example, storage or bandwidth quantities). Additional objects in the capacity model may define relationships between (logical) resources. As an example, redundancy relationships between resources can be modelled (for example main/backup servers).

The service model models services provided using the modelled infrastructure. In this context, the term "service" refers to any consumer of resource capacity, and services may take different forms depending on the type of infrastructure being modelled and the intended use of the model. For example, when managing IT services of an IT infrastructure, services may take the form of software applications; the applications make use of (consume) the underlying resources to provide some application functionality. In an IP networking environment, services may take the form of data circuits or connections (e.g. a Virtual Private Network); the data circuit or connection is provisioned between certain end points in the network to carry traffic for some purpose and may utilise various physical connections, routers and the like of the underlying physical network.

Services may also represent actual services provided to users of an IT infrastructure or communications network. For example, an Internet access service may be modelled as a service, and may utilise a variety of different resources in the network, including both connections (e.g. circuits) and application services (e.g. authentication, content delivery). In such examples, connections and applications may themselves be modelled as resources, or may be lower-level services in a service hierarchy.

Thus, the application of the three-tier model is implementation-dependent. In general terms, the resource model models the resource providers, whilst the service model models the resource consumers, and the capacity model defines the abstraction layer between. FIGS. 2A-2C show some generalised examples of infrastructure models using this structure.

Figure 2A:
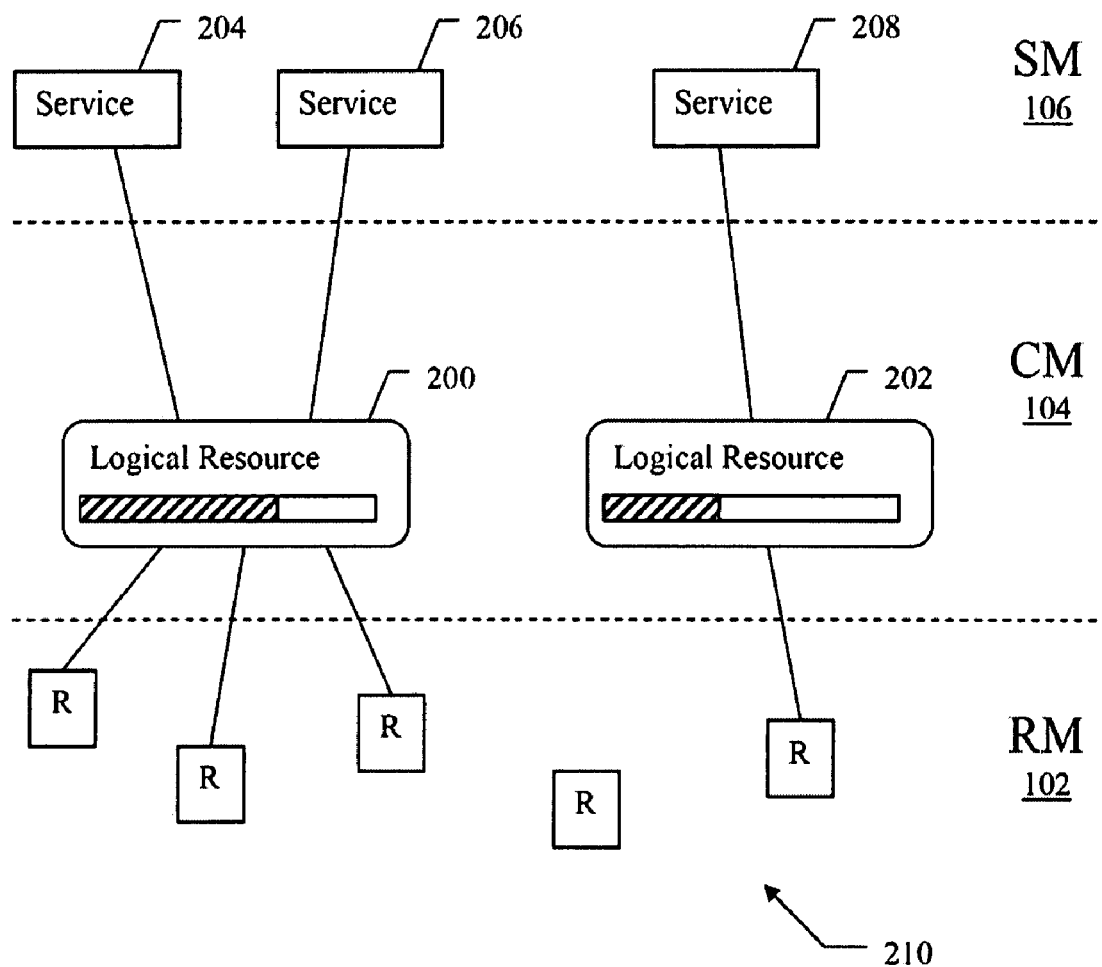
FIGS. 2A, 2B and 2C illustrate modelling of resource capacity.

FIG. 2A shows a simplified example of an infrastructure model comprising resource model layer 102, capacity model layer 104, and service model layer 106. The resource model 102 defines a number of resources 210 of the resource infrastructure. The capacity model 104 defines a number of logical resources 200, 202 which correspond to the actual resources and represent the resource capacity made available by those resources.

A logical resource may correspond to a single physical resource or may represent a grouping of resources which together can provide some sort of functionality. For example, in a network environment, a logical resource might represent a single physical connection between two points. The physical connection would be able to carry a certain amount of data traffic, and that quality controlled bandwidth would be represented by the logical resource. In another example, in the context of an IT infrastructure, the resource model may model multiple associated storage devices as separate resources (for example forming a storage area network). These storage devices may be represented in the capacity model 104 as a single logical resource.

The service model 106 defines services 204, 206, 208 utilising the resource infrastructure. Given services in the service model may be associated with logical resources in the capacity model to indicate the utilisation of specific resources by those services. For example, in the present example, two services 204, 206 are shown as being associated with logical resource 200. Logical resource 200 in turn is an abstract representation of the resource capacity provided by certain of the resources 210.

Depending on the type of resource being represented, a logical resource in the capacity model preferably defines a measure of the resource capacity provided by the physical resources it represents. Typically, this may be a quantity, such as a storage space amount, bandwidth, CPU time, number of user accounts, number of e-mail addresses and the like.

The association between services and logical resources specifies the quantity of the available resource which is being utilised by that specific service. For example, if logical resource 200 represents 300 GB of storage space distributed across a number of storage devices (of resources 216), a given service may specify an individual allocation of, say, 1 GB from the total available resource quantity. Thus capacity made available by resources, and capacity consumed by services, is explicitly modelled. Analysis of the model then allows a determination to be made, for a given logical resource, of the amount of resource capacity consumed and the amounts still available to new services. Alternatively, the resource utilisation may be explicitly recorded in the logical resource and updated whenever new services are added to the logical resource (or existing services are removed). The utilisation of the resource capacity made available by a logical resource is indicated symbolically in FIG. 2A by way of a partially shaded bar.

The resource capacity represented by a logical resource may simply be the sum total of actual resource capacity made available by the associated physical resources. Alternatively, modifying factors may be associated with the logical resource specifying that the resource capacity made available by the logical resource is different from the total actual capacity provided by the underlying physical resources.

One particular example of such a modifying factor is an overbooking factor. An overbooking factor may be used to specify that the resource capacity made available by the underlying physical resources may be "overbooked", i.e. a greater quantity of resource may be consumed than is actually available. This reflects the real-world situation that resources made available to services are often not fully utilised. For example, when modelling an e-mail service, each e-mail account may be nominally assigned 1 GB of storage space. However, since most users would not actually make use of the full allocation, it would be wasteful to actually reserve that quantity of storage space exclusively for each user, and so the total theoretical resource capacity provided to services is often much greater than the actual physically available capacity (bandwidth overbooking in residential internet access services is another common example). The use of overbooking factors in specific contexts will be described in more detail below. In certain circumstances, a modifying factor could also specify that less than the physically available resource capacity is made available by the logical resource (for example for resilience).

The modifying factor may be derived from a statistical analysis of usage patterns of the real networked resource over a period of time and may need to be varied as usage patterns change, or as service quality offerings are changed. This becomes part of the service and resource management process.

By representing capacity, and the utilisation of capacity in this way, the capacity model becomes a useful tool for analysing available and required resources. For example, an analysis of the capacity model may reveal resource shortages, which can then be addressed by adding resources to the resource infrastructure, or by changing the resource allocation to services.

A logical resource may be associated either with underlying physical resources as in the above example, or other logical resources. The capacity model thus allows a hierarchy of logical resources to be represented. An example of this is shown in FIG. 2B.

Figure 2B:
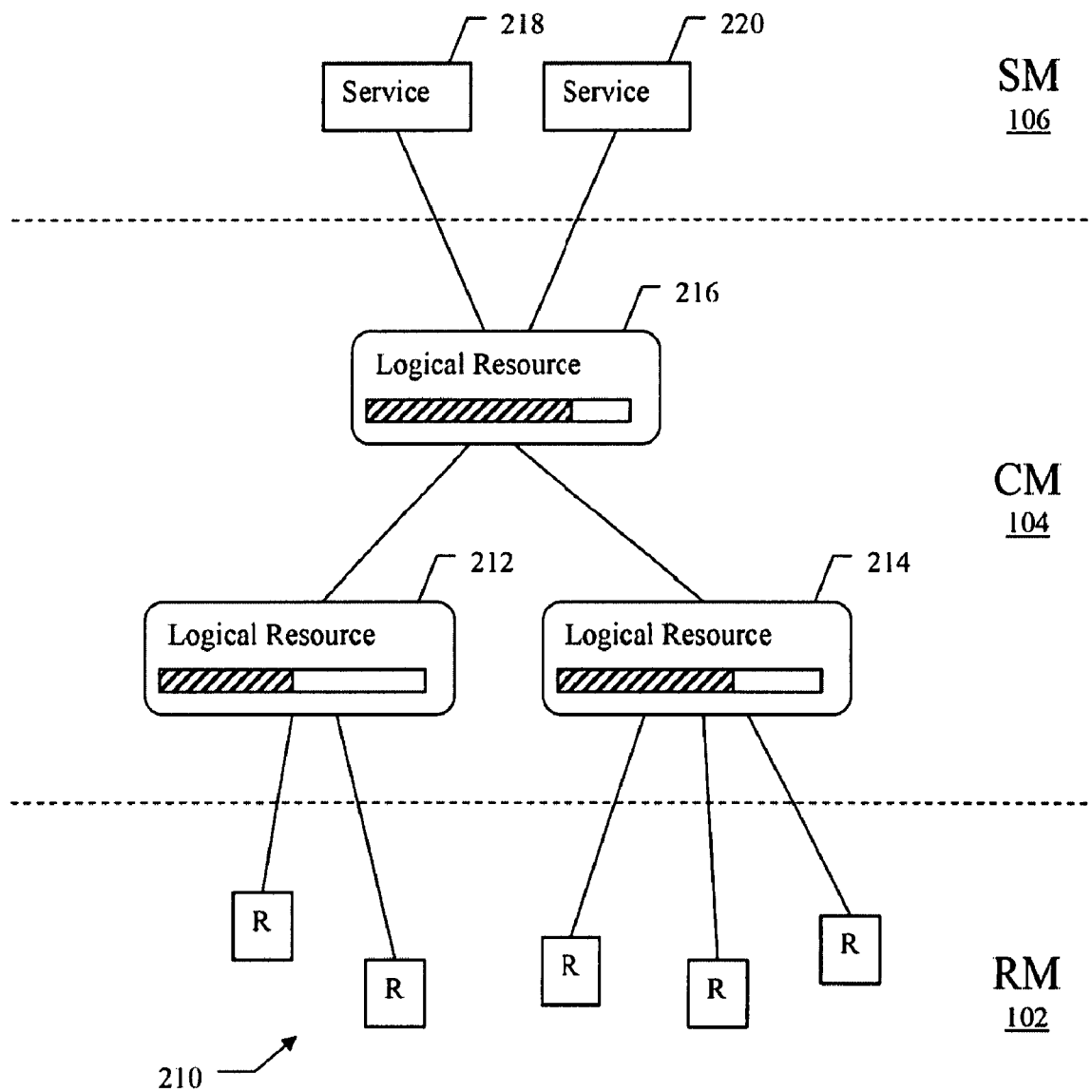

In the example shown in FIG. 2B, two logical resources 212 and 214 are defined to represent physical resources 210. A further logical resource 216 is defined to represent the group of logical resources 212 and 214. Services 218 and 220 are associated with logical resource 216, from which they consume resource capacity. Logical resource 216 in turn consumes capacity from logical resources 212, 214.

In other examples, a logical resource may also be associated with both other logical resources and physical resources.

In preferred embodiments, the capacity model allows the logical resource capacity represented by a logical resource to be divided into a number of separate allocations, referred to herein as partitions. These partitions are represented in the capacity model by resource partition objects which are associated with logical resource objects.

Figure 2C:
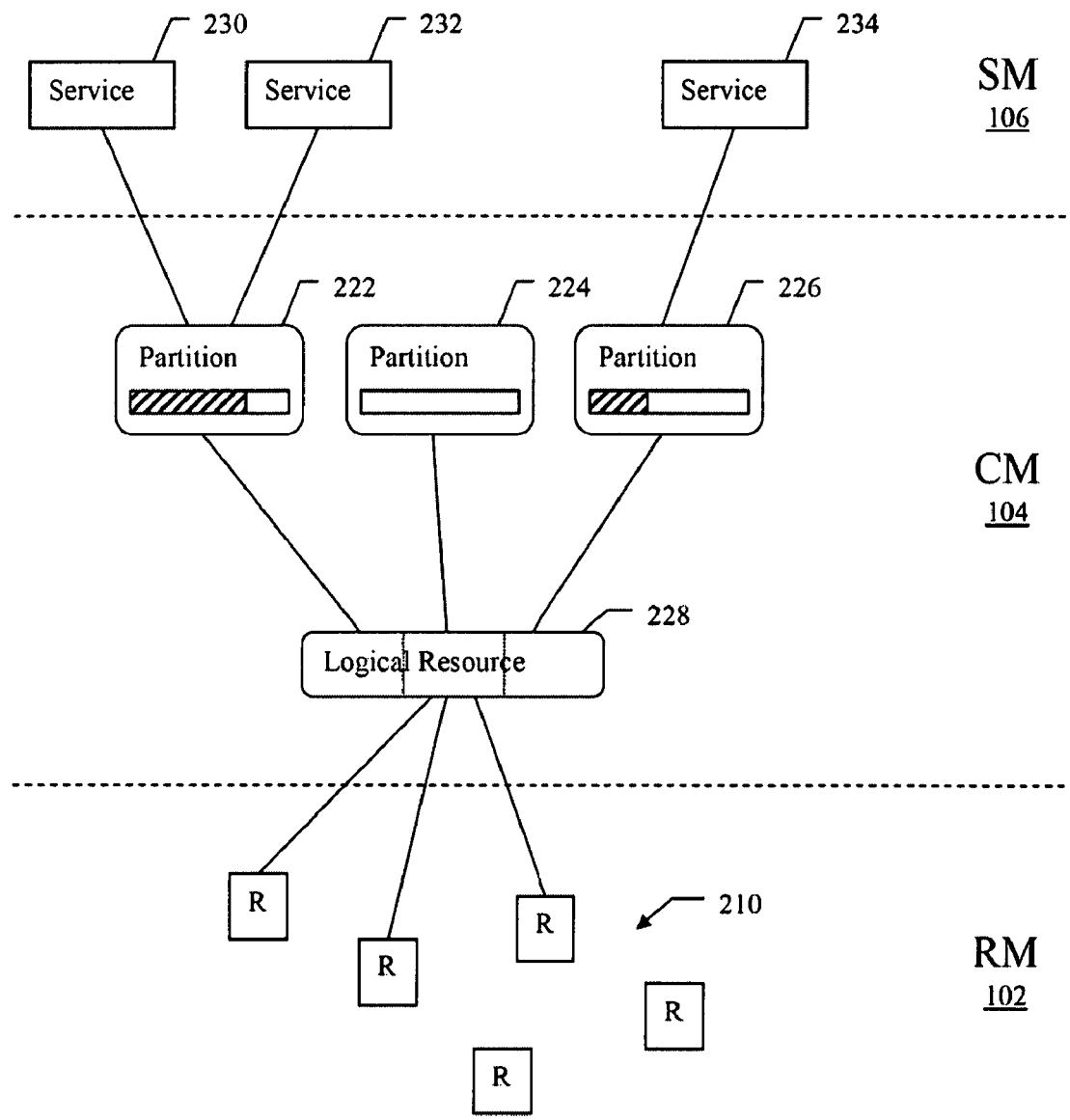

An example of this is shown in FIG. 2C where three partitions 222, 224 and 226 are defined for logical resource 228. Services in turn are associated with partitions to indicate consumption of resource capacity by the given services from the partition. In the present example, services 230 and 232 are allocated to partition 222, while service 234 is allocated to partition 226. Partition 224 does not have any services associated with it.

Each partition represents a fixed allocation of resource capacity from the underlying logical resource. The utilisation of the resource capacity defined by a partition is again indicated in FIG. 2C by way of partially shaded bars. Thus, in the illustrated example, most of the resource capacity represented by partition 222 has been allocated, whilst partition 224 still has its full capacity available.

By explicitly dividing logical resources into partitions, a more flexible model can be provided. For example, each partition may be reserved for a certain type of service. Also, each partition may have different quality of service information defined for it, for example different overbooking factors or other modifying factors.

Figure 3:
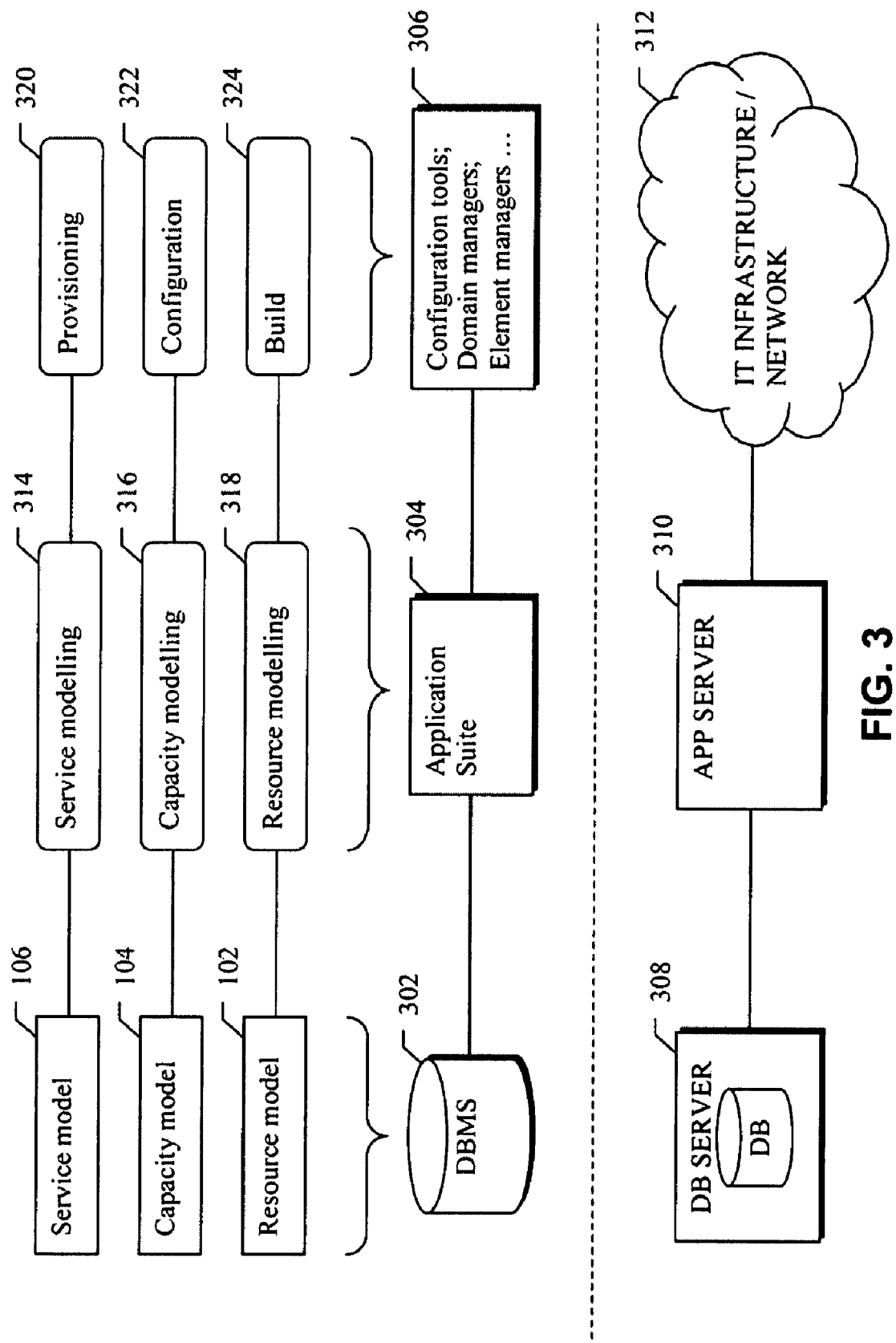
FIG. 3 illustrates elements of a resource management system.

FIG. 3 illustrates components of an implementation of the resource management system in more detail. The implementation comprises an application suite 304, a database management system 302, and a set of configuration tools 306.

The application suite provides user interfaces and processing to support three key processes: resource modelling process 318, capacity modelling process 316, and service modelling process 314.

Resource modelling process 318 includes the definition and modification of resources and their relationships in the resource model 102. Changes made to the resource model may be implemented in the managed infrastructure by way of automatic or manual build processes 324. Thus, for example, the operator may specify the addition of a server to an IT infrastructure or a router to an IP network. The resource model 102 is modified accordingly. The model changes are then used to generate a work order to carry out the installation of the relevant equipment. Other changes in the resource model (typically those requiring only configuration of existing equipment) may be implemented automatically in the infrastructure or network.

Capacity modelling process 316 involves defining and modifying the capacity model 104, for example to define logical resources and the relationships between logical resources and underlying physical resources. Depending on the implementation, the capacity model 104 may be purely abstract and used for capacity management purposes only, so indirectly affecting the configuration of the infrastructure through a translation process. It may alternatively directly affect the configuration of the managed infrastructure as found in traditional service activation processes. For example, capacity partitioning of the bandwidth of a data path may be reflected in the configuration of routers involved in providing the data path. Thus, in some embodiments, changes made to the capacity model may lead to configuration changes in the managed infrastructure by way of configuration process 322.

Service modelling process 314 involves the addition, modification and removal of services to the service model 106. Changes to the service model are implemented in the infrastructure by provisioning processes 320, for example to configure equipment in the infrastructure in accordance with a new service being provisioned.

The application suite 304 may provide one or more applications for carrying out the above tasks. The resource model 102, capacity model 104 and service model 106 are stored in a database managed by database management system 302 (though in alternative implementations the different models may be stored in separate databases). Build processes 324, configuration processes 322 and provisioning processes 320 may comprise a combination of manual and automatic activities, and may be supported by a variety of configuration tools 306, for example network management systems, domain managers, element managers and the like.

The DBMS 302, application suite 304, and configurations tools 306 may be provided in the form of software executing on one or more networked computers. In the illustrated example, the application suite 304 is provided on an application server 310, which is connected to a database server 308 running the DBMS 302. The application server 310 may also be connected directly to management components within the resource infrastructure 312 for performing management and configuration functions, for example using tools 306.

As previously mentioned, the resource management system and capacity model described above can be used to resource manage a variety of different types of IT and communications infrastructures.

Figure 4:
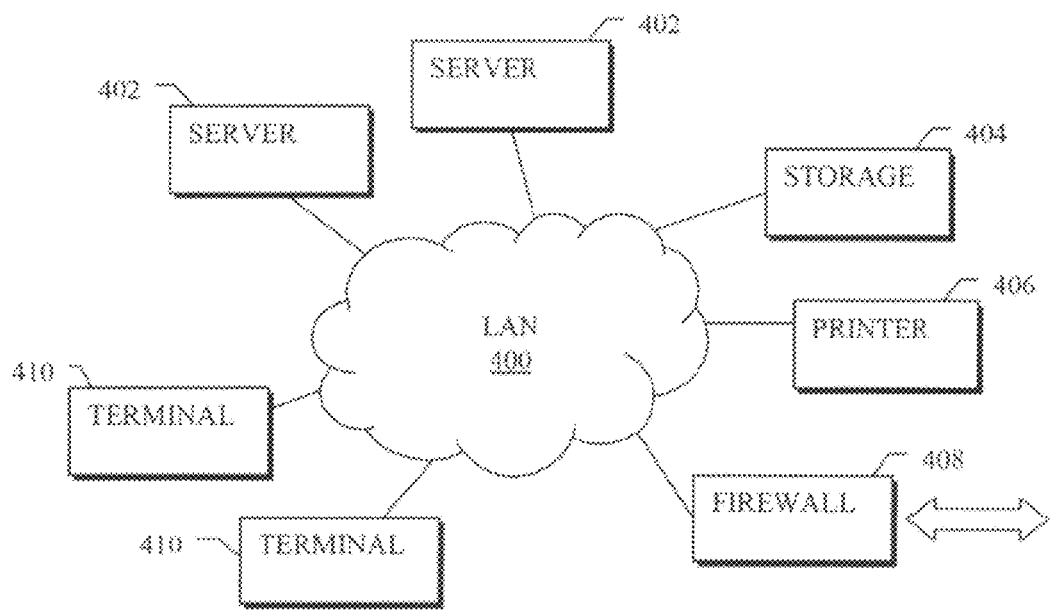
FIG. 4 shows an example of an IT infrastructure.

An example of an IT infrastructure is shown in FIG. 4. The infrastructure includes a number of components, such as servers 402, user terminals 410, storage devices 404, printers 406 and external network interfaces such as firewalls 408. The IT infrastructure may, for example, be a corporate network. The various components of the infrastructure may provide a variety of application services, storage functions and the like to users of the network. For example, an email application executing on an application server 402 may provide email services to users. The resource capacity measures managed by the resource management system in this context might relate to user accounts, email addresses, storage space (for storage of messages), and the like. In another example, a game application may provide game services, with relevant resource capacity measures including CPU processing time and storage space for game state.

Figure 5:
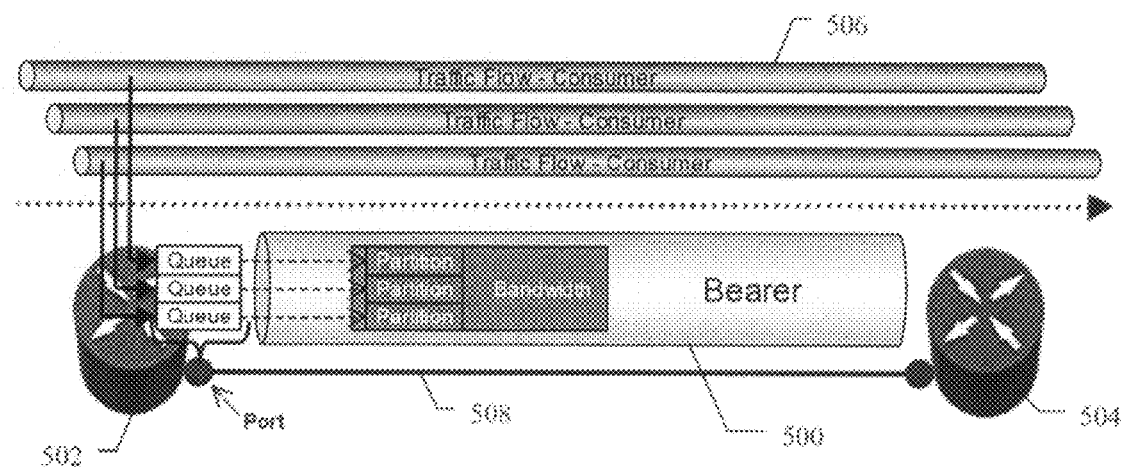
FIG. 5 illustrates modelling of data capacity in a data network.

In a further example, a communications network may be modelled, the communications network comprising network nodes (e.g. routers, switches) and connections between the nodes. In this context, the resource management system may be used to model data capacity of communication paths in the network and to manage allocation of that data capacity (or bandwidth) to communications services provided over the network. An example is shown in FIG. 5, which illustrates the modelling of a physical connection 508 connecting two network nodes 502, 504. The bandwidth resource provided by that connection is modelled by a bearer circuit 500, which may itself be partitioned, as illustrated. A number of traffic flows 506 are modelled as consumers of the bandwidth resource provided by bearer 500. Use of the resource management system to model data capacity will be described in more detail later.

Increasingly, application services are being provided over telecommunications networks, in particular in third generation (3G) mobile telecommunications networks. Thus, examples illustrated in FIGS. 4 and 5 may also be combined to provide for the modelling of communications networks involving both communications and IT infrastructure components, and the management of communications services and application services provided over the network. 3G services such as mobile video-on-demand, which involve both connection components (bandwidth management) and content-delivery components (application resource management) may be managed in this way in a combined manner.

IT Infrastructure Management

An implementation of the resource management system which focuses on modelling of IT infrastructures and application services will now be described in detail. In particular, a variety of model objects and structures will be described which can be useful in modelling a variety of IT infrastructure and service delivery scenarios.

Figure 6:
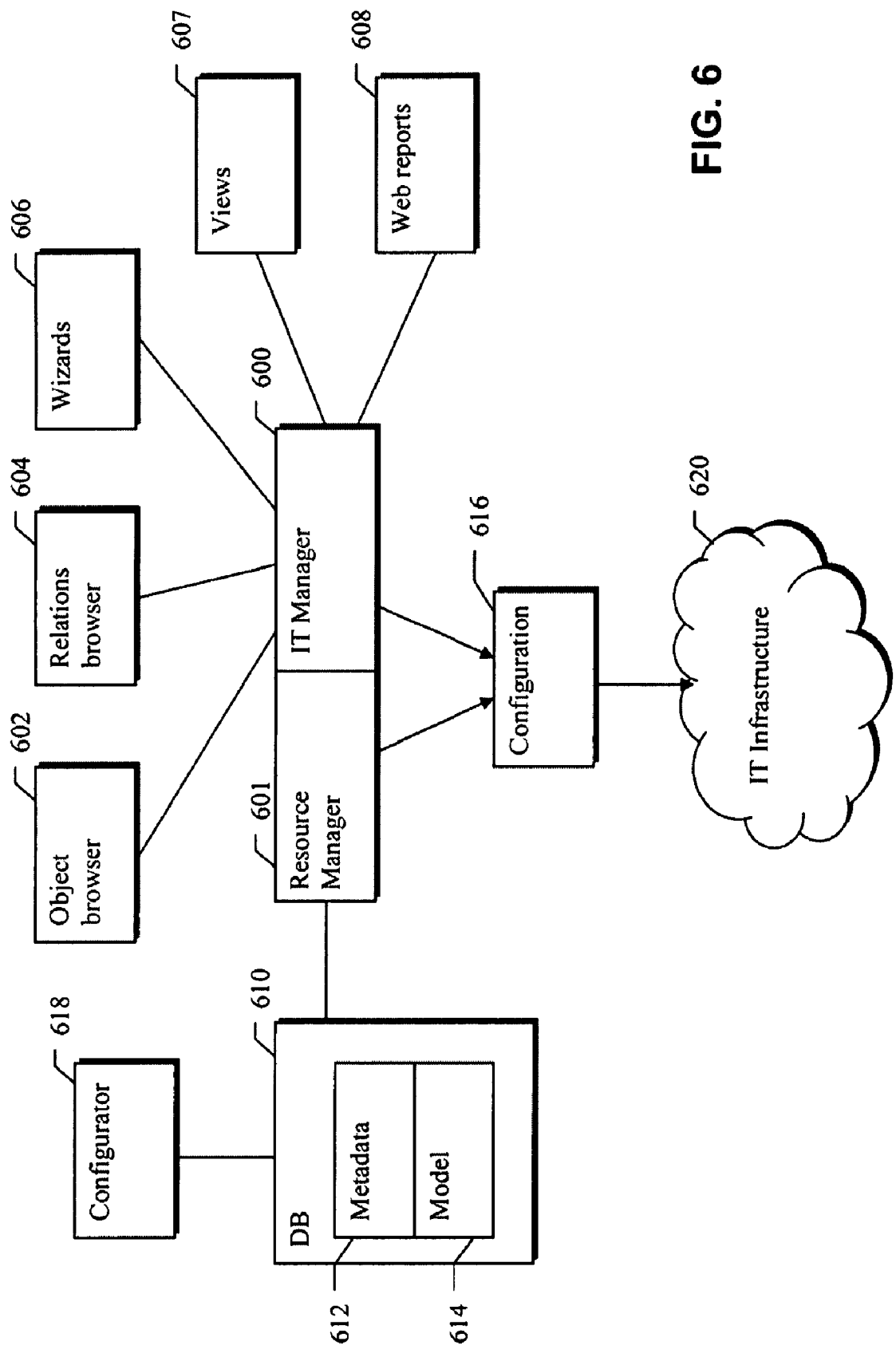
FIG. 6 illustrates components of a first embodiment of the resource management system.

This implementation of the resource management system will be referred to as the "IT Manager" and is illustrated in FIG. 6.

IT Manager 600 models software applications and their supporting IT infrastructure, including, for example, servers, disks, firewalls, platform environments.

In preferred embodiments, the IT Manager is provided as an extension to a basic resource management system referred to herein as the Resource Manager 601, which provides modelling and management of the physical infrastructure or network, in particular IT and networking equipment and network connectivity between the equipment. Resource Manager 601 and IT Manager 600 may alternatively be provided as a single integrated application.

Together, Resource Manager 601 and IT Manager 600 maintain the infrastructure model 614 stored in database 610. This infrastructure model comprises the three layers previously described, namely the resource model, capacity model and service model, with the resource model being managed by Resource Manager and the capacity and service models being managed by the IT Manager extensions. References herein to the model generally refer to the complete model unless the context otherwise dictates.

Database 610 additionally comprises metadata 612. Metadata 612 defines various types of modelling object that may be used in the model 614 and constraints on model object relationships as will be described in more detail later. The metadata may be entered and modified via a separate configurator application 618.

IT Manager comprises a variety of user interface components to allow an operator to view and modify the model and to obtain various useful information about the model. In this example, the user interface components comprise an object browser 602, relations browser 604, wizards 606, views 607 and web reports 608.

Object browser 602 allows a user to view and optionally edit information defining the model objects making up the model 614. Object browser 602 preferably displays a "home page" for a selected model object, the home page listing information defining the model object, such as object name, type and other attributes. From the home page, the user may also navigate to other, related objects in the model.

Relations browser 604 displays information on relationships between model objects, by way of which the user may navigate the model, and may provide a visual representation of the model or portions thereof or specific relationships between model objects. Preferably, the user may also switch from the relations browser to the object browser to display the home page for a given selected object, and may similarly switch from the object browser to the relations browser.

Wizards 606 allow the user to define new model objects and modify existing model objects, in a step-by-step fashion as is known for wizard-style interfaces.

Views 607 provide additional specialised views of the model, focussing on certain aspects thereof. For example, these may include graphical representations of certain model objects or groups of related model objects and their relationships.

Web reports 608 provide reporting functionality, accessible via a web interface, for example to list certain types of model objects, determine dependencies between model objects, and the like.

Other user interface elements may be provided as appropriate. The various described user interface elements are preferably provided as extensions to similar user interface elements of the Resource Manager 601, and provide for seamless navigation within the entire model, including resource, capacity and service model layers.

The IT Manager and Resource Manager can interact directly with the managed infrastructure 620 by way of configuration subsystem 616 (which may also include network discovery/model synchronization functionality).

When applied in a telecommunications environment, IT components modelled in IT Manager can be related to the services and network models defined for the telecommunications network. This can enable management of an integrated model of the service delivery platforms and the content delivery infrastructure for a telecommunications service provider. For the sake of clarity, however, the present description will focus mainly on aspects relevant to application services and IT infrastructure components.

The IT Manager provides a number of features and benefits, including:

- Integrated network, service and IT model: IT Manager enables the relationships and connectivity with the service delivery network to be captured, providing an end-to-end view of connectivity from the content servers to the customer premises.
- Visualization of the server architecture environment: Visualization is useful in understanding the often complex and sophisticated relationships between applications and service delivery platform structures. IT Manager provides an Application View and additional browser capability, which coupled with network resource manager visualizations for physical and logical network connectivity, enables the user to view both the IT infrastructure and how the IT platforms are connected with the network.
- Specification of application capacity: Effective capacity management results in better utilization of IT infrastructure and enables the controlled assignment of applications and services to IT servers and platforms. IT Manager provides the framework for defining capacity attributes on IT infrastructure objects, and for the implementation of business rules controlling the allocation of resources.
- Enhancing service assurance: Understanding the relationship between customers, services, the service delivery platforms and the network infrastructure is a key component of effective service assurance. IT Manager provides an extension to the network resource manager's network-to-service relationship model, enabling the impact of IT infrastructure failures to be understood.

Overview of Modelling Features

From an abstract view, IT infrastructures, as well as data and communications networks, can be viewed as sets of interconnected nodes, with nodes corresponding to computing, networking or storage devices or other pieces of computing or communications equipment. Individual resources in these models will accordingly also be referred to herein as "nodes".

In some cases, sub-components of nodes may also be modelled; for example, in routers or other communications equipment, individual cards and ports may be modelled; similarly CPUs in a multi-CPU server may be modelled as sub-components of the server. The resource model may thus provide a hierarchical view of resources.

Extending the Resource Manager's support for modelling physical infrastructure such as servers, disks and CPU cards, IT Manager provides the capability to group physical devices into platform environments, to capture the logical partitions of platform environments, and to represent applications and their relationship with the underlying platform.

To achieve this, IT Manager provides a variety of modelling concepts and features for use in modelling IT infrastructures, including:

- The Platform Logical Environment
- The Partitioning of the Logical Environment
- Model of the capacity provided by the physical and logical resource layers, in particular by Logical Environments
- Software Components, Applications and Application Interfaces
- Model of the capacity consumed by Software Components, Applications and interfaced applications
- Redundancy Groups.

These modelling concepts will now be described in more detail.

Platform Logical Environment

A Platform Logical Environment is an example of a logical resource as described above with reference to FIGS. 2A-2C.

A Platform Logical Environment represents a logical group or portion of IT resources that software relies on to fulfil its task. More specifically, a Platform Logical Environment typically represents the execution context for an application or other software functions—that is, the physical and logical components of a server platform. These resources, or platform components, can be physical components such as servers and disk arrays, or other Logical Environments.

Figure 7A:
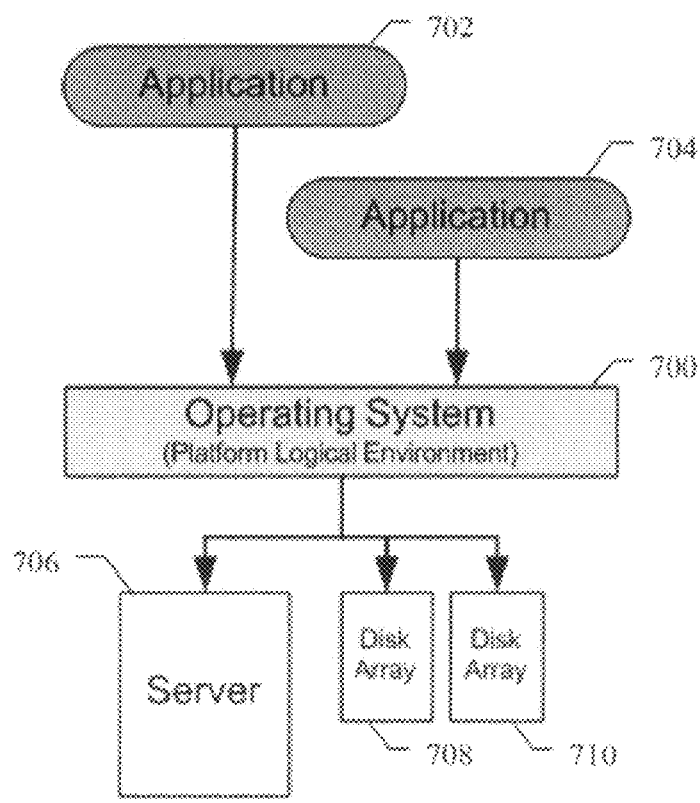
FIGS. 7A and 7B illustrate the modelling of Logical Environments.

In a simple example, a Platform Logical Environment can represent the operating system running on a single server. An example of this is illustrated in FIG. 7A. In this example the Logical Environment 700 is supporting two software applications 702 and 704, and represents a number of underlying resources: a server 706 and two disk arrays 708, 710.

In this model, the applications 702, 704 can be considered resource consumers, and the server and disks 706, 708, 710 can be considered resource providers. The Platform Logical Environment provides an abstraction layer between the two. Thus, the three layers of this model (applications, logical environments, resources) correspond to the three layers of the generalised model described previously with reference to FIGS. 2A-2C. Specifically, applications 702, 704 correspond to the service layer of the generalised model since they consume resources; the Logical Environment 700 corresponds to the capacity layer, since it defines an abstraction of the resource capacity provided by the underlying resources, and the resources 706, 708, 710 correspond to the resource layer.

The relationships defined by the Logical environment between applications and resources also capture the dependency of applications on resources. Such dependency information can be useful, for example, in analysing the impact of equipment faults. For example, the software running in the Platform Logical Environment 700 depends upon all the components of the platform and therefore would be affected by a failure of any of the components (resources 706, 708, 710) that make up the platform.

The components of a Logical Environment can be shared with other Logical Environments, allowing the modelling of multiple Logical Environments that group resources in different configurations.

Figure 7B:
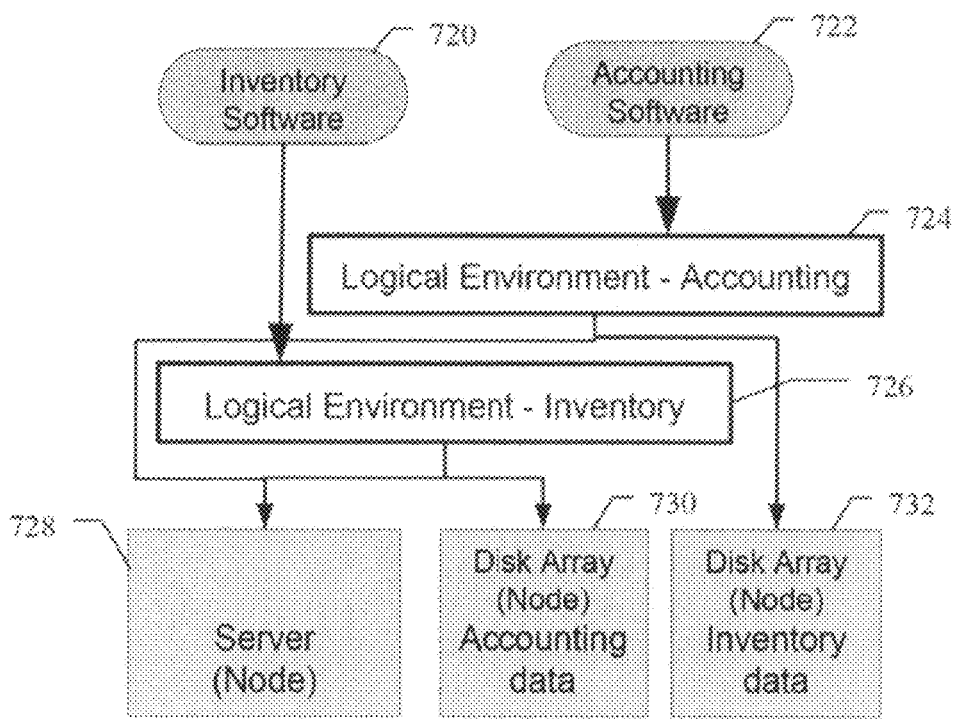

In the above example, the server is physically configured to have access to both disk arrays. However the configuration could be such that the two software applications would access data on separate disk arrays independently. This scenario could be modelled more appropriately with two distinct Logical Environments that more accurately describe the resource contexts within which the two software applications run, and consequently the resources they depend upon. An example is shown in FIG. 7B, where an "Inventory" application 720 and an "Accounting" application 722 are modelled associated with respective Logical Environments 726 and 724. Each Logical Environment makes use of the server node 728, but is associated with a different respective disk array 730, 732.

Logical Environments and Partitions

Partitioning of logical resources has already been described above in general terms. Analogously, a Platform Logical Environment can be divided in the model into multiple Logical Environment Partitions. An example is illustrated in FIG. 8A, in which a Storage Area Network (SAN) is configured to present a number of virtual storage volumes.

Figure 8A:
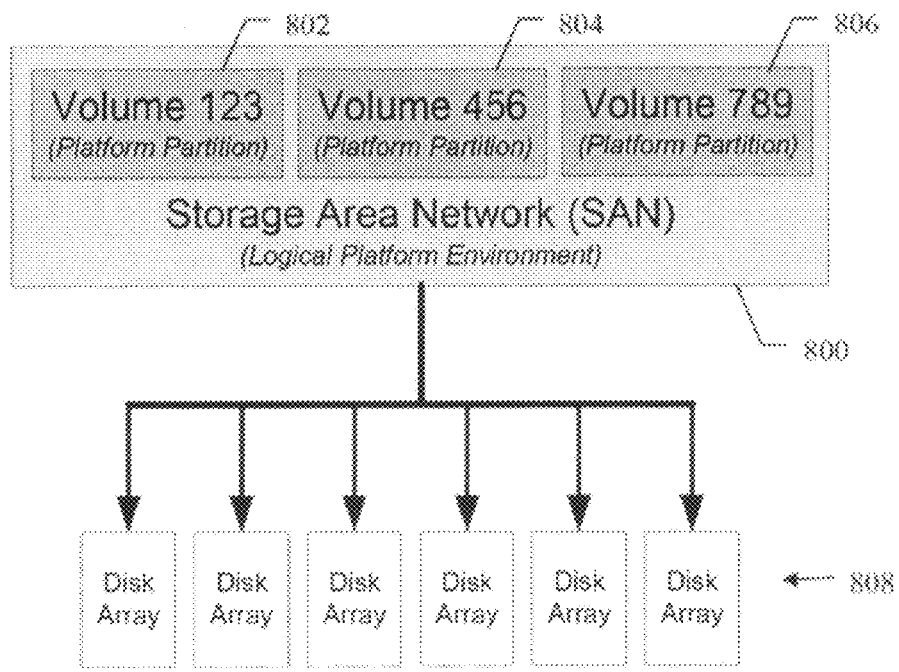
FIGS. 8A and 8B illustrate the partitioning of Logical Environments.

Specifically, as shown in FIG. 8A, Logical Platform Environment 800 represents a storage area network, comprising a number of disk arrays 808. The total storage capacity provided by the disk arrays is divided into a number of partitions 802, 804, 806 representing virtual storage volumes.

Figure 8B:
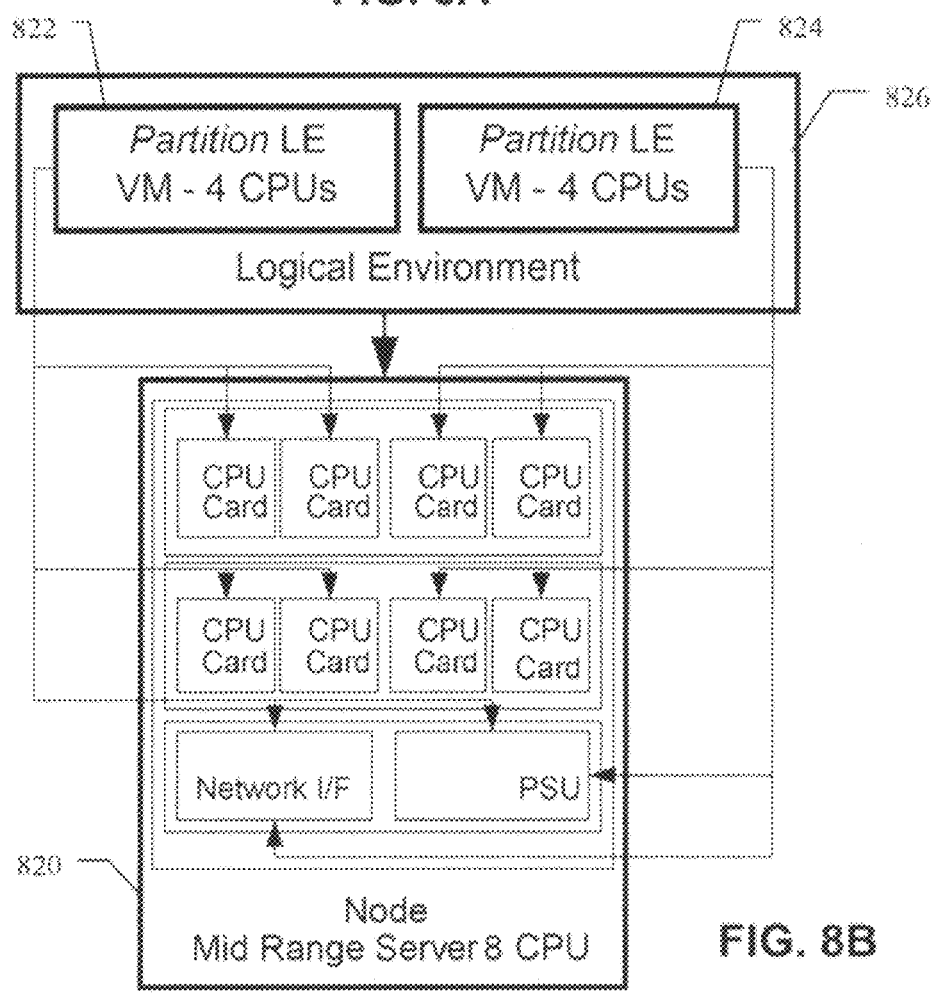

In this scenario there is no direct correlation between the storage volumes and the physical disk arrays; instead, this configuration is dynamically managed by the SAN. However in other scenarios this correlation exists and can be explicitly represented in the model, for example:

CPU Partitioning in Enterprise Servers
LPARs (logical partitions) in Mainframes
Disk Volumes in SANs For this reason the model supports direct relationships between the partitions of a Platform Logical Environment and the related physical objects, e.g. nodes, cards or ports. An example is shown in FIG. 8B.

Here, an 8-way midrange server 820 has been configured to work as two independent 4-way servers in the form of Virtual Machines (VM), modelled as Logical Environment Partitions 822, 824 of Logical Environment 826. This configuration explicitly defines which CPUs are allocated to each VM and what components are shared, such as the Network Interface or the PSU. Therefore each of the Logical Environment Partition objects in the capacity model points to the relevant CPU object in the resource model, the CPU object being a subcomponent of the server object 820.

When partitions are used, applications may be associated either with Logical Environment partitions or with Logical Environments directly.

It a preferred embodiment, Platform Logical Environments and their partitions are both modelled by Logical Environment objects, where a Logical Environment object can be assigned one of two behaviours, namely "platform" and "partition", which are hierarchically related.

As previously described in the generalised examples, Platform Logical Environments and their partitions may be associated in the model with capacity information defining resource capacities made available to applications, for example in terms of storage space, processing time/cycles, transmission bandwidth and the like. When an application is associated with a Platform Logical Environment or Logical Environment Partition, the resource allocation to that application from the Environment or Partition can then be recorded in the model.

Alternatively or additionally, applications themselves may be associated with capacity information, defining in some way the ability of the application to provide application services. For example, an email application may define a capacity of 1000 users, indicating that it is capable of managing 1000 separate user email accounts. Utilisation of those application resources by end-user services may then be recorded in the model in a similar way. By combining both resource capacity and application capacity in the capacity model, a comprehensive view of the capabilities of service delivery platforms can be provided.

Modelling more Complex Environments

Figure 9A:
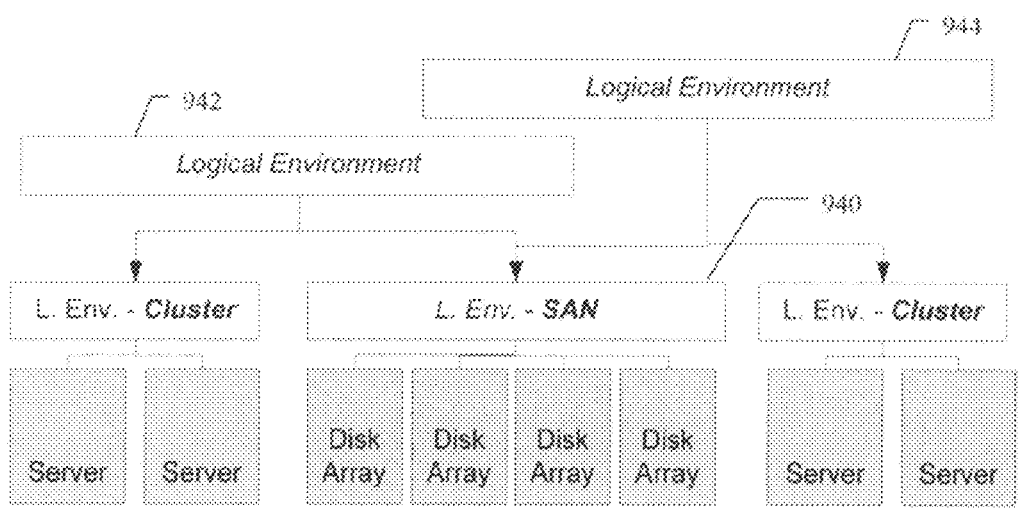
FIGS. 9A and 9B show examples of complex infrastructure models.

As described above, a Logical Environment represents a group of IT resources perceived as a single logical resource by other entities. Therefore a Logical Environment can include other Logical Environments among its components, as exemplified in FIG. 9A, where a Logical Environment 940 representing a Storage Area Network (SAN) is part of two distinct Logical Environments 942, 944 representing separate computing platforms in a cluster configuration.

In this way, the Logical Environment concept allows the modelling of complex IT configurations. The basic hierarchy rules provided by the model are summarised as follows:

Platform hierarchy: A Logical Environment object with "platform" behaviour can be related to Node (resource) objects or Logical Environment objects as "dependant" objects. A Logical Environment with "partition" behaviour cannot (in this embodiment) have "dependant" objects, but can be a "dependant" object for a platform.

Partitioning hierarchy: A Logical Environment object with partition behaviour is related to the Logical Environment object which it is part of as "parent" object.

Partition configuration: A Logical Environment object with partition behaviour can have additional relationships to the physical resource objects (e.g. node, card or port objects) as "configuration" objects.

Figure 9B:
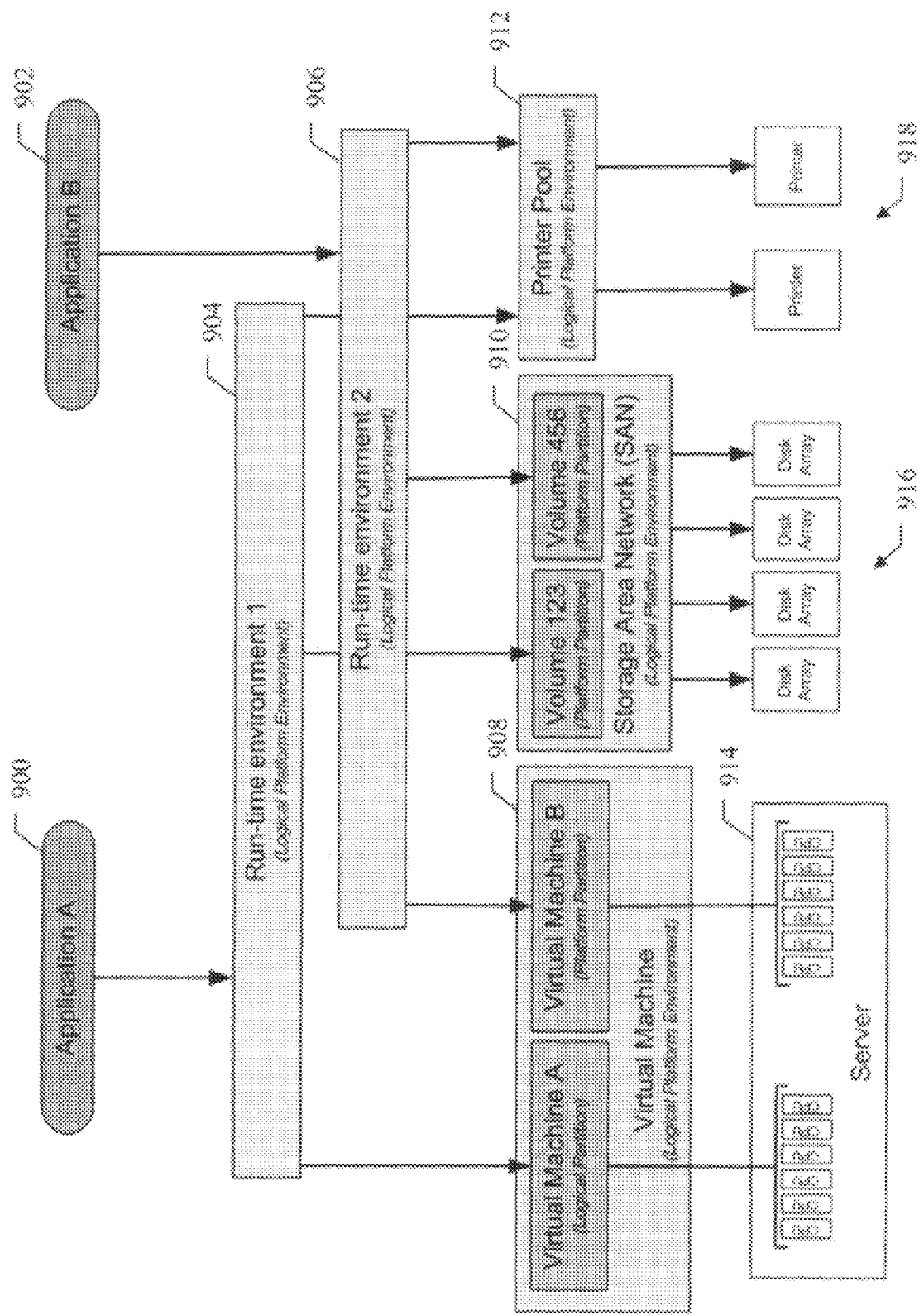

FIG. 9B illustrates an example of a more complex configuration which shows a combination of different types of hierarchical relationships between Logical Environment objects.

In this example, application A (900) and application B (902) are executing in different run time contexts 904, 906 which in turn are built on the same underlying server infrastructure. Specifically, a "Virtual machine" logical platform environment 908 provides two partitions, Virtual Machine A and Virtual Machine B, each corresponding to a respective set of CPUs provided by server 914. A further Logical Environment 910 is associated with a number of disk arrays 916 and provides two partitions representing virtual storage volumes (as in the FIG. 8A example). Finally, a number of printers 918 are represented by a "Printer Pool" Logical Environment 912.

The two Logical Environments 904 and 906 represent runtime environments for applications and are associated with different combinations of these underlying resources, by way of their association with the Logical Environments 908, 910, 912 and partitions defined for those environments. Applications 900 and 902 in turn are associated with respective runtime environments. Thus, application A relies on "Virtual Machine A" and "Volume 123". Application B runs in a different context composed of Logical Environment partitions "Virtual Machine B" and "Volume 456". Both applications are additionally associated with the "Printer Pool" Logical Environment.

Hierarchical relationships between Logical Environment objects generally assume that a Logical Environment can be shared. There might be scenario where this is not appropriate and a Logical Environment, such as a partition, needs to be reserved to a single parent Logical Environment. For this reason a Logical Environment can be set to be "shared" or "exclusive".

For example, in the FIG. 9B scenario, the Print Pool can be set as "shared", but the individual storage volume partitions or virtual machine partitions could be set as "exclusive".

In preferred embodiments, the configuration and customization of Logical Environments is performed through the definition of Logical Environment types. These Logical Environment types form part of the metadata 612 shown in FIG. 6 and discussed in that context. Each Logical Environment type defines characteristics including:

Behaviour
    Partition
    Platform
Allowed relationships with other Logical Environment types, and physical resource component types (e.g. Node Type, Card Type and Port Type)
Attributes
    A configurable set of named values that describe the object
Validation callouts
    Used to add custom business logic that is invoked to validate attributes or to validate hierarchical relationships.

Software Component

The Software Component object represents one or more software instances loaded or running in a run-time environment. For example:

Process
Thread
Executable
APIs
Dynamic Libraries

Generally the Software Component will represent a collection of such elements working as a unit.

The run-time environment is represented in the model by the Logical Environment object as described previously. A Software Component can "run" in the context of a Platform Logical Environment or partition thereof. Applications may in turn be associated in the model with Software Components, indicating that the application makes use of a given Software Component, and hence, of any underlying Logical Platform Environments and physical resources.

Figure 10A:
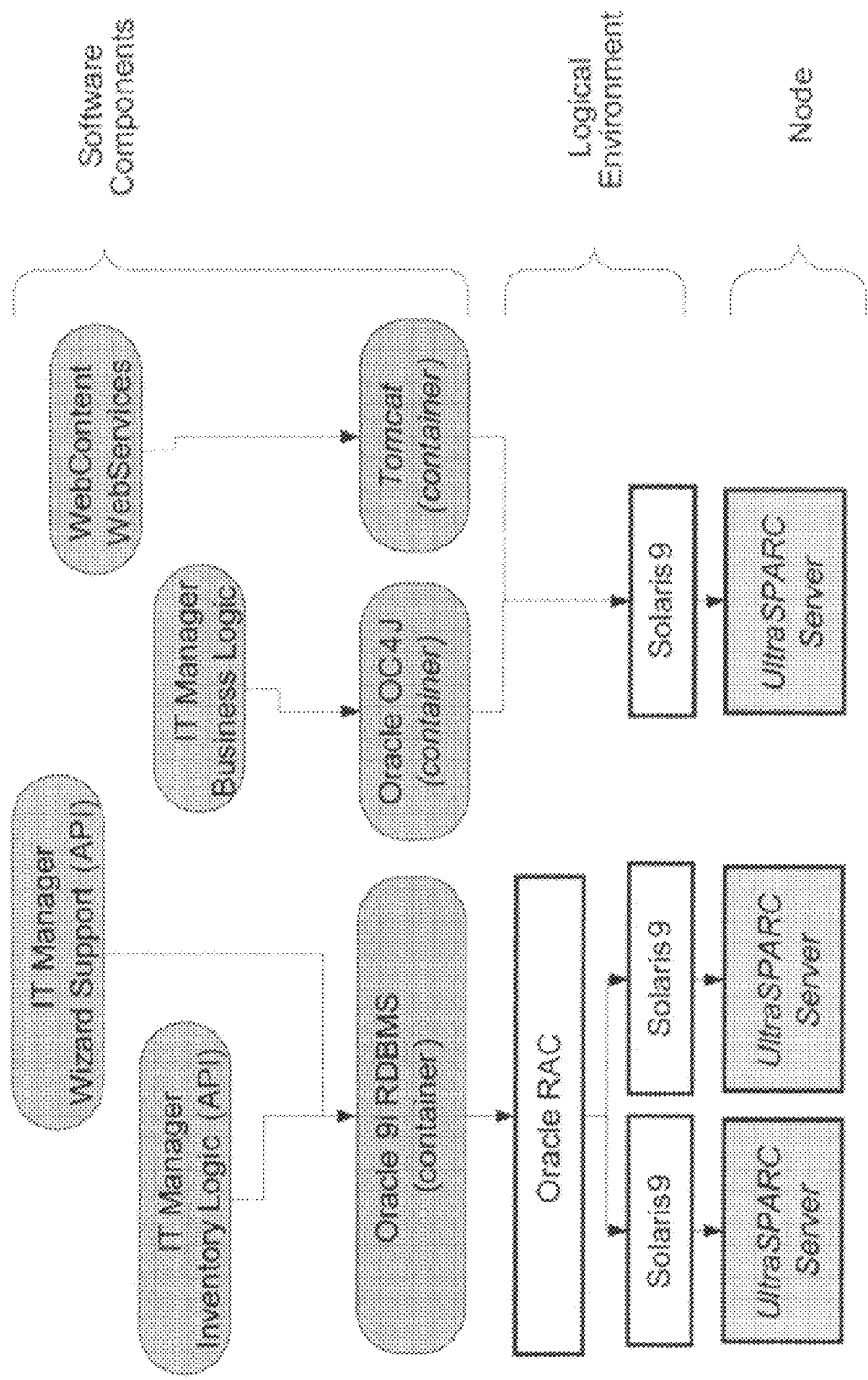
FIGS. 10A, 10B and 10C illustrate the modelling of Software Components.

A Software Component can also act as a container for other Software Components. For example a Software Component can represent an Enterprise Application Container such as Oracle OC4J, which acts as container for EJB based software components or it can represent an Oracle 9i RDBMS instance which acts as a container for PL/SQL software components. A scenario based on the above examples is shown in FIG. 10A, where some of the software components of an implementation of the IT Manager itself are modelled.

The valid modelling hierarchy is controlled by the following two independent behaviours of the Software Component object.

Container: if set to true, the object acts as a container for other Software Components (modules), otherwise cannot accept "contained" objects.
    Module: If set to true, the object runs within the context of a container Software Component, otherwise can only be related directly to a Logical Environment object.

Port Reference

A Software Component can be associated with a number of logical ports to model the termination of data flows on a software process. It's common for example in communication software to reserve the use of TCP/IP ports to establish communication with other remote software processes.

The resource model allows the creation of logical ports as a result of a data circuit creation. Each port object has two relationships:

Port to parent Port (to model Port hierarchy)
Port to Node

The following business logic is provided as part of resource modelling:

If the Data Circuit termination is resolved, the logical Port created is child of the termination Port of the underlying Circuit and is directly related to the Node object where the Circuit terminates.
    If the Data Circuit terminates on a Node, the logical Port is created orphan and directly related to the Node.
    If the Circuit is unresolved or terminates on a Location object (representing a location), the logical Ports are not created.

The business logic described above is extended in the capacity model to allow the association of a logical port to a Software Component. The logical port object still retains its relations with parent port and parent node, but an additional relation object is introduced in the model to establish the relationship between the Software Component object and the port object, as illustrated in FIG. 10B.

Figure 10B:
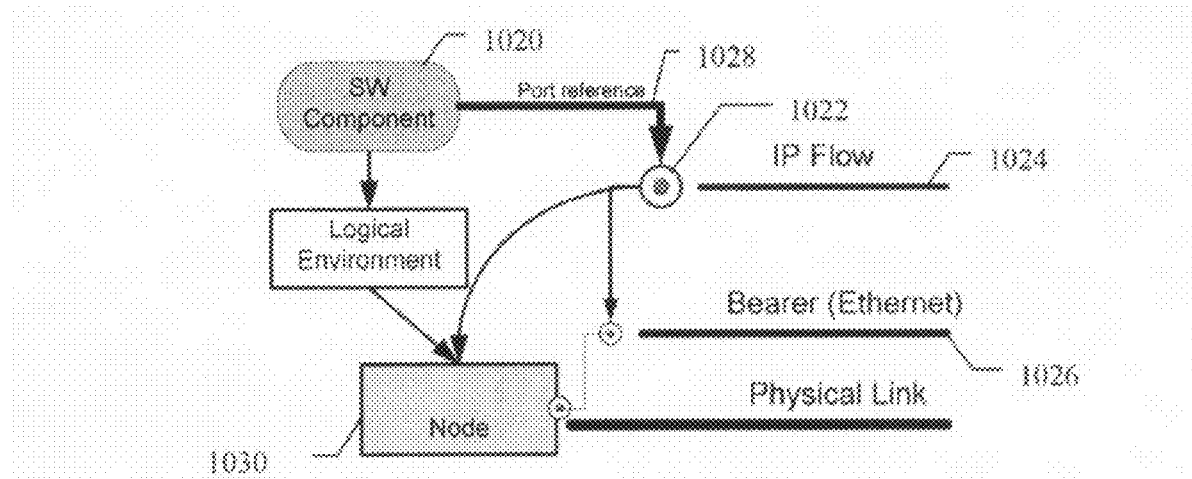

In FIG. 10B, the logical port 1022 is in a port hierarchy as the IP Flow Circuit 1024 that it terminates is fully resolved on an Ethernet bearer Circuit 1026. The relationship with the parent node 1030 is also maintained. However, an additional relationship 1028 is introduced that describes the fact that the Software Component 1020 is currently holding the port and using it to transmit/receive data.

Figure 10C:
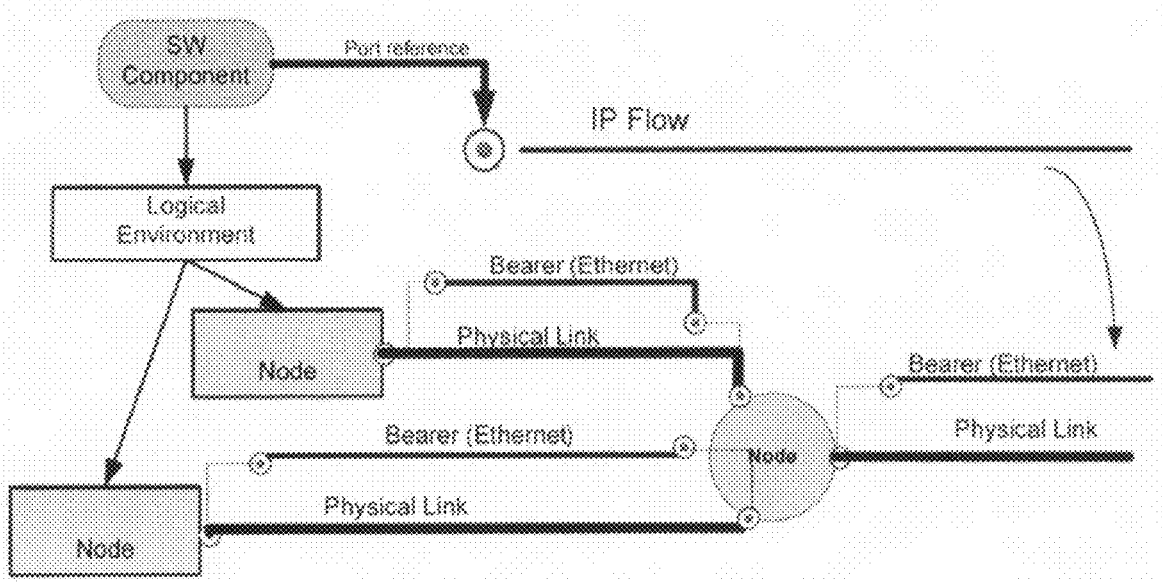

The model preferably also supports the creation of a logical port which is not in a port hierarchy as the physical termination of the Data Circuit might not be known or not relevant to the model. This is illustrated in FIG. 10C, where the IP Flow terminates on a port managed by the Software Component, but whose physical termination is not determined.

The possibility for a Software Component to reference a logical port is controlled by the "Port references" behaviour attribute: only when this is set to true is the object allowed to reference ports.

As with Logical Environments, the configuration and customization of Software Components is performed through the definition of Software Component types, which form part of metadata 612 (see FIG. 6). Each Software Component type defines characteristics including:

Behaviours:
    Container
    Module
    Port references
Allowed relationships with other Software Component types and with Logical Environment types.
Attributes
    A configurable set of named values that describe the object
Validation callouts
    Used to add custom business logic that is invoked to validate attributes or to validate hierarchical relationships.

Applications

The Application object represents the business function, process or service provided by a set of Software Components that co-operate locally or remotely.

Figure 11A:
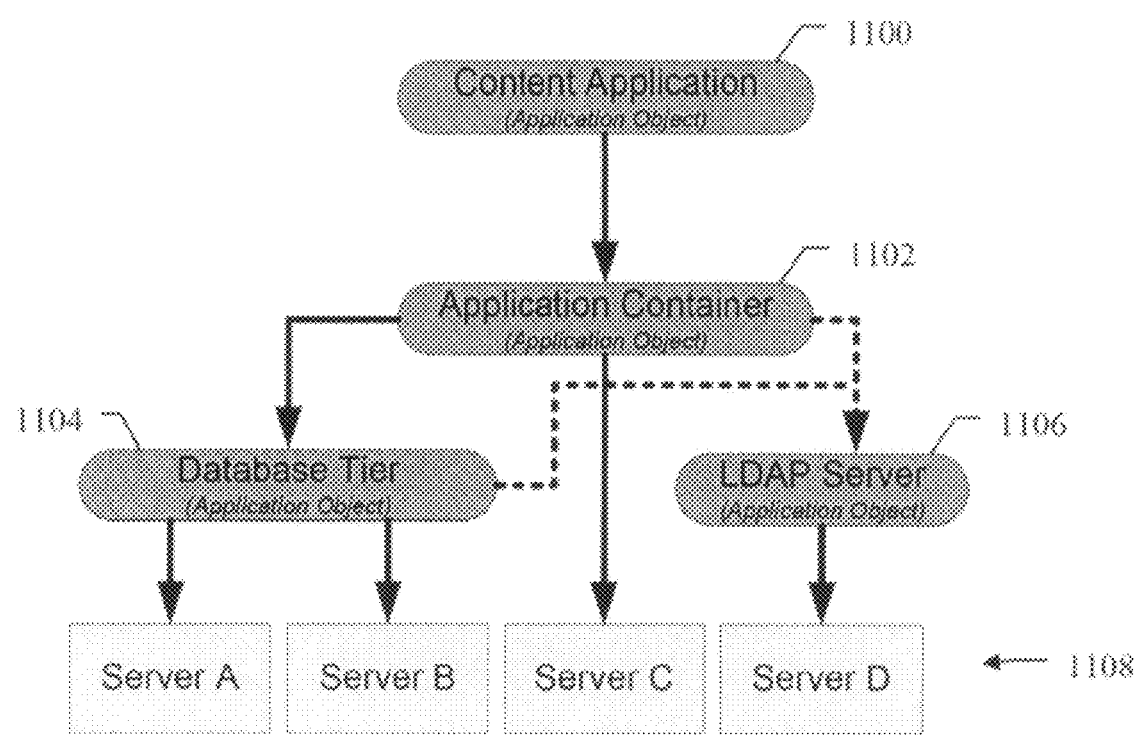
FIGS. 11A, 11B, 11C and 11D illustrate the modelling of Applications.

FIG. 11A illustrates application objects representing applications and relationships and dependencies between the applications.

The Application object can represent a business function, process or service. As shown in FIG. 11A, relationships can be constructed between Applications to represent:

Functional groupings, to enable the decomposition of complex applications into several functional components.

Application dependencies, where applications require the services of functions provided by other Applications to perform their tasks.

Capacity Model of the application

In the model, relationship types are preferably configurable—the definition of a relationship type includes a meaningful name for the relationship and the types of applications for which the relationship is valid. Applications can be associated with one or more Logical Environments, with other Applications and (in some cases) with nodes directly.

The FIG. 11A example shows a content application 1100 associated with an underlying application container 1102. The application container 1102 itself is associated with further application objects representing a database tier 1104 of the application, and an LDAP server application 1106. The various application objects are associated with various physical resources, for example servers 1108.

In a more detailed model, Application objects may be associated with Logical Environments (platform or partition) directly. Alternatively, Application objects may be associated with Software Components representing individual software elements forming part of or used by the Application. The Software Components may in turn be associated with Logical Environments, representing the execution contexts for the Software Components.

Figure 11B:
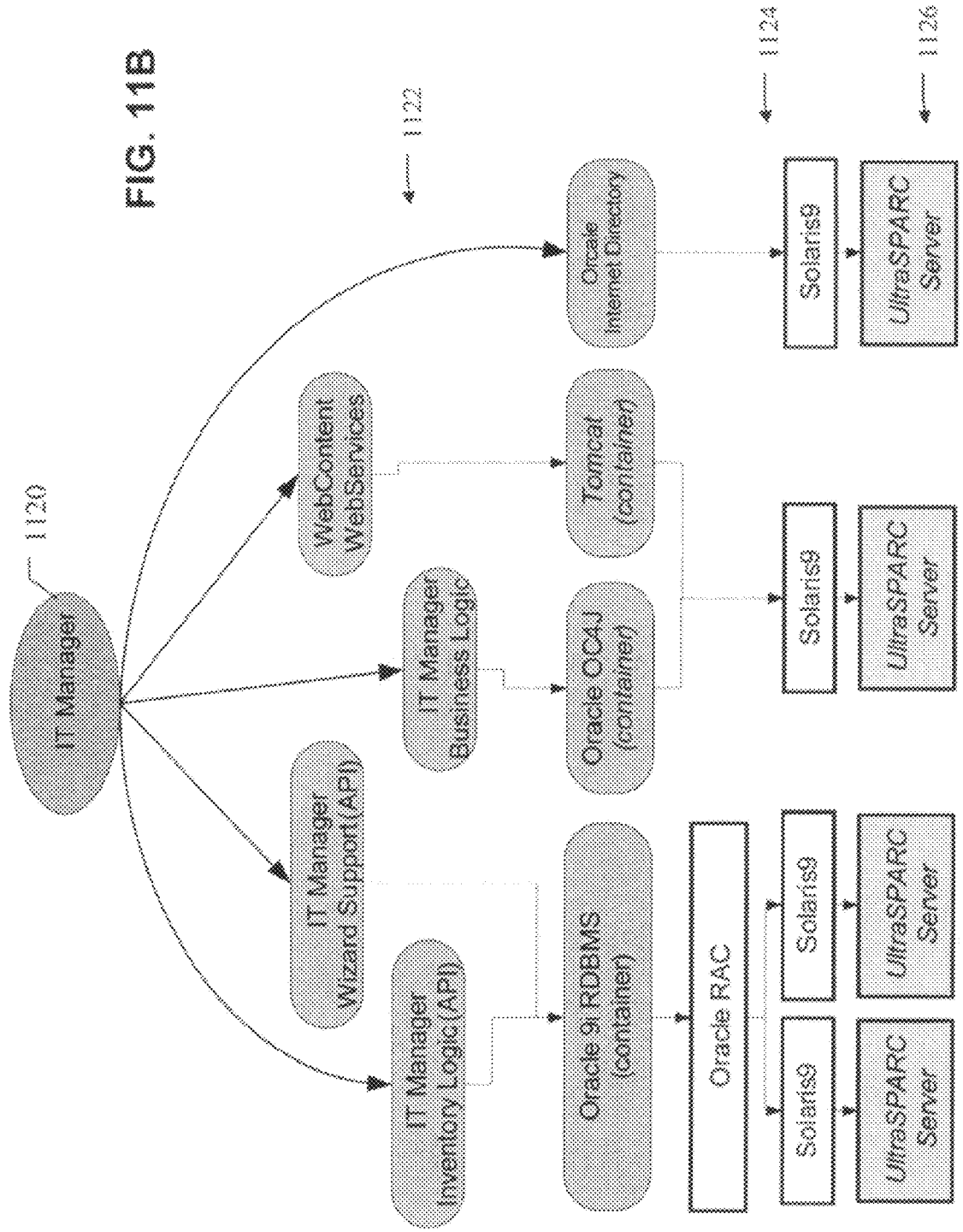

An example is shown in FIG. 11B, showing a model of an application 1120 (here the IT Manager application itself), composed of several Software Components 1122 associated with Logical Environments 1124 representing resources 1126.

Figure 11C:
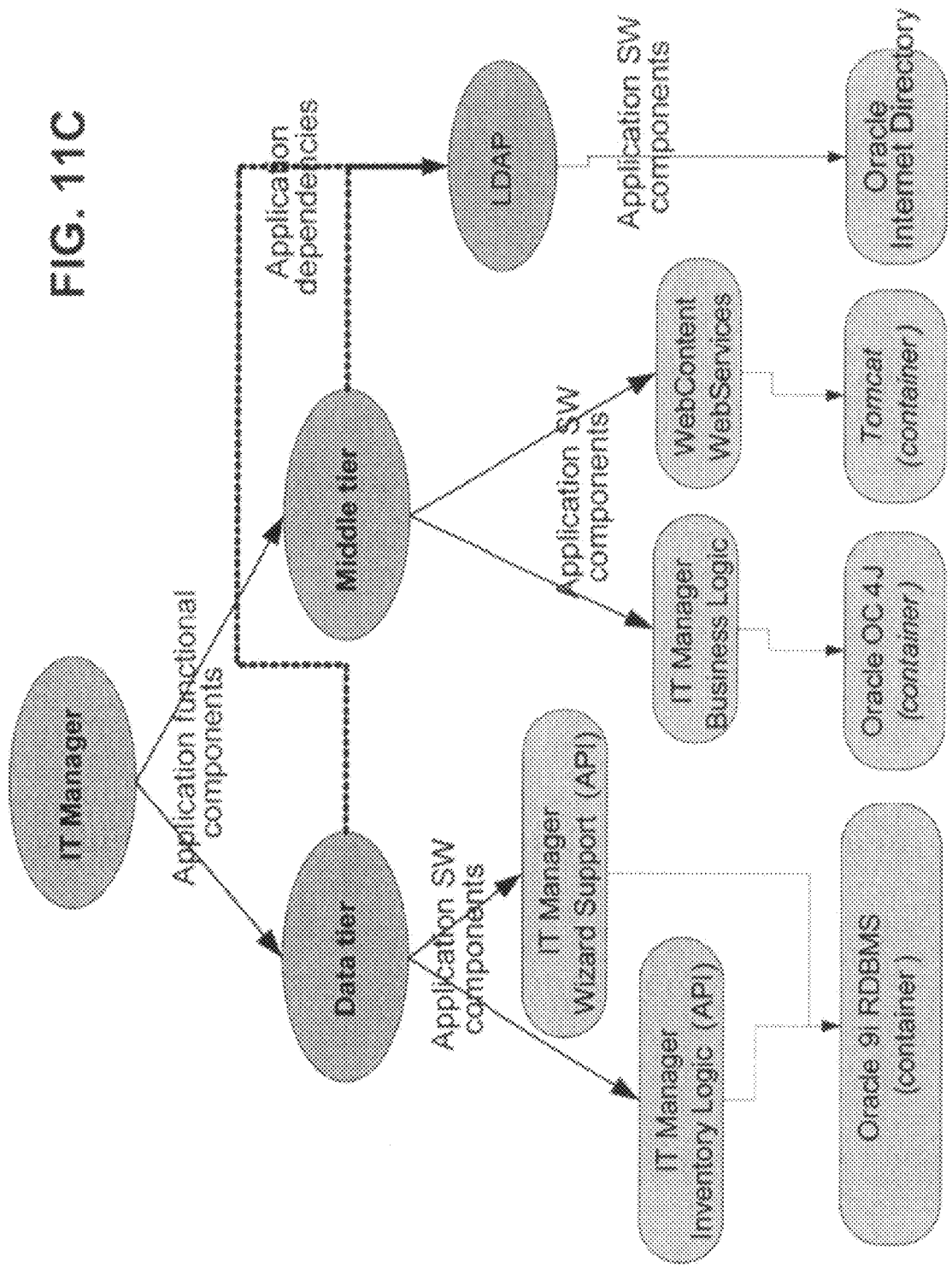

FIG. 11C illustrates how the Application model can be hierarchically structured to show functional grouping and dependencies. In this model the IT Manager Application has been divided into two components which represent the Data and Middle Tier (assuming that the Presentation Tier is not required). The LDAP Application provides directory services to both functional components of the IT Manager Application and therefore these depend on it.

The dependency model of the Application object supports relationships with resource/node objects as well, to represent scenarios where the Application relies on some hardware equipment, such as a firewall for example, to perform its tasks or deliver services.

Figure 11D:
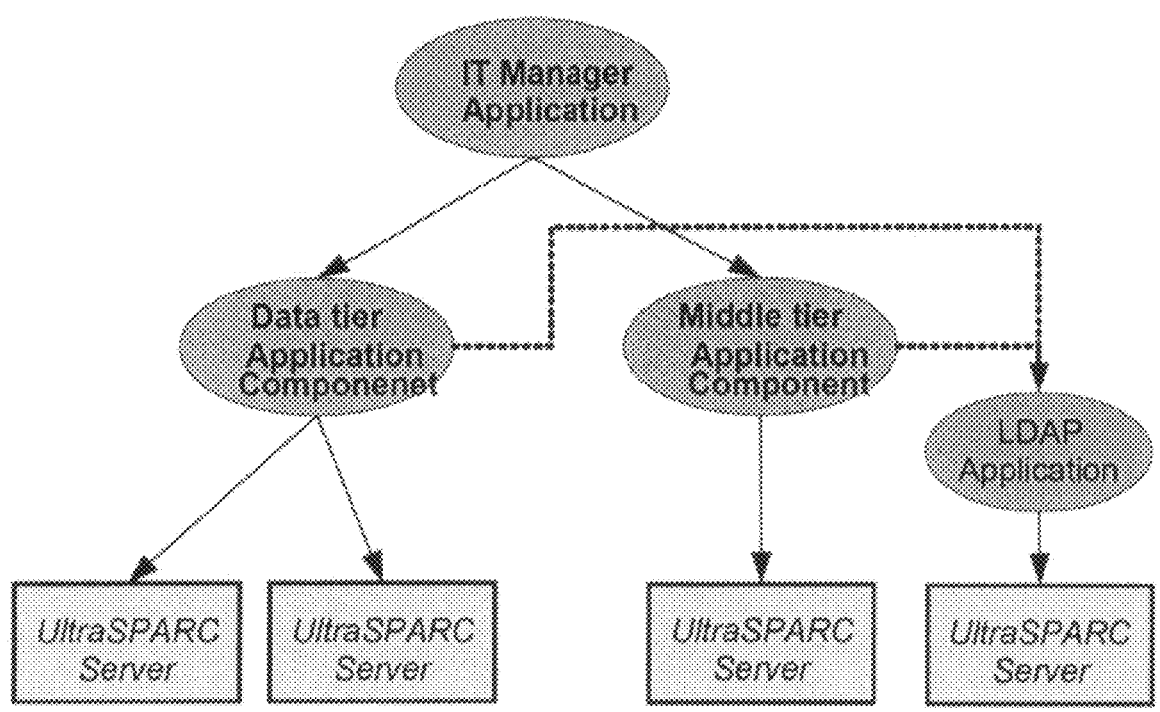

By allowing direct relationships between Applications and Nodes (i.e. resources), a simplified model can be provided where the Logical Environment and the Software Components layers are not used. FIG. 11D shows a simplification of the above Application model that uses direct Application-Node relationships.

Application Interfaces

Figure 12A:
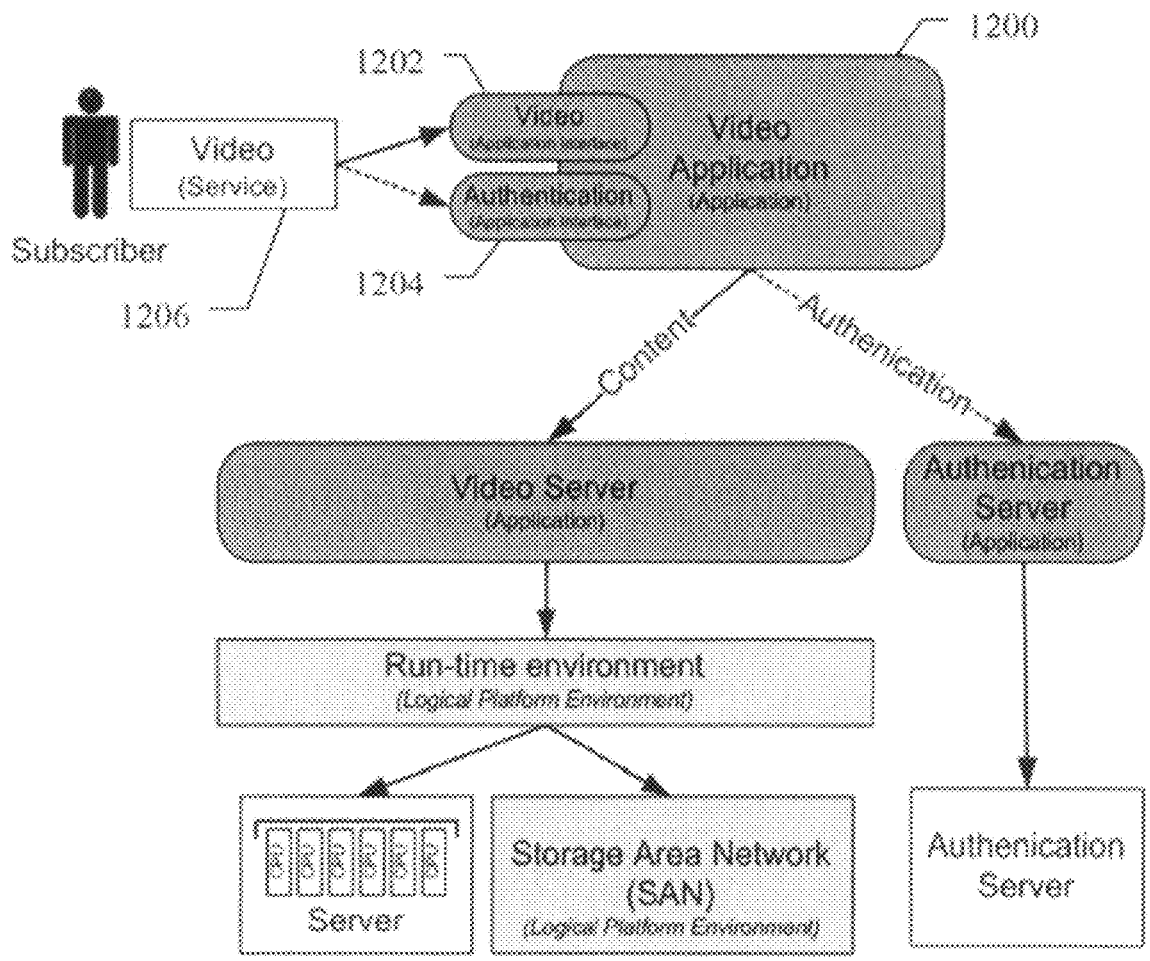
FIGS. 12A and 12B illustrate the modelling of Application Interfaces.

An Application can be modelled with one or more Application Interfaces representing different types of services that the Application is able to expose or different ways of delivering a service. For example, FIG. 12A illustrates a basic representation of a video application 1200, where the application offers two interfaces—an interface 1204 for authentication and an interface 1202 for the video content. When a new subscriber service 1206 is provisioned, the new service can be associated with the Application Interfaces responsible for delivering the required service content.

In preferred embodiments, an Application Interface is modelled by a specialised type of Application object that represents the point where the Application delivers one or more services. It constitutes the point of contact between the Service layer and the Application layer in the resource/capacity/service model.

When a Service instance is created for a service delivered by the Application, the Service object is associated with the Application Interface. An Application Interface is a child object of an Application object, although this hierarchy is orthogonal to the Application hierarchy.

Figure 12B:
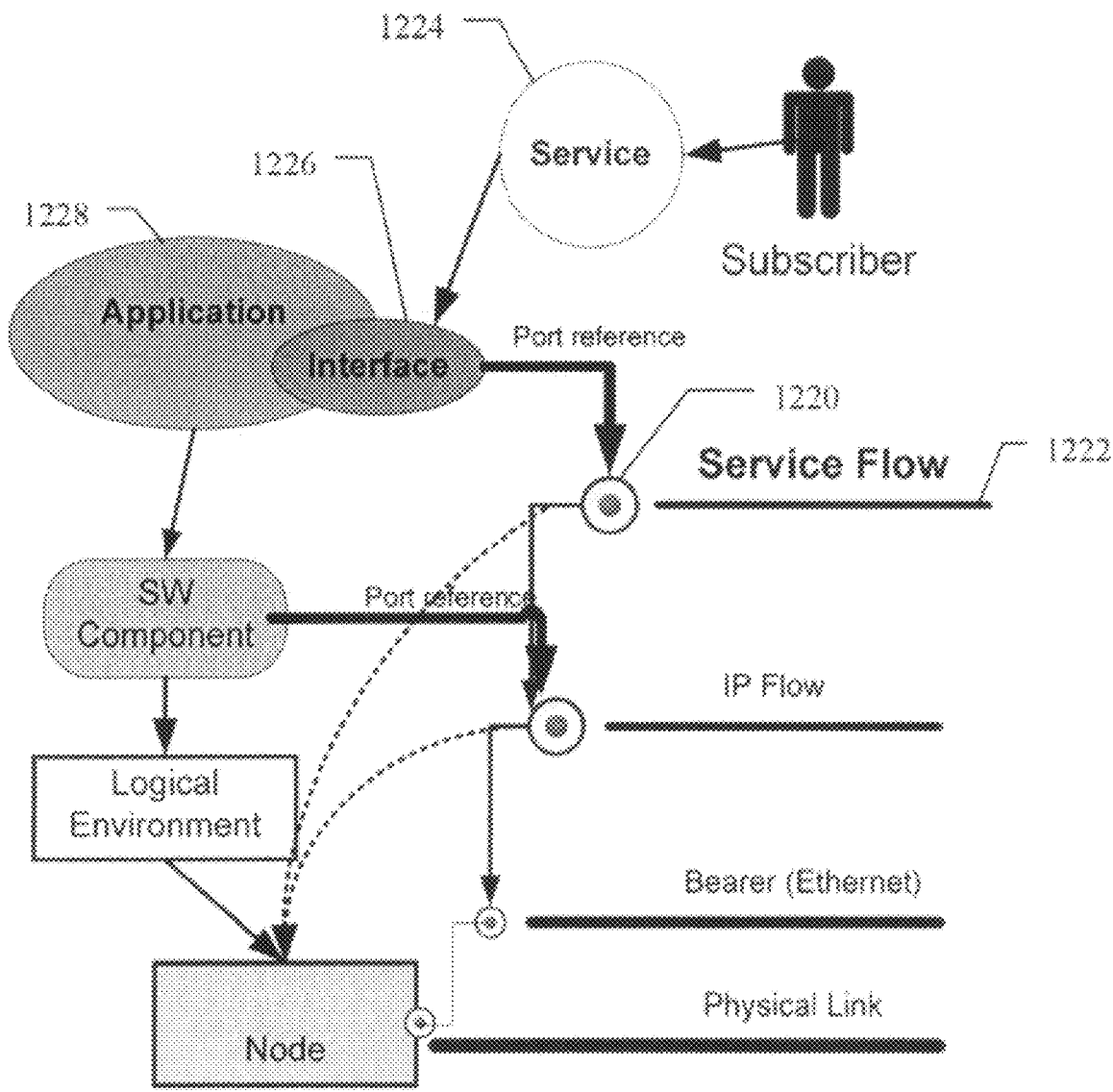

Similarly to the Software Component, the Application Interface object can be associated with Logical Ports, which represent the end-point for the Service flow, i.e. the point where the service is delivered. FIG. 12B shows a Service Flow Circuit 1222 relating to a service 1224 terminating on an Application Interface Port 1220. The port 1220 is associated with an Application Interface 1226 of an Application 1228.

The logical Port associated with the Interface can be created unresolved, i.e. not in a Port hierarchy as the one in FIG. 12B. This is useful as the termination point for a Service Flow could be undetermined or not relevant for the required model.

In preferred embodiments, an Application Interface exists only in a child-parent relationship with a single Application object and does not maintain relationships with any other model object other than its parent. Alternatively, in some cases, an Application Interface may be related to other objects in the model, in particular to one or more software components, to represent a tight dependency between a service exposed by an application via the Application Interface and a specific software component.

Application Resources

As mentioned previously, the model preferably allows the definition of application capacity attributes relating to applications. These are also referred to as Application Resources. Application Resources are accountable, named, values that represent assets of various types that are made available by applications and "consumed" by higher level services. Application Resources can provide a generic management paradigm for resources exposed by IT infrastructures such as disk space, processing capabilities, supported number of connections or users, number of accounts, etc. These application resources may be modelled independently or may be linked to the resource capacity made available by and defined in underlying Logical Environments.

Figure 13A:
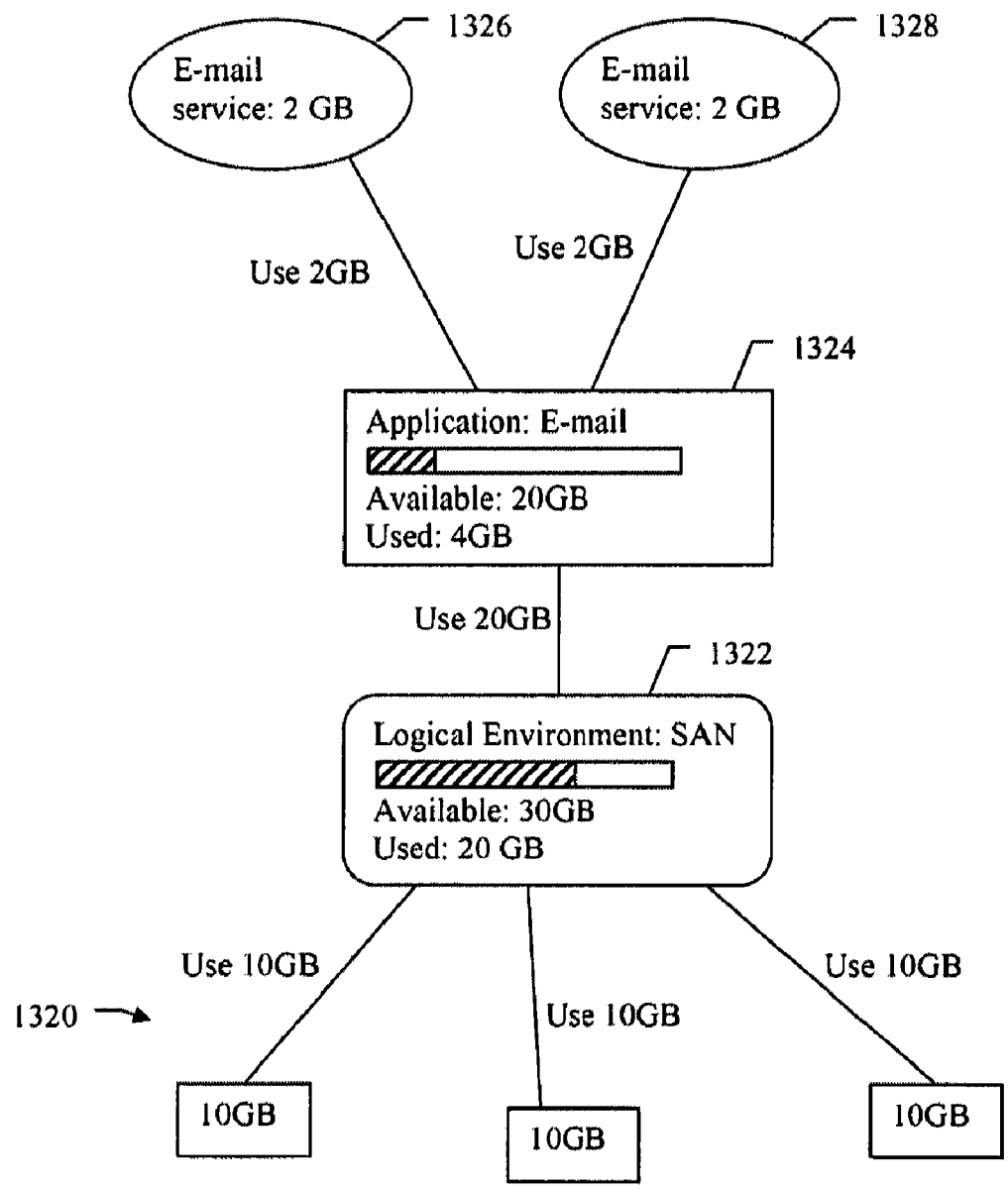
FIGS. 13A and 13B illustrate the modelling of resource allocations.

An example is shown in FIG. 13A. Here, three storage devices 1320 each provide 10 GB of storage space. Together, these form a storage area network (SAN) represented by Logical Environment 1322. An e-mail application 1324 utilises 20 GB of the total 30 GB space made available by the SAN. This 20 GB storage space is made available for e-mail services provided to users. In the present example, two e-mail services 1326, 1328 have been provisioned to individual users, each utilising 2 GB of the available space. Thus, in this way, resource utilisation can be mapped from services through applications providing those services down onto the physical resource layer providing the resources. Similarly, impact analysis can allow the failure of a storage device to be related to the applications using the device and to the services that might ultimately be affected.

Overbooking factors could additionally be used; for example, application 1324 could specify a 5:1 overbooking factor, in which case it would make available 100 GB of storage space, even though it consumes only 20 GB from the underlying Logical Environment.

In this example, the application 1324 can be considered to be both a resource provider, as it provides resources to e-mail services 1326 and 1328, and a resource consumer, since it consumes resources from logical environment 1322. It therefore fulfils the roles of both a service and a logical resource in the sense as used in the generalised examples of FIGS. 2A-2C. More consumer/provider layers could be provided in the model, in the form of a hierarchy of multiple applications and or software components (as in the FIG. 11C example). Resource allocation/utilization can then be recorded at each level in the hierarchy, allowing the mapping of resource components through multiple layers of applications and/or software components, optionally right down into the resource layer.

However, in some embodiments, it may be appropriate to explicitly account for only high-level application resources, or only the low-level resources. In some cases it may be appropriate to map certain resources from the application layer down to the physical resource layer, while other resources are represented at the application layer only.

The type of accounted resources for an Application of given type is configured in metadata 612 (see FIG. 6). For example, a Virtual Web Server Application could be modelled to maintain account of the following resources:
- Disk space in GBytes
- E-Mail usage in number of e-mail accounts
- Daily transfer quota in GBytes/day As in the above example, if linked to underlying physical resource capacity, as defined in one or more Logical Environments, certain application resources may be mapped to the physical resource layer; for example, the disk space in GBytes made available by the application may itself be allocated (consumed) from a disk space resource capacity made available be a storage device. Other resources, such as number of e-mail accounts, may not correspond directly with underlying physical resources and may hence be modelled only at the application layer.

Each Application Resource records the following information:
- Allocation
- Current Utilization
- Overbooking factor The measure of resource consumption for a Service of a given Service Type is configured in a Resource Utilization Profile that can be assigned to any Application object that exposes Interfaces.

When a Service instance is created in relationship with an Application Interface, the amount of resources utilised is retrieved from the associated Resource Utilization Profile for the given Service Type. As described previously, overbooking factors may be defined to specify that a larger quantity of a given resource can be consumed by services than is actually available.

Figure 13B:
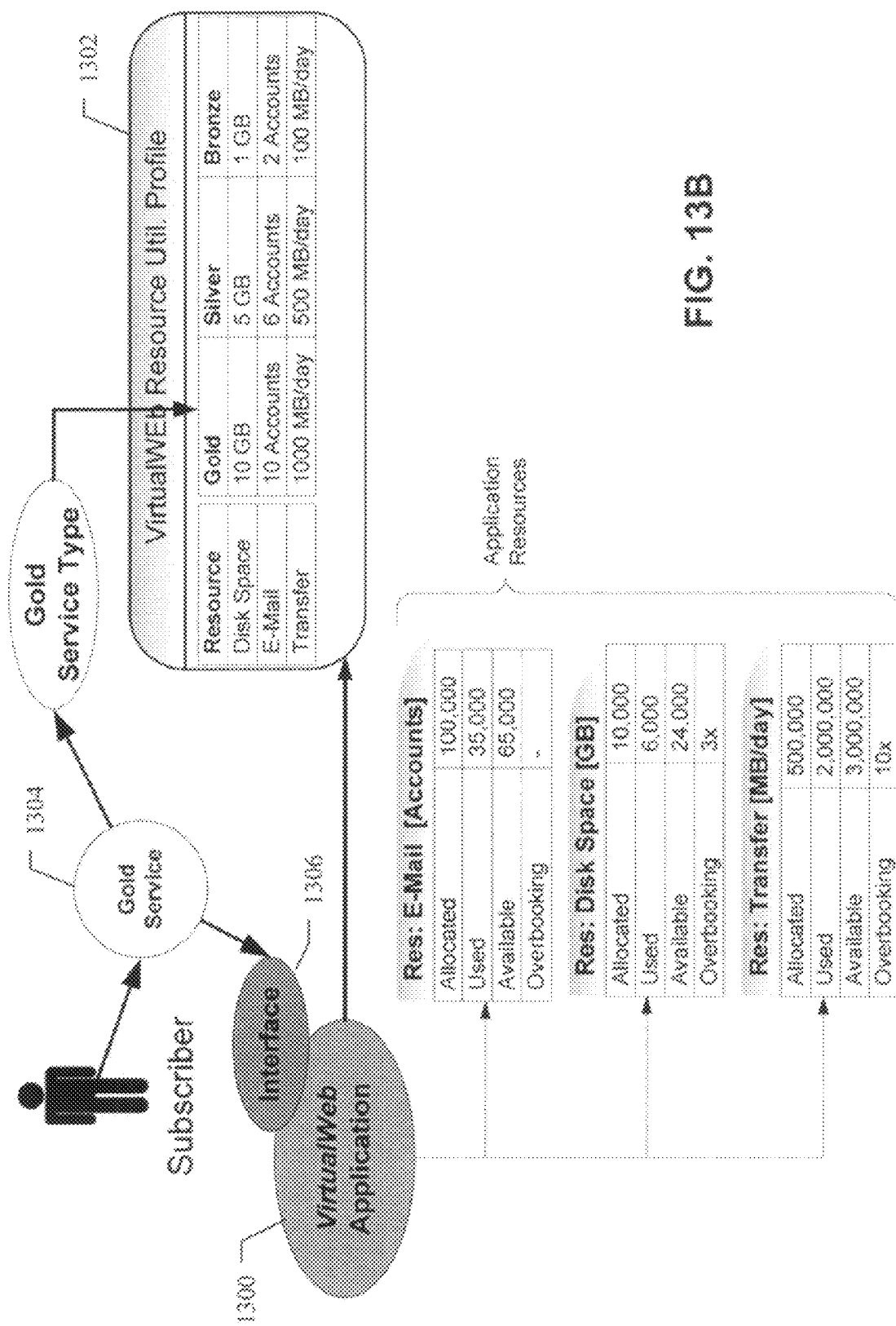

By way of example, FIG. 13B depicts a Virtual Web Server Application 1300 with a configured utilization profile 1302 for three different Service Types, named Gold, Silver and Bronze, that provide different resource allocation for the end-user. In the example a Gold Service 1304 is being added to the Interface 1306. In accordance with the Resource Utilisation Profile for the Gold service, a resource consumption of 10 GB disk space, 10 e-mail accounts and 1000 MB/day transfer allowance is then recorded against the Application 1300. As a result, of the total application resources made available by the Application 1300, the "used" amount for each resource would increase by the above amounts, with a corresponding decrease in the "available" amount.

Preferably, the standard Resource calculation can be customised via callouts. A Resource Utilization Callout for an Application of given type can be associated for each Service Type/Resource Type pair. This is invoked in place of the standard additive calculation performed when a Service is associated with an Interface.

Application Relationships

Application hierarchies can describe complex sets of dependencies between Applications and other Applications, Software Components and Nodes. All these elements can contribute to the service that the Application provides in different ways and can have different roles in the overall Application architecture.

In order to retain this information in the Application hierarchy, the model supports configurable Relationship Types (via metadata 612, see FIG. 6). With this mechanism an Application can be related to dependant objects using one or more relationships from a set of allowed relationship types. This provides a flexible mechanism to navigate an Application hierarchy along different paths.

Figure 13C:
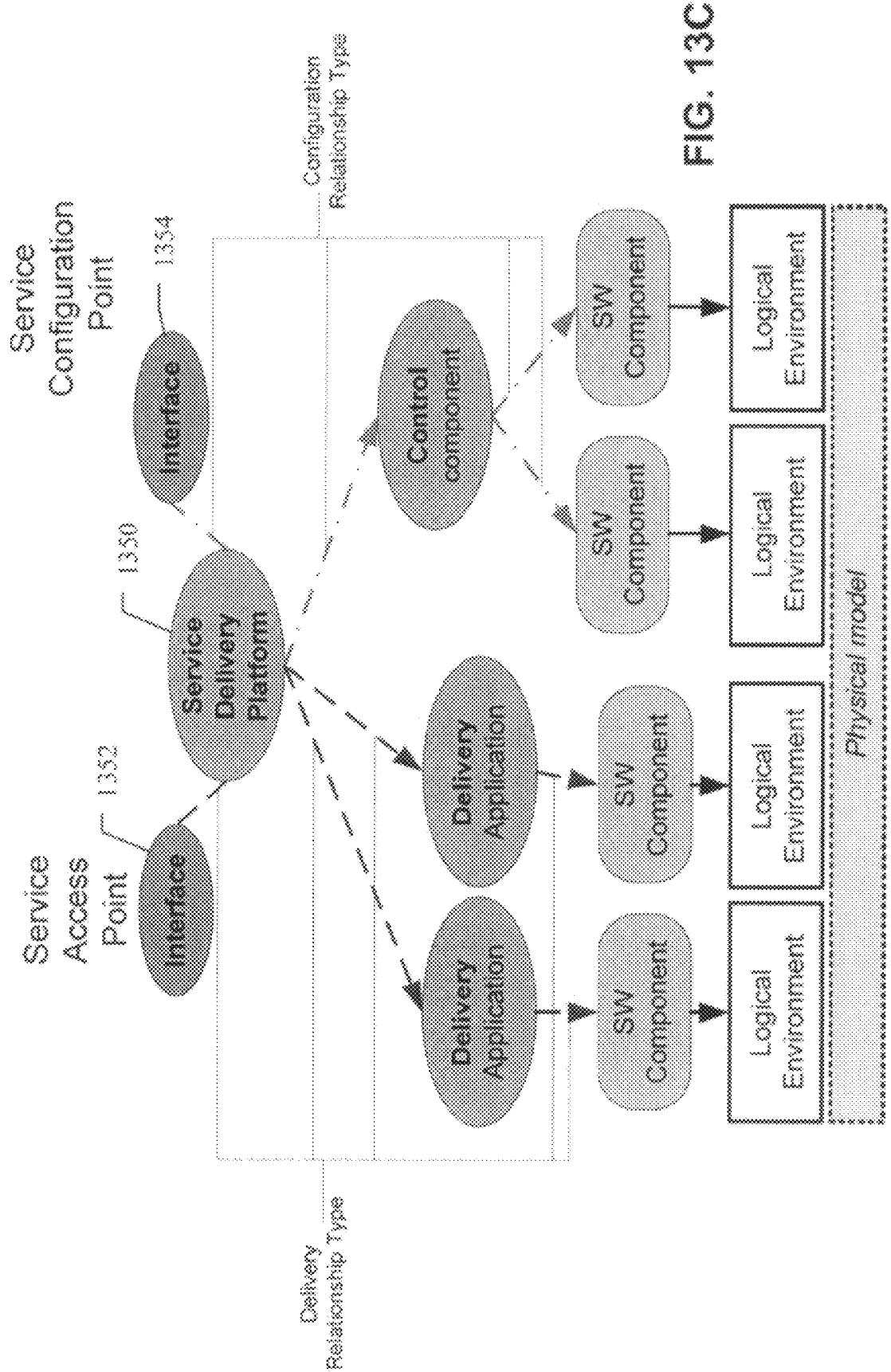
FIG. 13C illustrates relationships between applications, interfaces and software components.

In the example shown in FIG. 13C, an Application object 1350 represents a Service Delivery Platform (SDP) and its components. Some of these components however participate for the delivery of the service, while others provide control functions, against which activation and configuration is performed. Therefore the SDP is modelled with two distinct Interfaces 1352, 1354 for Access and Configuration and objects are related using two different types of relationships, providing contextual alternative paths in the hierarchy.

The configuration and customization of Application objects is performed through the definition of Application types in metadata 612 (see FIG. 6). Each Application type defines characteristics including:
- Behaviours:
  - Application
  - Interface
- Allowed relationships with
  - Applications
  - Software Components
  - Nodes
- Relationship Types
  - Functional association
  - Resource consumption
  - Redundancy
- Attributes
  - A configurable set of named values that describe the object
- Validation callouts
  - Used to add custom business logic that is invoked to validate attributes or to validate hierarchical relationships.

Modelling Processes and Process Resource Consumption

The modelling of application and software components has been described above. Applications and software components may both consume resources from the underlying resource layer; in particular from the Logical Environments (i.e. logical resources) and ultimately from the physical resources themselves. The examples given above relate mostly to static resource consumption; for example, a fixed storage capacity may be allocated to an email application. However, in practice applications also have dynamic behaviour and hence resource requirements. For example, whilst executing, an application may require a certain quantity of memory (RAM), and possibly a certain amount of CPU time. Storage capacity for dynamic use may also need to be allocated in addition to any static allocations.

Though in some cases it may be possible to know the dynamic resource requirements for an application in advance, this will not always be the case. For example, the dynamic requirements of an e-mail application will vary depending on the number of users using the application at any given time, the number of message sent and received, and so on. In these situations it is nevertheless possible to estimate the expected resource requirements over a period of time, and these resource requirements can then be modelled. The capacity model preferably allows these types of resource requirements to be recorded alongside static resource allocations.

For modelling purposes, dynamic resource consumption in terms of moment-to-moment operational performance (e.g. loading snapshots of server processes) is generally not of interest. Rather, to enable accurate modelling, resource consumption statistics aggregated over a significant period of time are preferably used. This can give a more accurate view of resource requirements, and is more appropriate for long-term capacity management (rather than operational performance management).

As previously mentioned, a particular type of software component that may be modelled in the capacity model is a process. During execution, a given application typically consists of one or more processes; since processes define the dynamic behaviour of applications, they are also suitable for capturing dynamic resource requirements.

Processes of an application may be distributed over a number of computers (as in the FIG. 14B example described below). Each process runs on one computer and consumes resources from it, for example storage resources when not running, and full processing resources when running (e.g. CPU time and RAM).

The modelling of processes, and of resource requirements associated with them (both static and dynamic), will now be described in more detail with reference to FIGS. 14A-14E.

Figure 14A:
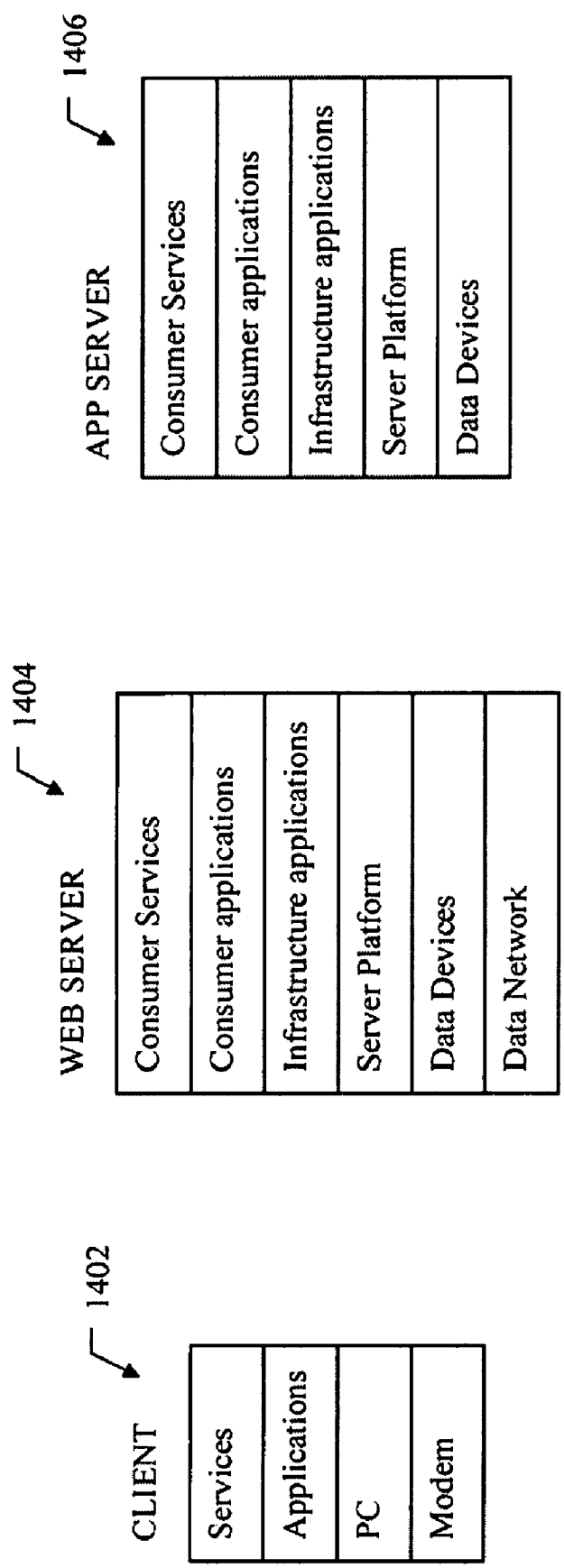
FIGS. 14A, 14B, 14C, 14D and 14E illustrate the modelling of capacity consumption by processes.

FIG. 14A illustrates a typical environment for complex distributed applications, comprising a client 1402, web server 1404 and application server 1406. Typical components of each are shown in the diagram. Application services may, for example, be provided by the application server or, for web applications, by the web server. Local client applications may also provide application services directly. However, in many cases, an application may be distributed over several of these components, being provided by a set of interacting processes.

Figure 14B:
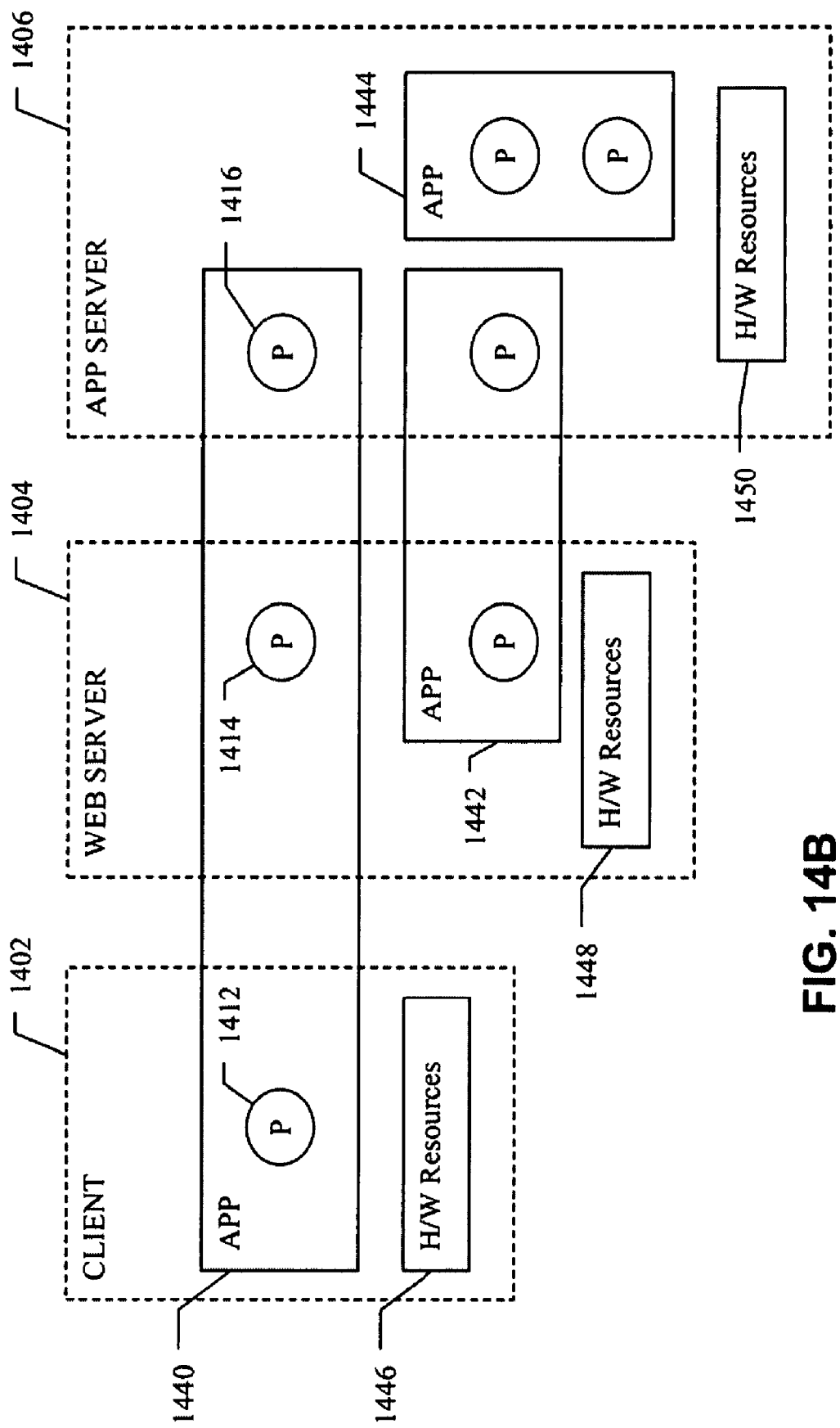

An example of this is illustrated in FIG. 14B. This again shows client 1402, web server 1404 and application server 1406. Each provides respective hardware resources 1446, 1448, 1450 to support processes and applications.

A first application 1440 comprises three interacting processes: a client process 1412 executing at client 1402, a web server process 1414 executing at web server 1404 and an application process 1416 executing at application server 1406. These processes cooperate to provide the application's functionality. The client process 1412 may, for example, be a web browser process, by way of which a user accesses a web page provided by the web server process 1414. The web page served by the web server may in turn be populated with data provided by application process 1416 (to take the example further, that data itself could be obtained from a database process at a database server). Other applications 1442, 1444, formed from different combinations of processes, are also shown in this example.

Each of the processes 1412, 1414, 1416 has certain resource requirements relating to the platform on which it runs. IT Manager allows these requirements to be modelled in the infrastructure (capacity) model.

Specifically, processes can be represented in the model by corresponding process model objects. Like other software components (and also applications), these can be associated in the model with Logical Environments or Logical Environment partitions (or, if required, directly with physical resources) to indicate that the process runs in, and consumes resource capacity from, the Logical Environment or partition.

As with other software components, processes may also be associated with other processes, to indicate that a process uses the services of another process (this would be the case with processes 1412, 1414, 1416 in the above example). In some cases, this association may define resource consumption by one process from another. In other cases, an association may simply define a dependency of one process on another, with no resources being consumed (or at least none that are modelled).

In other words, two types of dependencies can exist between processes (and indeed other software components/applications): functional dependencies (one process makes use of functionality provided by another), and resource consumption dependencies (one process consumes resources from another). Combined functional and resource dependencies are also possible. Since these dependencies are represented in the model, analysis of the model can provide useful information on functional and resource dependencies. Failure impact analysis can also be performed in relation to any model object as discussed elsewhere.

Multiple resource consumer processes may be associated with a single resource provider process. Thus, complex process hierarchies can be modelled.

Figure 14C:
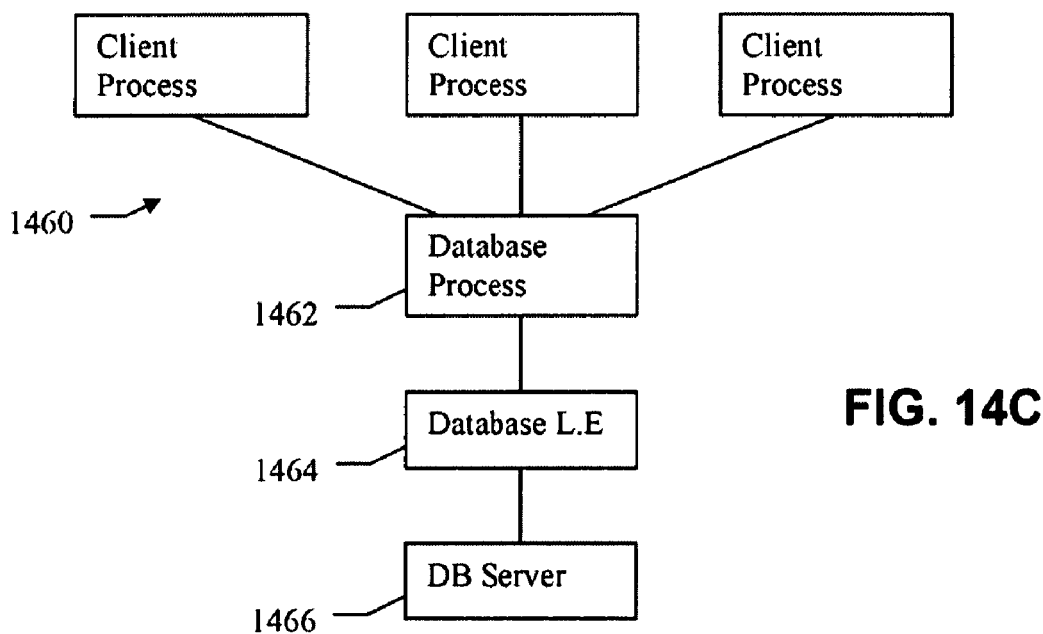

An example is illustrated in FIG. 14C. In this model, a database server 1466 is represented as a physical resource. Resource capacity made available by the physical resource is represented by a Logical Environment 1464. In turn, a database process 1462 runs in, and consumes resource capacity from, the database Logical Environment 1464. Multiple client processes 1460 utilise resource capacity from database process 1462. For example, the database process may be able to support a certain number of concurrent clients. The maximum number of supportable clients is then the resource capacity provided by the database process, with each client process 1460 consuming one unit of this resource capacity. Resource capacity provision and consumption is recorded in the model in the same way as previously described (see for example FIG. 13A).

The client processes 1460 may themselves be part of database client applications (not shown), and may consume other resources along with those of database process 1462, for example local client computing resources.

Typical process models may comprise infrastructure processes, consumer processes, and physical resources (in particular computing hardware used to run the processes). Infrastructure processes typically consume hardware processing resources and provide low-level functionality utilized by other processes and applications (e.g. a database process). Consumer processes may consume resources provided by infrastructure processes but may also consume hardware processing resources directly.

A consumer process is specific to the consumer for whom the process is running, and may for example run as part of an application service for a user. The amount of resource consumed may depend on the role of the consumer. In an example, an infrastructure process may support a certain number of concurrent consumer processes, this number being a resource capacity of the infrastructure process. The amount of resource consumed from the infrastructure process would then be incremented by each consumer process associated with the infrastructure process.

These consumer/infrastructure process dependencies can be hierarchical, and a consumer process may depend on zero or more infrastructure processes.

In the above examples, reference has generally been made to individual measures of resource capacity. However, in practice, a physical or logical resource (e.g. a Logical Environment or, when acting as a resource provider, a process, software component or application) may provide resource capacity characterisable by a number of separate resource capacity measures. For example, the storage capacity of a storage device may be quantified both in terms of a storage space amount in bytes and a maximum number of files that can be stored. In another example, a computer's resource capacity may be quantified in terms of CPU time, volatile memory capacity (RAM), permanent storage (hard disk space), and storage access bandwidth (e.g MB/s).

Thus, the model preferably allows multiple resource capacity measures to be defined for any resource provider (whether physical resource, Logical Environment, process, software component or application). These capacity measures are referred to herein as resource parameters, with each resource parameter representing an aspect of the resource capacity. Similarly, resource consumption by a resource consumer (e.g. an application) from a resource provider (e.g. a Logical Environment) can be recorded in the model for each resource parameter defined for the resource provider.

The resource capacity made available by a resource provider is preferably defined in a capacity profile. The capacity profile specifies a resource quantity for each resource parameter defined for the resource provider, and is associated in the model with the resource provider (or defined therein).

Similarly, the consumption of resource capacity by a resource consumer is recorded in the model in a consumption profile, specifying a resource quantity consumed for each applicable resource parameter. Consumption profiles may be associated with model objects representing resource consumers or with model objects representing resource providers depending on requirements. In the latter case, the consumption profile would indicate a standard consumption profile applicable to all consumers of that provider.

In one example, consumption profiles are defined for each infrastructure process in a process model, defining the resource capacity consumed by (allocated to) any consumer process associated with the infrastructure process. Alternatively, multiple different consumption profiles may be associated with an infrastructure process, with the profile applicable to any given process selected depending on the role of the consumer process. This role may itself relate to a role of a user of the consumer process. For example, different consumption profiles may be associated with power users, residential consumers, systems administrators and other user roles.

Consumption profiles may alternatively be associated with relationships between model objects. For example, a dependency association defined between processes may define a consumption profile indicating resource consumption by one process from the other. The consumption profile is then specific to the association between those processes. Alternatively, a purely Functional Dependency between Software Components indicates that the Components are required to provide the service, but one does not consume resource from the other.

As already mentioned, where resource parameters relate to dynamic aspects of resource capacity, they are preferably based on statistics aggregated over a significant period of time.

Figure 14D:
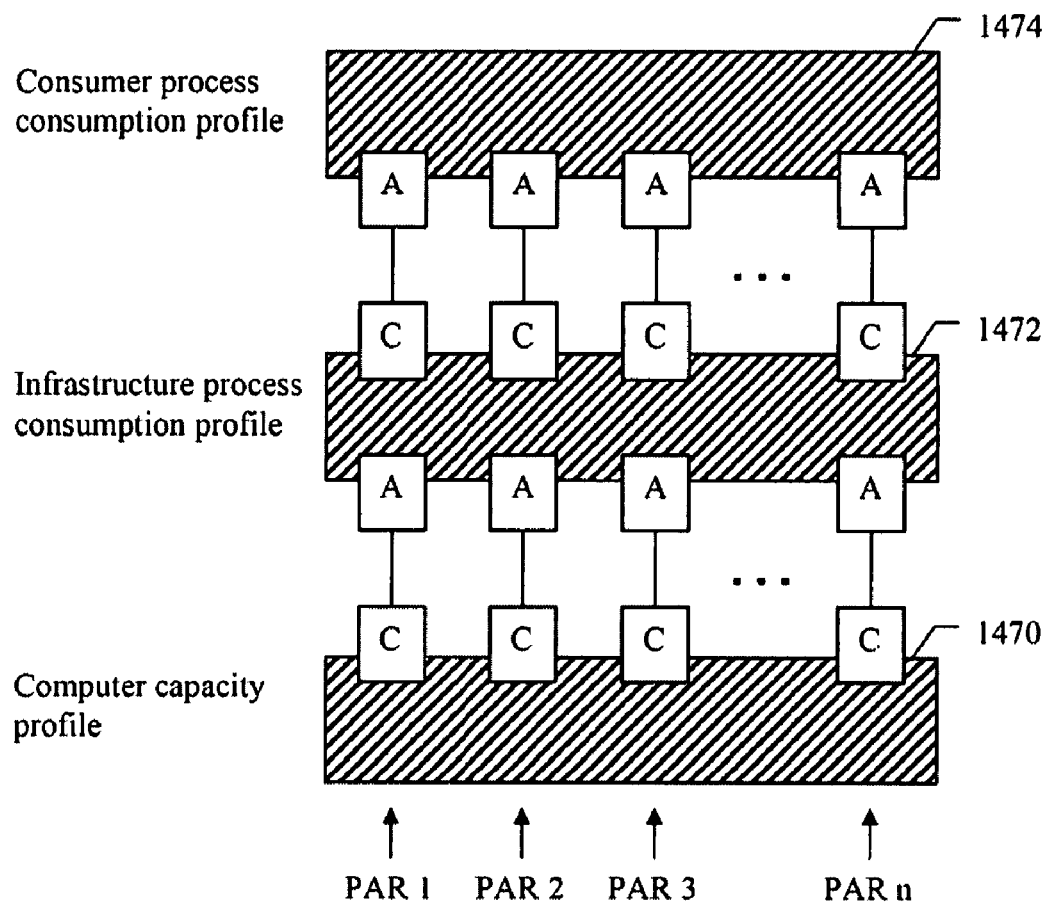

Resource parameters, capacity profiles and consumption profiles are illustrated in FIG. 14D.

This shows a capacity profile 1470 for e.g. a computing device, having parameters PAR 1 to PAR n. The capacity profile defines a capacity value C for each parameter. A consumption profile 1472 is defined for an infrastructure process which consumes capacity from the computing device. The consumption profile specifies a consumption or allocation value A for each parameter (capacity consumption by a consumer can also be viewed as a capacity allocation to the consumer from a provider).

Similarly, a capacity profile may also be defined for the infrastructure process, again defining capacity values C for each parameter. These may be identical to the allocation values A (the resource capacity is fully passed on) or may be different—less capacity may be provided than consumed due to utilisation of some capacity by the infrastructure process; alternatively more capacity may be provided than consumed due to overbooking, or because of collation of resource capacity from multiple sources.

Finally, a consumer process consumption profile 1474 indicates, for each parameter, resource consumption by the consumer process from the infrastructure process, again in the form of resource allocation values A for each parameter.

In this example, the resource capacity made available by the infrastructure process 1472 (which is both provider and consumer) and the resource capacity consumed by it from underlying resources is defined in terms of the same resource parameters. However, this need not necessarily be the case. For example, a storage resource may make a storage space quantity available to an email application. The email application uses that storage space to provide storage for email accounts. However, the resource capacity made available by the email application (to user services) may be defined not in terms of storage space quantity (in bytes) but in terms of number of user accounts.

In this same example, each email account could have a fixed storage allocation. In such a case, there would be a defined relationship between the consumed resource parameters and the provided resource parameters. This relationship can preferably be recorded in the model. This then allows mapping of resource consumption through layers of the model even where the resource parameters differ.

Figure 14E:
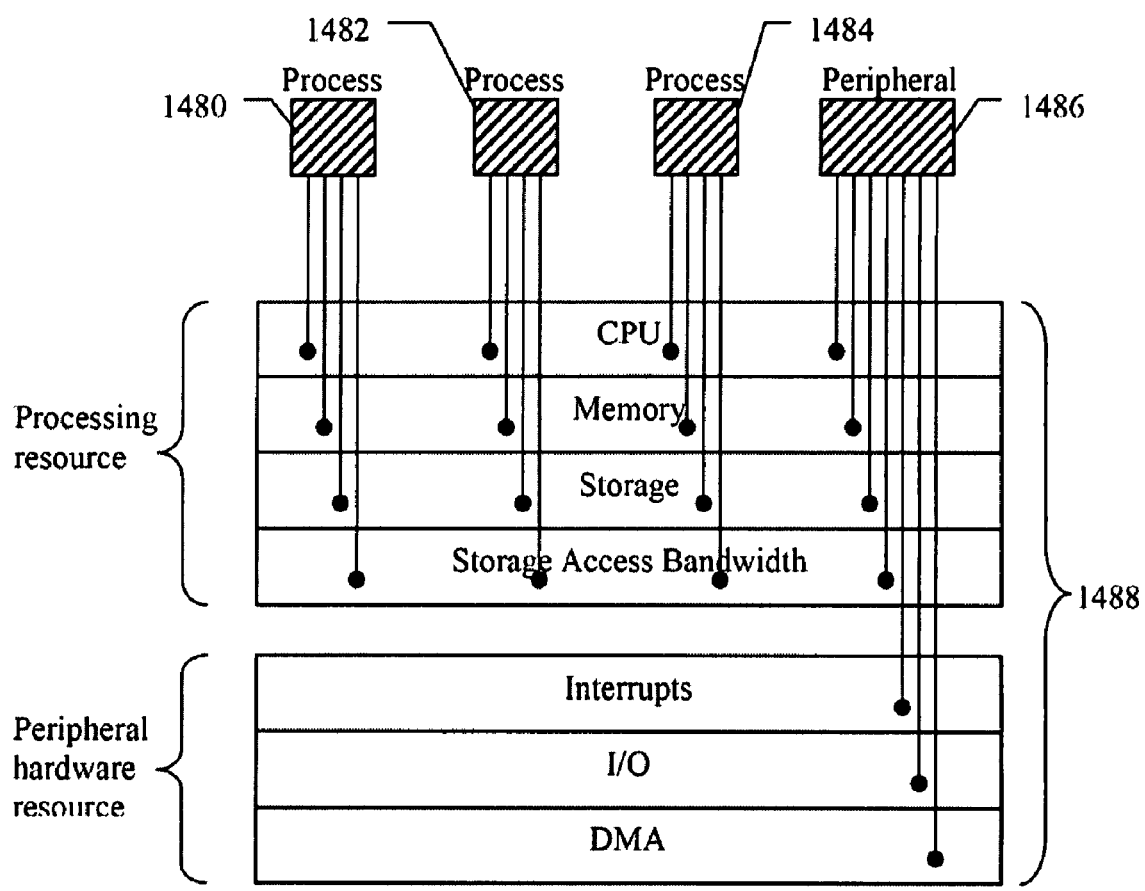

FIG. 14E further illustrates the concept of resource parameters and resource capacity/consumption profiles. Specifically, FIG. 14E shows a number of resource parameters 1488. Resource profiles 1480, 1482 and 1484 relating to processes and 1486 relating to a peripheral logical resource are also shown, indicating symbolically the resource parameters defined for the various profiles.

Partitioning of Logical Environments has been described above (see FIGS. 8A, 8B). In preferred embodiments, the model preferably allows partitioning of other logical resources, such as processes, software components and applications (when fulfilling resource provider roles). As with Logical Environments, such partitions define portions of the relevant resource capacity (possibly in terms of multiple resource parameters). In some embodiments, partitioning of physical resources may also be possible.

Resilient Architectures

Resiliency of IT resources can be an important element in IT infrastructure management where high availability is required to ensure continuity of service. Different technologies provide resiliency at different levels in the architecture.

IT resilience can be implemented at many levels—at the hardware level, for example RAID arrays (Redundant Array of Independent/Inexpensive Disks), through server clustering (for example using HP Serviceguard clustering technology), or at the application software level. Resilience can be achieved in many ways, for example through greater redundancy, automated failover environments, dedicated redundant elements, and through load balanced architectures.

A key approach to providing resiliency is redundancy. Redundancy can allow a system to keep functioning normally in the event of a component failure, by having other components available that can perform the same functions.

In the IT infrastructure model, a Redundancy Group object is provided to model the behaviour of a set of IT components in a resilient configuration, such as hot/stand-by, cluster, RAID, etc. This object is not part of the IT infrastructure object hierarchy as it does not represent any particular physical or logical "component". Rather it models the "behaviour" of a set of components in the case of a fault and therefore it is orthogonal to the object hierarchy.

This approach allows the Redundancy Group to be a very flexible tool, applicable to a wide range of infrastructure model objects and in a wide variety of object hierarchy scenarios. The representation of redundancy in the infrastructure model can allow accurate impact analysis for service assurance. In case of failure of a component of an IT infrastructure the model can provide a mechanism to determine if the component was in a redundant configuration and if so, the state of the other components in the redundant configuration. This can assist in evaluating the overall impact of the fault In particular, when a fault is detected on one of the components, the Redundancy Group logic helps determine the effect on objects that depend on the faulty component as well as the effect on objects depending upon the other components in the group.

For example, on a redundant disk array, data could be striped across all disks so that if one disk fails the other disks compensate the failure. In this scenario the components are all peers and protect each other.

In a Hot/Stand-by server configuration, on the other hand, the Stand-by server could be configured to support different services when in Stand-by mode. In case of a failure of the Hot server, the Stand-by one would take over, possibly at the expenses of the services it was supporting when in Stand-by. On the other hand, if the Stand-by component fails, the services that would be affected would be the one it is directly supporting, while the ones supported by the Hot server would be unaffected.

Thus, Redundancy Groups enable the behaviour and scope of resilience in IT architectures to be modelled. Redundancy Groups can be created for any objects in the IT infrastructure model, e.g. for Applications, Logical Environments, and physical resources such as devices, cards, and connections.

Redundancy Behaviours

The components of a Redundancy Group can assume one of the three following behaviours within the group.

Critical: defines a component that performs critical functions in the group. No other component duplicates its functions and if it fails all other components are considered to fail. A disk array controller, for example, is a critical component for the functioning of a disk array.

Redundant: defines a component whose functions are redundant, i.e. replicated by one or more peer component in the group. If it fails the impact of the fault must be evaluated in relation with the state of the other components with Redundant or Critical/Redundant behaviour. A Disk in a Disk Array, for example, would be assigned Redundant behaviour.

Critical/Redundant: defines a component whose functions are not replicated by other components, but is part of redundancy group and as such can replicate functions of other components and participate in making other Redundant components resilient. The Stand-by Server in a Hot/Stand-by configuration, exemplified in FIG. 15A, can be modelled with Critical/Redundant behaviour.

Figure 15A:
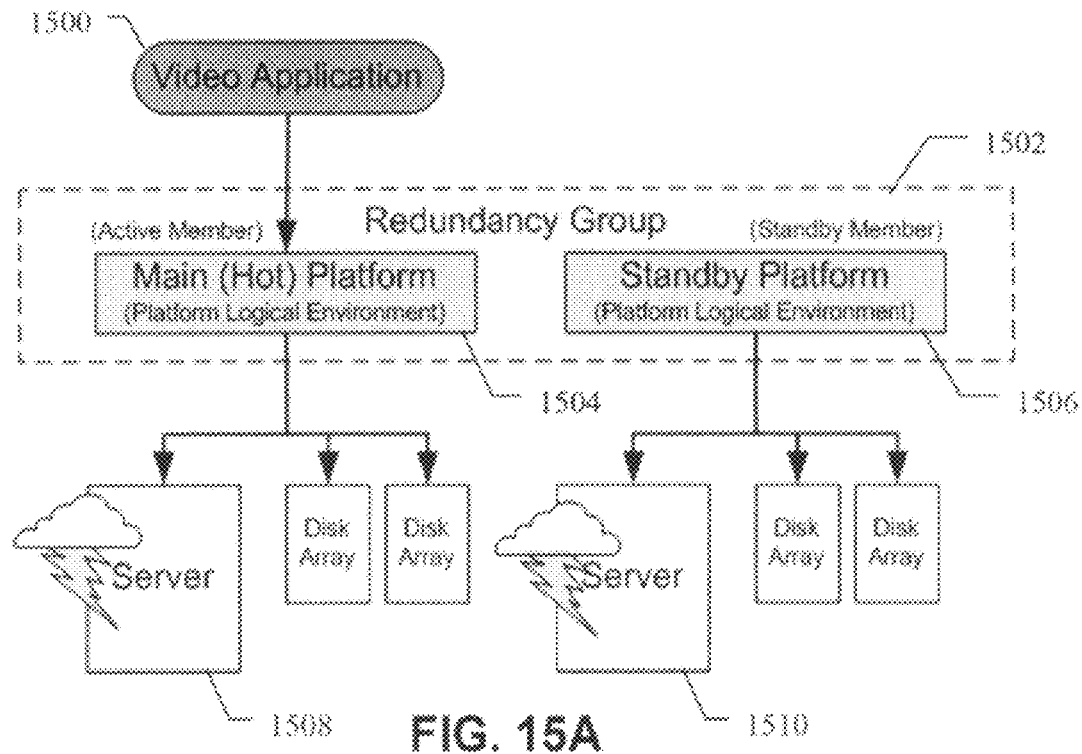
FIGS. 15A, 15B, 15C and 15D illustrate the modelling of redundancy relationships between infrastructure elements.

FIG. 15A illustrates some of these behaviours in a common main/hot standby server configuration. In this example, a video application 1500 is supported by a Platform Logical Environment 1504, designated the main (hot) platform, and representing a main server 1508 and associated disk arrays. A standby platform, in the form of backup server 1510 and associated disk arrays, is represented by Platform Logical Environment 1506. The Platform Logical Environments 1504 and 1506 are modelled as members of a redundancy group 1502.

In the modelled configuration, in the event of a main server 1508 failure, the responsibility for hosting the Video Application 1500 would switch to the standby server 1510. There would be no service impact in this case, although the application would subsequently be executing without resilience.

IT elements such as servers may also provide some secondary non-resilient function. For example, a standby server may also be used to host other, often lower priority, applications. Local behaviour enables a secondary function to be defined, and where necessary, to specify the impact on that secondary function should one or more of the active elements of the group fail.

Figure 15B:
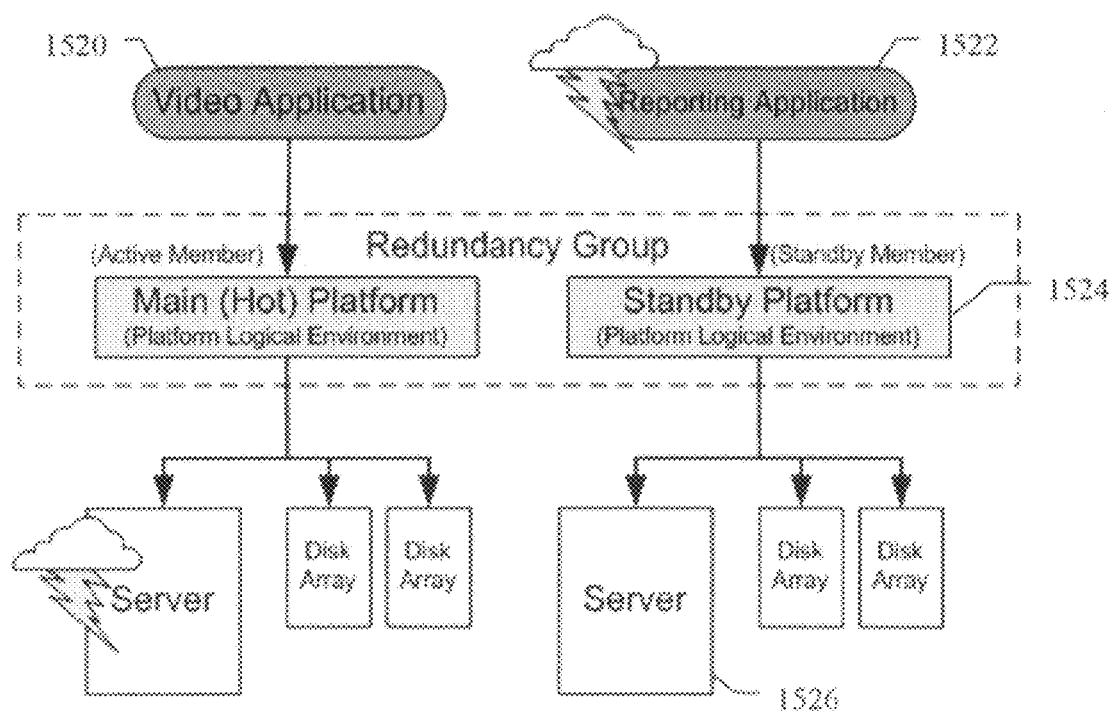

In FIG. 15B, the standby server 1526 is hosting a separate reporting application 1522, with the association (and possibly related resource allocations) modelled by Platform Logical Environment 1524. In the event of the main server failing, the Video Application 1520 will subsequently execute solely on the standby server 1526. Depending on the behaviour of the switchover, the reporting application 1522 can be shown to be either affected (it cannot be supported on the standby server in the event of failover) or unaffected (the reporting application will continue to execute in the event of failover).

Figure 15C:
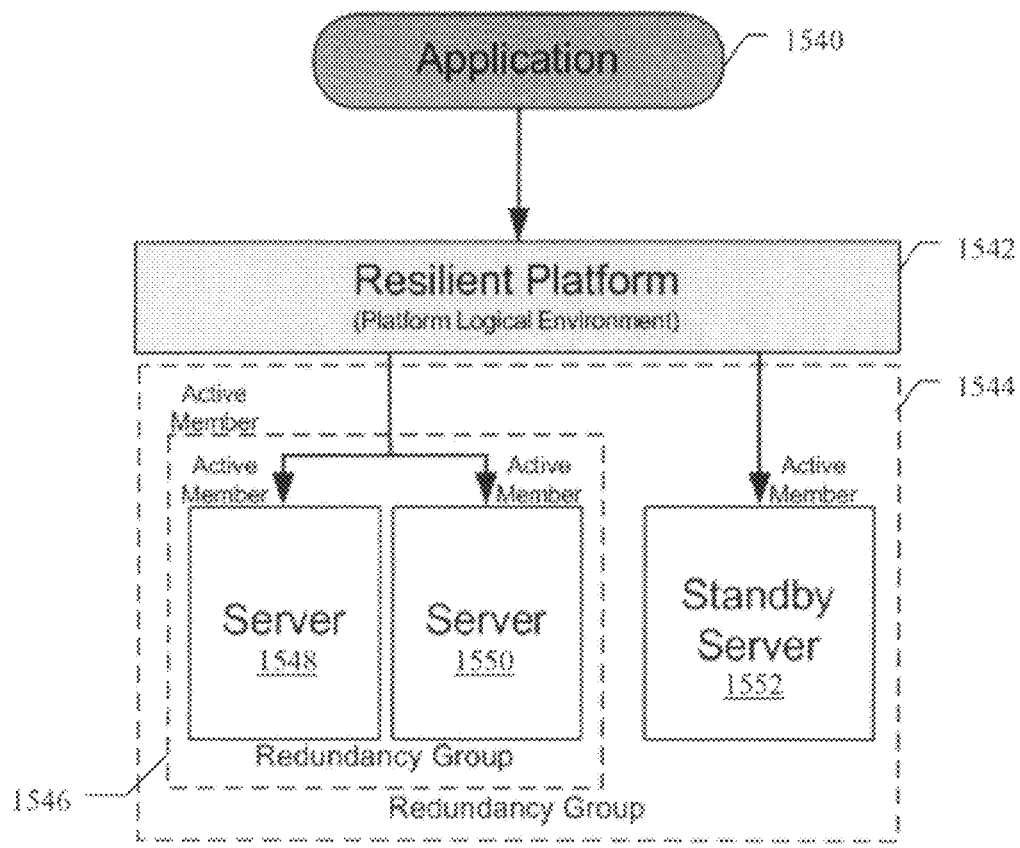

Redundancy Groups can be members of other Redundancy Groups in a hierarchal configuration. The example illustrated in FIG. 15C represents a resilient configuration that uses hierarchical Redundancy Groups. This enables the behaviour of more sophisticated resilient architectures to be captured.

As shown in FIG. 15C, an application 1540 is supported by a Platform Logical Environment 1542, which is associated with three servers 1548, 1550, 1552 arranged in a redundancy hierarchy. The two main servers 1548, 1550 are in a cluster configuration protecting each other from failure. This is modelled by way of inner redundancy group 1546. Redundancy group 1546 and standby server 1552 are themselves modelled as being grouped in a further outer redundancy group 1544. Thus, in the event of a double failure of main servers 1548 and 1550, the standby server 1552 would take over, providing continuity of service to the Platform Logical Environment 1542 and hence Application 1540.

In this example, Servers 1548, 1550, 1552 and Redundancy Group 1546 would be configured with "redundant" behaviour. Note that in this scenario the stand-by node 1552 is Redundant only, as it does not have objects depending upon it independently, i.e. when in stand-by state. In an alternative example, if a separate software application were associated with standby server 1552 (e.g. to utilise the server when in standby mode, as with the reporting application in the FIG. 15B example), then standby server 1552 could be modelled with Critical/Redundant behaviour, to indicate that the standby node is critical for that other application.

Failure Factor

The Failure Factor is a numerical attribute of the Redundancy Group that describes how peer redundant components protect each other. The number specifies the maximum number of elements with Redundant or Critical/Redundant behaviour that can fail without affecting the services that they support.

In a configuration such a RAID 1 group, the system can sustain the failure of all but one of the disks in the set, as data is mirrored across all disks. In this case the Failure factor is equal to the number of disks minus one.

Figure 15D:
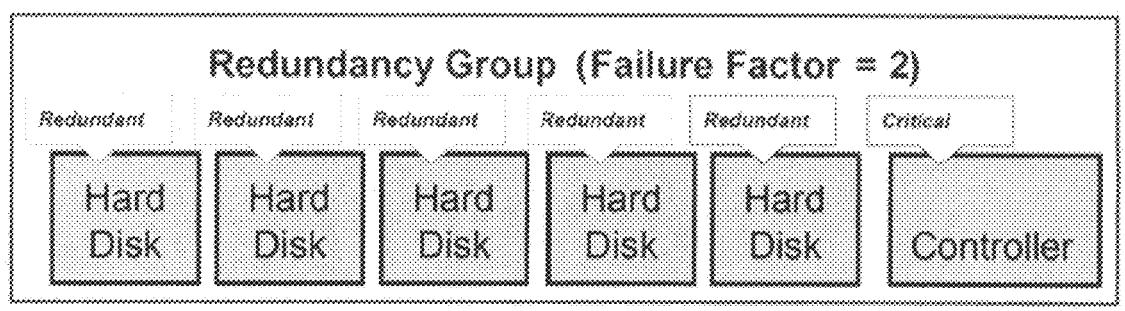

In a RAID 5 configuration, on the other hand, only one disk out of the entire stripe set can fail. In this case the Failure Factor is one, while on a RAID 6 configuration, shown in FIG. 15D, the Failure Factor would be 2.

When a failure occurs on an element, the total number of failing elements belonging to the same Redundancy Group can be counted and compared with the Failure Factor to determine the impact of the failure.

Critical/Redundant elements participate in the calculation for the impact analysis of the other Redundant elements. However if a Critical/Redundant element fails then only the objects depending on the failing element are affected and no calculation is required.

Additionally, a Failure Factor Callout may be defined on the Redundancy Group which defines a custom calculation procedure. This, when defined, replaces the default calculation described above.

Relationships

The Redundancy Group object is modelled as an object that retains relationships with the components in the group. The behaviour of the component is specified in the relationship itself, as shown in FIG. 16A.

Preferably, different types of relationships can be configured in metadata 612 (see FIG. 6), so that behaviours are attributed to named relationships which better represent the role of the component within the group. As an example, the FIG. 16A model above can be better described with named relationships as shown in FIG. 16B.

Redundancy Group Business Logic

The Redundancy Group provides a basic mechanism to understand the impact of failure on any kind of model object that is in a resilient configuration which is modelled using the Redundancy Group.

Preferably, this information is additionally provided via an API to external applications, and may be exposed via Web reports.

The way the Redundancy Group aids service assurance is based on the principle that, being orthogonal to the IT infrastructure object model hierarchy, it relies on the objects themselves to be in relation with the objects that depend upon them, rather than relying on the Redundancy Group itself.

FIG. 17 illustrates an example of failure impact analysis relating to a cluster of redundant servers 1702, 1704, 1706, 1708.

When the Server 1702 in this example fails (as indicated by the "lightning" icon), the impact analysis procedure can use the Redundancy Group object 1700 to understand if the failure has an effect on services or not. If the answer is yes, the entire group is supposed to fail, because of the clustering nature. Therefore the procedure follows the relationships between each server and any "related" object even if this might end up to be the same, such as the Logical Environment 1710 used to represent the hardware platform in the capacity model. The Redundancy Group itself does not provide any direct relationship with services or other objects except by way of its constituent elements. Thus, in the example above, the Redundancy Group 1700 is not directly related to the "Hardware platform" Logical Environment 1710 that represents the clustering function.

The Redundancy Group (R.G.) object exists in conjunction with an Impact Analysis procedure that works as follows:

When a failure is detected on an object which is part of a R.G. the procedure can be invoked passing the ID of the object.

The relationship with the R.G. is retrieved to establish the behaviour

If the behaviour is "Critical" the procedure immediately returns the list of all objects in the R.G. as all have failed.

If the behaviour is Critical/Redundant the procedure returns the ID of the object that was passed as it is the only one that is affected directly (i.e. the objects that depend upon it)

Otherwise the Functional Status of all other element in the R.G., with Critical/Redundant or Redundant behaviour is inspected to count the number of failures present.

If the Failure Factor Callout is defined, this is invoked to do the calculation; otherwise the Failure Factor is retrieved from the table.

The Failure Factor is then compared to determine if there is a failure or not. If so the ID of all the elements in the group are returned, otherwise null is returned.

In case of a hierarchical configuration, the failure status of a group is treated by its parent as if the child group is one of its elements. If the failure is protected by the parent group then the element that originated the failure is treated as not failing.

In case of the need of a specialised procedure, customization can be achieved using the Failure Callouts. These are invoked immediately when the Impact Analysis procedure is invoked, in this order:

1. A Failure Callout defined in an Object Redundancy metadata table corresponding to the appropriate object and relationship type, if present.
2. A Failure Callout in an R.G. Relationship Type table, for the corresponding relationship type, if present.

The callouts return which elements of the Redundancy Group are considered in failure.

These IDs can then be used by external procedures or by the Web report code to start the determination of the dependant services.

In the above examples, Redundancy Groups are mostly defined for hardware or logical resources (Logical Environments), but they can preferably be defined for any model object, for example applications and software components. Since the model relates applications and software components to the hardware resources they require to run, such a software-level redundancy group can also implicitly define hardware redundancy where redundant applications rely on different sets of physical resources. The effects of hardware failure on user/application services relying on redundant software can be analysed using the model by analysing the resource dependencies of the redundant software. Overlapping hardware dependencies between redundant software can also be determined from the model, for example, where two supposedly redundant applications in fact rely on a common physical resource which could form a common point of failure and thus reduce the overall resilience of the modelled infrastructure. By making relationships and dependencies explicit, the model can thus enable resilience to be defined and enforced more rigorously.

Preferably, the system allows templates to be defined for any model object, for example to represent typical components within a given environment. Templates may also define groups of related model objects and their relationships (e.g. hierarchical decomposition, functional dependency, and resource consumption relationships) to allow standard resource/software deployments to be captured. The templates specify default attributes (e.g. default capacity/consumption data) and relationships which can then be modified as required. Common structures can thus be added to the model very quickly. For example, a template may represent a standard application and its software components, or a disk configuration for a storage area network. Whole infrastructure sections comprising physical resources and software may even be represented in a template. Templates may also include Redundancy Groups, so that standard resilient configurations can be captured.

User Interface Functions

As discussed with reference to FIG. 6, in preferred embodiments, the IT Manager tool provides a user interface allowing the viewing and manipulation of the model. As previously described, the user interface provides basic views for each model object type, referred to as home pages. A home page shows the relevant information defined for the given model object. Additionally, a variety of specialised views, browsers, wizards and reports are also provided. Examples of some of these user interface components will now be described in more detail.

Views

IT Infrastructure View: The IT Infrastructure View provides graphical visualization of IT infrastructure and the relationships between the displayed components. The view can include applications, numbers, platforms and physical equipment and is constructed by populating the view with selected objects.

Application View: The Application View is generated for a selected Application and presents a graphical representation of its relationships with other Applications, with Logical Environments and with physical nodes.

Logical Environment View: The Logical Environment View provides graphical visualization of both Platform and Partition Logical Environments. The view shows dependency information for each component and/or participant Logical Environments. It also clearly shows the redundant behaviour of each constituent of the Logical Environment.

Redundancy Group View: The Redundancy Group View provides a graphical representation of the constituent components of a Redundancy Group. These are shown in a hierarchical manner where redundant groups are dependent on other redundant groups. The view also shows the redundant behaviour of each component in the group.

Capacity View: this is used to provide a graphical representation of the capacity made available by Software Components or Physical and Logical Resources and the degree to which that capacity is consumed by Software Components or hardware peripherals.

Web Reports

Application Impact Web Report: Applications can have dependencies on other applications, with Logical Environments and with physical nodes such as servers. The Application Impact Web Report provides information on applications that may be impacted by the failure of a specified IT object (application, logical environment or equipment). The report lists the impacted applications, and can also display the object trace between reported applications and the selected IT object.

Service Impact Web Report: This is used to report services and subscribers that could be affected by the failure of an IT infrastructure component.

Capacity Utilisation Web Report: this is used to report on the utilisation levels of resource aggregated over defined sections of the networked IT resource.

Wizards

Logical Environment Wizard: The Logical Environment Wizard allows a user to create or modify Logical Environments and associated relationships. For Partitions, the Wizard enables the user to select a parent Logical Environment, and to relate the Partition to physical resources/nodes, e.g. card and port components. For Platforms, the Wizard enables the user to specify the platform components—nodes or other Logical Environments.

Application Wizard: The Application Wizard allows a user to create or modify Application and Application Interface objects and associated relationships.

Redundancy Group Wizard: The Redundancy Group Wizard allows a user to create or modify a Redundancy Group, to add or remove objects, and to specify the redundancy behaviour for each object.

Resource and Relations Browsers

Resource and Relations Browsers are provided for the following objects:

Logical Environment, displaying for each Logical Environment, the associated Partitions and platform components.

Applications, displaying dependent Applications and the associated relationship type, related Application Interfaces, and for each Application Interface, any related services.

Homepages

The following homepages are available within IT Manager:

Logical Environment Homepage: The contents of a Logical Environment Homepage are context sensitive to the Logical Environment type. For platforms, a list of partitions, dependent nodes and logical environments, and parent logical environment is displayed. For partitions, the parent logical environment and a list of configured objects of the partition is displayed. This will also indicate the capacity made available by the Logical Environment.

Application Homepage: The Application Homepage displays the list of dependent and parent applications with the associated relationship types together with the capacity made available and consumed by the Application.

Redundancy Group Homepage: The Redundancy Group Homepage displays the list of elements in the group and related capacity, behaviour and relationship characteristics.

Data Model

The above description has set out a variety of modelling scenarios and concepts. As described, the model itself comprises a set of model objects and relationships defined between model objects. The main model objects described are those representing physical resources (e.g. nodes), Platform Logical Environments and partitions, software components, applications and application interfaces, and Redundancy Groups. Other model objects may be added to the model as appropriate.

The model is stored in a database. The database representation of the model will depend on the database technology used; for example, model data may be stored as a set of objects in an object database or as a set of relational tables in a relational database. Additional data relating to the model objects may also be stored.

In a preferred embodiment, a set of metadata is additionally stored in the database defining types of model objects that may be used in the model, types of relationships that may be defined between model objects, and other relevant information or constraints, as has already been described.

A highly simplified example of a data model for representing the infrastructure model is shown in FIG. 18. The infrastructure model 614 itself comprises database entities 1802 representing applications, entities 1804 representing software components and entities 1806 representing Logical Environments (Platform and Partition). As shown, Application entities may be associated with Software Component entities or with Logical Environment entities. Applications may also be associated with other Applications (representing decomposition of applications or inter-application dependencies). Software Components similarly may be associated with Logical Environments or with other Software Components (e.g. to represent modularization of components). Logical Environments may be associated with other Logical Environments as well as with entities in the low-level resource model 1808, whose resource capacity they represent.

Information on resource capacity and utilisation is preferably associated with the various model objects as appropriate.

Metadata 612 comprises database entities defining types of model objects, for example Application Types 1810, Logical Environment Types 1812 and Software Component Types 1814. Model object types may, for example, define characteristics or attributes of model objects of a given type or permitted relationships with other model objects. For example, a "Storage Area Network" Logical Environment type could be defined (see the FIG. 8A example). The type definition might, for example, specify the resource capacity measure (e.g. GB) applicable to this Logical Environment type, and may further specify that the Storage Area Network type Logical Environment may only be associated with Storage type devices in the physical resource model. By having predefined model object types with associated defined characteristics, the modelling process can be simplified, and modelling errors can be avoided.

The data model shown in FIG. 18 is provided for illustration only and is not intended to be complete. For example, Redundancy Group model objects are not shown, but are preferably also provided. Other implementations of the data model are possible.

Capacity Management Using the Infrastructure Model

Referring back to FIG. 1, the interaction in this embodiment between the capacity model and the remainder of the infrastructure management system, in particular with the resource model 102, the infrastructure planning system 110 and the service provisioning system 112 will now be described in more detail.

Interaction with the Resource Model

The interaction between the capacity model 104 and the infrastructure resource model 102 can enable service provider operations to be supported more effectively and flexibly.

In preferred embodiments, the resource model 102 is not a passive record of the resource infrastructure. Instead, it provides a 'control plane' for the resource, which includes analysis and control functionality acting on a model representation which is defined to serve the needs of higher-level processes rather than necessarily to provide a direct one-to-one correspondence to the actual installed computing and communications equipment (i.e. physical resources). Thus, the purpose of the representation is not necessarily to accurately model physical resources (as is the traditional approach), but to effectively support service provider operations (such as service provisioning and infrastructure planning). The inventory is optimised for the latter rather than the former purpose, and is hence also referred to as the "repurposed inventory". Capacity management using a capacity model as described herein is a specific implementation of this approach of providing a repurposed inventory.

The capacity model allows detailed, device-specific controls to be transformed into controls over the capacity to deliver services made available by the resource, based on the quantity, quality and content of the services offered to users, instead of based on the technology resources in the infrastructure. The control plane then acts to analyse, create and/or consume this capacity using the technology prioritised by the service provider and to create and control the life-cycle of services that consume the capacity within the resource.

For example, an infrastructure manager may modify the infrastructure model to add a new application to the model having specific resource requirements (for example defined in a consumption profile as described above with reference to FIG. 14D). The capacity model can then select a Logical Environment suitable for supporting the new application based on the resource requirements, allocate the required resources from the Logical Environment, and update the model to represent consumption of the resources. If no appropriate Logical Environment is found having sufficient resource capacity to meet the resource requirements, the capacity model may create a new Logical Environment, and instruct the underlying resource model to create additional hardware resources to provide the required resource capacities needed for the Logical Environment. These modifications to the underlying resource model are then implemented in the physical infrastructure, for example by installing and connecting equipment, configuring devices and the like. The detail of the implementation is hidden from the infrastructure manager, who operates at the abstract level of the capacity model.

Alternatively, the provisioning of an application service may be requested through service provisioning system 112, the service requiring certain application resources. The service provisioning system 112 then automatically selects an application capable of providing the service, or adds an application to the model using the process described above. Addition of the application may then in turn trigger additional of physical resources, if not available, as described above.

This process is summarised in a generalised form in FIG. 19. As illustrated, the process begins at step 1902 with the addition of a resource consumer (e.g. application, service) to the model. A resource consumption profile is associated with the resource consumer. In step 1904, the process searches the model for a suitable resource provider able to support the new resource consumer, by comparing the resource profile to available resource capacity of existing providers. Other constraints not related to resource capacity may also be taken into account at this stage (e.g. to match location requirements or a specified host operating system). For example, the process may consider only providers in the model matching a specified type.

If a suitable provider is identified, then resources are allocated to the new consumer in accordance with the resource profile at step 1906. If no suitable provider is identified, then a new provider (if applicable, of the specified type) is added to the model in step 1908. Resources are then allocated from the new provider at step 1906.

Finally, the model is updated with the new resource allocations at step 1910.

As indicated previously, the addition of a provider to the model in step 1908 may trigger a number of other processes to implement the addition in the physical resource infrastructure. Where the new provider added is itself a resource consumer from other underlying resource providers (e.g. a Logical Environment), the process of FIG. 19 may be repeated for the new provider, to select or create suitable resources. Additionally, manual build orders and/or automatic configuration orders may be generated to trigger manual installation of new equipment or software or automatic configuration of equipment or software.

Thus, high-level requirements can be cascaded down through the capacity model to identify and allocate appropriate resources and create new resources where needed. The complex infrastructure changes that may be needed to provision a service or add an application can thus at least to some extent be automated and hidden from the operator.

Preferably, services available to users of the infrastructure are defined in a service catalogue. The service catalogue specifies the resource requirements for each service (e.g. the consumption profile). The operator can then provision a service simply by selecting the service from the service catalogue and specifying any necessary service parameters. Provisioning can the occur automatically as described above, with resources allocated or created as required. Similarly, applications could be defined with their resource requirements in an application catalogue to enable simplified deployment of applications in the same manner.

Interaction with Planning Processes

The capacity model can provide an efficient means of analysing and controlling the capacity deployed into the infrastructure by the service provider; one that is based on the quantity, quality and content of the services it offers to the end user, not on the implementation of individual service settings for individual technologies. This information can be stored in a product model in a service catalog. This again is an example of the repurposing of the inventory. When determining what capacity is required in which locations, in order to provide the appropriate resources matching service offerings, this mechanism removes the dependence on complex device-specific details. Instead, the measures of resource capacity can be systematically linked to the Service Level Agreements of the services offered in the product model. This is combined with product forecasts to determine the planning requirements.

As part of a planning process, for example, the capacity model can be analysed to determine:

Availability of resource capacity for given types of resources

Availability of resource capacity required by certain applications or services

Underutilisation of resource capacity

Where services are defined in a service catalogue as described above, the infrastructure planning system 110 (see FIG. 1) may analyse, for one or more services, to what extent the resource infrastructure can support a projected demand for those services, based on capacity consumption profiles for the services and resource capacity information recorded in the model. The planning system can then generate plans and/or build/configuration orders to create additional resource capacity, for example as described above with reference to FIG. 19, based on the projected demand and/or other considerations.

The planning system can also report on underutilised resource capacity, allowing the configuration of the IT/communications infrastructure to be optimised (for example by redeploying existing equipment elsewhere in the infrastructure or allocating it to different uses).

Use of the Capacity Model in Service Provisioning/Service Order Fulfilment

As already described, the process illustrated in FIG. 19 is also applicable to service provisioning using the capacity model.

The physical implementation of a service in the infrastructure will typically not actually consume a fixed quantity of capacity and it will often be possible to assign an arbitrarily large number of services to the same resource (in an example used previously, an email service may have a storage allocation defined for it that most users never utilise fully; overbooking of the relevant resources may therefore be possible).

However, this can result in poor performance of the services and may well violate Service Level Agreements with the user.

The capacity model can be integrated with the service provisioning system 112 (see FIG. 1) by using a service specification (e.g., captured in the product model, in a service catalogue) which assigns specific resource allocations to each service offered by the service provider. The service provisioning system uses this service specification to allocate (consume) the specified resources capacity from resource providers in the model. Where overbooking is required or allowed, this can be explicitly recorded in the model by way of overbooking factors as previously described. These overbooking factors can then be enforced by the service provisioning system, by preventing allocation of services which would exceed the overbooked capacity of a resource.

Different service qualities may be supported for a given service. These may have different consumption profiles defined (see FIG. 13B), allowing automatic assignment to appropriate resource providers (e.g. Logical Environments, processes, applications) or resource partitions of resource providers. For example, different partitions of resource providers may be allocated to different service qualities. Also, since the model allows different overbooking factors for different partitions of logical resources, different overbooking factors can be enforced based on service quality.

Preferably, the capacity model and/or service provisioning system can be configured to prevent the assignment of services to resource providers, if the assignment would consume more capacity than is designated to be available in the resource provider. Instead of simply preventing the assignment, a warning may be generated that the resource capacity has been exceeded.

Furthermore, as the capacity of resource providers is consumed by the provisioning of services, utilisation information can be provided as an input to planning operations (e.g. as an input to planning system 110). Thus, the capacity model can serve not only to assist strategic planning and service provisioning individually, but to integrate both processes so that utilisation by existing services and specific requirements for new services can be evaluated during the provisioning process, and the results can be fed back to the planning process or system to enable creation of new capacity to meet current and future demand. This direct, feedback-based planning can of course occur alongside longer-term, offline, strategic planning.

As one example of this, a threshold may be set at some percentage of the total capacity of a resource provider (e.g. Logical Environment), which, when exceeded, can be used to trigger an alert, which will result in further planning activity. In some embodiments, planning system 110 may be configured to automatically create new resources in the infrastructure as described above with reference to FIG. 19 in response to an alert generated by the capacity model, for example due to a utilisation threshold being exceeded.

Other uses of the Capacity Model

The capacity model can also useful in service assurance. For example, performance problems such as resource shortages occurring in the actual resource infrastructure can be related to the resources in the model. Resource consumers, such as Logical Environments, processes, applications and services affected by the detected performance problems can be identified. Corrective action can then be taken (for example to create additional resources).

Similarly, the model can be used for failure impact analysis, i.e. to map equipment failures to affected applications and services as has already been described.

Alternative Embodiment: Data Capacity Management for Data Networks

An alternative embodiment of the resource management system will now be described. In this example, the resource management system is used to manage data capacity (or bandwidth) provided by physical and logical data circuits in a data network. Features of this embodiment may be applied to the IT Manager embodiment and vice versa (modified as necessary).

Thus, referring back to FIG. 1, in this embodiment, the infrastructure 116 is a telecommunications network which provides telecommunications services to end-users. The resource manager 108 manages network resources available in network 116. Specifically, resource manager 108 maintains the inventory 100 of the network resources and controls changes and additions of resources. The inventory 100 stores information needed for a variety of network planning, management, provisioning and configuration processes.

System 110 is a network planning/engineering system which interacts with the resource manager 108 to manage changes to the network, for example to provide new network resources, typically either in response to specific user requirements, capacity usage or exhaustion thresholds, or based on strategic planning. The service provisioning system 112 interacts with the resource manager 108 to manage the provisioning of new services to network users as well as changes to and removal of existing services.

Provisioning of network services may involve the design of telecommunications circuits connecting specific network locations, and the identification, reservation and configuration of network resources—in particular data capacity or bandwidth—needed to form the circuits. In addition to the fulfilment of specific user service orders, circuits may also be designed to provide capacity paths in the network as part of the planning process.

To provide a telecommunications circuit between two specified locations, it may be necessary to find a sequence of individual circuit paths which together form a route between the required end points, and reserve bandwidth on each of those paths to ensure the resulting circuit meets overall bandwidth requirements. Services may be provisioned across a range of different networking technologies, including structured bandwidth technologies such as SDH, SONET, PDH, DWDM, and packet data domains such as Gigabit Ethernet, IP, MPLS and RPR. The services made available to users of the telecommunications system are also referred to as telecommunications products, and may be defined in a product catalogue or product model which specifies the characteristics and requirements of products (such as the bandwidth of a communications service).

As in the generalised example of FIG. 1, changes made to the inventory 108 during the creation of new network resources or services are implemented in the network 116 by way of a configuration system 114 which performs the necessary device configurations to a activate new resources and/or make new services available for use.

To support these functions, the inventory 100 includes network resource model 102 storing details of network resources such as network circuits, nodes, equipment (e.g. routers), ports, queues and the like. To allow the effective management of data capacity across varied technologies, the inventory 100 further provides capacity model 104 defining how capacity available in the network is allocated to particular network resources, in particular to circuits. Service model 106 stores information on services provisioned to users.

For the sake of clarity, the resource model, capacity model and service model have been described here as separate models, but it should be noted that they need not be separate in practice, as already stated in connection with the FIG. 1 generalised embodiment. In preferred embodiments, they represent different aspects of a single unified model.

More specifically, in this embodiment, the capacity model models data capacity of physical and logical circuits within the resource model, and utilisation of that data capacity by circuits. This is achieved mainly by associating a circuit (logical or physical) with one or more bandwidth partitions. These partitions represent a partitioning of the data capacity (or bandwidth) provided by that circuit. The utilisation of the data capacity of a lower-level circuit by a higher-level circuit is then modelled by linking a partition associated with the higher-level circuit to a partition of the lower-level circuit.

The total bandwidth available on a circuit may be represented by a single partition or divided into multiple partitions, for example based on the type of traffic to be carried, the class of service (CoS), or the quality of service (QoS) to be achieved.

A partition defined in the capacity model typically defines the amount of bandwidth it consumes from an underlying bearer and the amount of bandwidth it makes available to overlying circuits. The bandwidth made available by a partition is referred to herein as its Logical Bandwidth (LBW). Bandwidth consumed and bandwidth made available need not be the same: a partition may, for example, make available more capacity than it consumes. This is known as bandwidth overbooking, and is often useful, for example, where typical actual bandwidth consumption on a circuit is expected to be lower than the theoretical maximum provided for. For example, in the provision of residential broadband Internet access services, it is usually expected that not all customers will use their connection to its full (theoretical) capacity at all times, and to reserve the full rated bandwidth for each customer would lead to an inefficient use of available bandwidth. In the capacity model, partitions may specify an explicit overbooking factor to model this.

Conversely, a partition may make available less bandwidth to an overlying circuit than it consumes. This may, for example, be due to signalling overhead when data streams using one communication protocol are carried over another (for example, a Virtual Private Network/VPN over IP). To model this, partitions in the capacity model may specify what is referred to herein as an adaptation factor. Adaptation factors and overbooking factors may also be combined.

The use of adaptation factors and overbooking factors allows the relationship between bearer and consumer circuits to be defined accurately. These factors are found by a number of means including computer simulations of network behaviour and observing the usage patterns of the actual networked resource over a period of time. These factors embody expertise in network management and can be used to differentiate the quality of service and cost effectiveness of different service providers. The model can then be used to calculate consumed and available bandwidth, (e.g. overall or for certain traffic types or classes of service or QoS levels). The information made available by the capacity model can assist both short-term and long-term network planning.

The capacity model is provided as an extension to a network resource model. By combining the resource model with a capacity model, network planning/engineering processes and service provisioning processes (as performed, for example, using modules 110 and 112) can be simplified, and more powerful, flexible processes can be provided. For example, capacity requirements can be more easily mapped onto existing network resources or translated into resource requirements and detailed network engineering plans. Flexibility also arises because the planning, engineering and provisioning processes can be made independent of the physical network implementation and the various networking technologies used. The capacity model effectively provides an abstraction layer between the higher-level activities and processes and the lower-level resource model and associated network implementation detail. Planning, engineering and provisioning processes can be expressed, at least initially, in terms of data capacity rather than in terms of specific resources or specific network devices.

As already briefly described with reference to FIG. 5, the modelling of data capacity in data networks follows essentially the same principles as those already discussed in general terms with reference to FIGS. 2A-2C and as applied to the management of IT resources by IT Manager (see FIG. 6). Specifically, the model, in its simple form, comprises three layers: resource providers, logical resource abstractions, and resource consumers.

In the present embodiment, data capacity or bandwidth is being modelled. In this context, physical connections or bearers can be viewed as resource providers: a physical connection or bearer is capable of carrying a certain amount of data traffic (i.e. bandwidth). Logical circuits may be defined connecting distant points in the network; a logical circuit will typically traverse a number of network nodes and physical connections between those nodes. It provides the capacity of the underlying physical connections to higher-level circuits or services, and thus can perform the role of a logical resource, similar to a Logical Platform Environment in the IT Manager embodiment. Finally, an individual traffic flow provisioned across the circuit (for example as part of an end-user service) consumes a portion of the data capacity provided by the circuit (and hence, ultimately, by the underlying physical connections). A simple example of this was illustrated in FIG. 5, where a bearer circuit 500 provides capacity for traffic flows 506 from underlying physical connection 508.

Preferably, the model allows a more complex circuit hierarchy to be represented, where circuits can be provisioned on top of and consume capacity from other circuits. Thus, a circuit can be both a bearer circuit—providing capacity for other circuits and traffic flows—and a consumer circuit, consuming capacity from an underlying bearer. Such circuits can also be referred to as logical bearers.

As in the general example of FIG. 2C, the data capacity of a bearer may be partitioned in the model into one or more partitions (this is analogous to the partitioning of Logical Environments in the IT Manager embodiment). Individual partitions may, for example, be defined for different traffic or service types, and may have different overbooking factors defined for them.

The flexibility of the capacity model's hierarchical framework allows traffic streams at any level in the hierarchy to act as logical bearers. For example, the traffic flows in the FIG. 5 example can be modelled as logical bearers. They could, for example, represent aggregated traffic flows in a core topology, and each of the carried sub-flows could be modelled as a consumer of the aggregated bandwidth. An example of this is shown in FIG. 20, where consumer circuits 2002 are all carried on a single one of the (aggregated) traffic flows 2004. These traffic flows are themselves carried on traffic trunk 2006. Traffic trunk 2006 in turn is assigned to one of three partitions of underlying bearer 2008.

The capacity model thus permits the modelling of a complex hierarchy of circuits, and bandwidth partitions of those circuits. Utilisation of data capacity can be mapped all the way from high-level consumer traffic flows down to low-level bearer circuits via this hierarchy of circuits and partitions.

The various advantages and uses of the capacity model described above in relation to the IT manager embodiment (for example in relation to resource management and provisioning of new resources using the capacity model, infrastructure planning, service provisioning, service assurance and failure impact analysis) are also applicable when the capacity model is used to model data capacity for data networks.

It will be understood that the present invention has been described above purely by way of example, and modification of detail can be made within the scope of the invention.

For example, as has previously been mentioned, the IT manager and data capacity management embodiments described could also be combined to provide a resource management system capable of modelling and managing data capacity of a communications network together with IT resources and applications utilising them.

The invention claimed is:
1. A system, comprising:
a processor; and
a database for storing a model of an infrastructure associated with one or more of a computing and communications resource, the model defining:
a set of resources provided by the infrastructure;
a set of software applications operating within the infrastructure and utilising resources; and
associations between given applications in the model and given resources to indicate utilisation of the given resources by the given applications;
wherein the database stores: capacity information associated with resources, the capacity information specifying, for one or more given resources, a resource capacity provided by those resources; and resource allocation information, specifying for a given association between an application and one or more resources, a resource quantity allocated to the application from the associated one or more resources,
wherein the database further stores: capacity information associated with applications, the capacity information specifying, for an application, a resource capacity provided by the application to application services,
wherein the database further stores:
information defining application services provisioned to users of applications;
associations between application services and applications; and
resource allocation information specifying, for a given association between an application service and an application, a resource quantity allocated to the application service from the associated one or more applications, and wherein the database stores information defining, for a given service type, a resource allocation profile indicating one or more resource quantities to be assigned to a service of the given type.

2. The system according to claim 1, wherein the database stores information defining:
one or more logical environments, wherein a logical environment represents an execution context for applications.

3. The system according to claim 2, wherein a logical environment is associated in the database with one or more resources, the resources providing the execution context.

4. The system according to claim 3, wherein the database defines an association between an application and a logical environment to indicate utilisation by the application of the execution context and associated resources represented by the logical environment.

5. The system according to claim 4, wherein the database stores capacity information associated with a logical environment, the capacity information defining a resource capacity provided by the resources associated with the logical environment.

6. The A system according to claim 5, wherein the database stores information defining, for a logical environment, a plurality of partitions, each partition representing a portion of the resource capacity provided by the logical environments.

7. The system according to claim 6, wherein the database stores information defining an association between an application in the model and a logical environment partition to indicate utilisation of resource capacity by the application from the poet ion of resource capacity allocated to the associated partition.

8. The system according to claim 7, wherein the database stores information defining, for a logical environment or logical environment partition, a resource quantity made available by the logical environment or logical environment partition to applications.

9. The system according to claim 8, wherein the database stores information specifying, for a logical environment or logical environment partition, a modifying factor, indicating that the resource quantity made available by the logical environment or partition is different from a fraction or multiple of a resource quantity provided to the logical environment from resources represented by the logical environment.

10. The system according to claim 2, wherein a logical environment in the database is associated with one or more other logical environments.

11. The system according to claim 4, wherein the database stores resource allocation information specifying, for a given association between an application and a logical environment, a resource quantity allocated to the application from the logical environment.

12. The system according to claim 6, wherein the database stores information defining, for one or more of the partitions of a logical environment, associations with one or more selected resources or components of resources to indicate that the portion of resource capacity allocated to the partition is provided by the associated resources or resource components.

13. The system according to claim 1, wherein the resource capacity provided by the application to application services is related to and allocated from a resource capacity made available by a logical environment and/or one or more resources.

14. The system according to claim 1, comprising a resource allocation component arranged to allocate resources to a new service from an application in accordance with a resource allocation profile relating to the service, and to record the allocation in the resource allocation information.

15. The system according to claim 1, wherein the database stores information defining, for an application, one or more application interfaces.

16. The system according to claim 1, wherein the database stores information defining one or more software components, and associations between applications and software components utilised by the applications.

17. The system according to claim 16, wherein the database stores information defining an association between a software component and a logical environment to indicate utilisation by the software component of the execution context and associated resources represented by the logical environment.

18. The system according to claim 1, wherein the database stores metadata relating to the model, defining one or more of: types of model objects; types of relationships between model objects; permitted relationships between model objects; and default attributes for model objects.

19. The system according to claim 1, wherein the database stores information defining redundancy relationships between resources or logical environments.

20. The system according to claim 1, further comprising a user interface for modifying the infrastructure model defined in the database.

21. The system according to claim 1, further comprising the processor for analysing the model to determine resource utilisation information relating to the resource infrastructure, to determine a resource shortage or resource surplus.

22. The system according to claim 1, further comprising the processor for analysing the model to determine, for a resource malfunction relating to a resource of the resource infrastructure, one or more applications or application services affected by the malfunction.

23. The system according to claim 1, comprising a service provisioning component for provisioning services in dependence on capacity information in the model.

24. The system according to claim 1, comprising an infrastructure planning component for analysing capacity information in the model to generate planning data.

25. A computer program product embodied on a non-transitory computer readable medium, comprising:
software code for storing in a database a model of an infrastructure associated with one or more of a computing and communications resource, the model defining:
a set of resources provided by the infrastructure;
a set of software applications operating within the infrastructure and
utilising resources; and
associations between given applications in the model and given resources to indicate utilisation of the given resources by the given applications,
wherein the database further stores: capacity information associated with applications, the capacity information specifying, for an application, a resource capacity provided by the application to application services,
wherein the database further stores:
information defining application services provisioned to users of applications;
associations between application services and applications; and
resource allocation information specifying, for a given association between an application service and an application, a resource quantity allocated to the application service from the associated one or more applications, and wherein the database stores information defining, for a given service type, a resource allocation profile indicating one or more resource quantities to be assigned to a service of the given type.

26. The system according to claim 1, wherein the set of resources provided by the infrastructure includes bandwidth provided by the set of resources.

27. The system according to claim 1, wherein a partition entity for a given bandwidth partition is stored in the database, the given bandwidth partition representing an allocation of bandwidth, wherein the partition entity is associated with first information defining a first quantity of bandwidth allocated to the given bandwidth partition from an underlying bearer, and second information defining a second quantity of bandwidth made available by the given bandwidth partition for allocation to other partitions.

28. The system according to claim 27, wherein the second information defining the second quantity of bandwidth made available by the given bandwidth partition comprises a booking factor for indicating that the second quantity is a fraction of, equal to, or a multiple of the first quantity.

* * * * *

UNITED STATES PATENT AND TRADEMARK OFFICE
CERTIFICATE OF CORRECTION

| | | |
|---|---|---|
| PATENT NO. | : 8,201,180 B2 | Page 1 of 1 |
| APPLICATION NO. | : 11/842803 | |
| DATED | : June 12, 2012 | |
| INVENTOR(S) | : Briscoe et al. | |

It is certified that error appears in the above-identified patent and that said Letters Patent is hereby corrected as shown below:

In the claims:

In col. 45, claim 6, line 26; please replace "environments" with --environment--;

In col. 45, claim 7, line 31; please replace "poet ion" with --portion--.

Signed and Sealed this
Ninth Day of October, 2012

David J. Kappos
*Director of the United States Patent and Trademark Office*